US007915998B2

(12) United States Patent
Matsubara et al.

(10) Patent No.: US 7,915,998 B2
(45) Date of Patent: Mar. 29, 2011

(54) VEHICLE CONTROL SYSTEM AND VEHICLE CONTROL APPARATUS

(75) Inventors: Manabu Matsubara, Kobe (JP); Hirofumi Takasuka, Kobe (JP); Akira Matsuura, Kobe (JP)

(73) Assignee: Fujitsu Ten Limited, Kobe-shi (JP)

( * ) Notice: Subject to any disclaimer, the term of this patent is extended or adjusted under 35 U.S.C. 154(b) by 1168 days.

(21) Appl. No.: 11/600,160

(22) Filed: Nov. 16, 2006

(65) Prior Publication Data

US 2007/0162191 A1 Jul. 12, 2007

Related U.S. Application Data

(63) Continuation-in-part of application No. 11/598,048, filed on Nov. 13, 2006, now abandoned.

(30) Foreign Application Priority Data

Nov. 11, 2005 (JP) ................................ 2005-327970
Nov. 24, 2005 (JP) ................................ 2005-339159
Nov. 28, 2005 (JP) ................................ 2005-342958

(51) Int. Cl.
*B60R 25/00* (2006.01)

(52) U.S. Cl. ........................ 340/5.72; 340/5.1; 340/5.64

(58) Field of Classification Search ................. 340/5.72, 340/5.61, 5.64, 825.69, 5.1; 307/10.1
See application file for complete search history.

(56) References Cited

U.S. PATENT DOCUMENTS

| | | | | |
|---|---|---|---|---|
| 6,208,239 | B1 * | 3/2001 | Muller et al. | 340/426.35 |
| 6,617,961 | B1 * | 9/2003 | Janssen et al. | 340/5.8 |
| 7,046,119 | B2 * | 5/2006 | Ghabra et al. | 340/5.72 |
| 7,058,411 | B2 * | 6/2006 | Chen et al. | 455/456.1 |
| 7,336,151 | B2 * | 2/2008 | Ueda et al. | 340/5.72 |
| 2002/0025823 | A1 | 2/2002 | Hara | |
| 2004/0183714 | A1 | 9/2004 | Yamashita et al. | |

FOREIGN PATENT DOCUMENTS

| | | |
|---|---|---|
| JP | A 10-317754 | 12/1998 |
| JP | A 2000-104429 | 4/2000 |
| JP | A 2001-115706 | 4/2001 |
| JP | A 2001-336321 | 12/2001 |
| JP | A 2002-077972 | 3/2002 |
| JP | A 2003-269027 | 9/2003 |
| JP | A 2004-084406 | 3/2004 |
| JP | A 2004-263447 | 9/2004 |
| JP | A 2005-262915 | 9/2005 |

* cited by examiner

*Primary Examiner* — Vernal U Brown
(74) *Attorney, Agent, or Firm* — Oliff & Berridge, PLC

(57) ABSTRACT

A main control portion of a vehicle has an LF transmission antenna for transmitting a search signal. The LF transmission antenna has five antennas respectively provided on door knobs of the vehicle. A smart key receives the search signals transmitted from respective antennas constituting the LF transmission antenna, and then measures a filed strength of the received search signal. The smart key transmits field strength information representing the measured field strength to the main control portion. The main control portion calculates relative position information of the vehicle to the smart key, based on the field strength information. On the basis of the relative position information, the main control portion controls the door of the vehicle to be locked or unlocked.

4 Claims, 57 Drawing Sheets

FIG. 6A

| D SEAT ANTENNA \ P SEAT ANTENNA | FIELD STRENGTH a ~ b | FIELD STRENGTH b ~ c | FIELD STRENGTH c ~ d |
|---|---|---|---|
| FIELD STRENGTH a ~ b | ( D4 ) ( D6 ) | . . . | . . . |
| FIELD STRENGTH b ~ c | ( F3 ) ( F7 ) | . . . | . . . |
| FIELD STRENGTH c ~ d | . . . | . . . | . . . |

FIG. 6B

| RL SEAT ANTENNA \ P SEAT ANTENNA | FIELD STRENGTH a ~ b | FIELD STRENGTH b ~ c | FIELD STRENGTH c ~ d | |
|---|---|---|---|---|
| FIELD STRENGTH a ~ b | ( D4 ) ( G4 ) | . . . | . . . | |
| FIELD STRENGTH b ~ c | ( F3 ) ( K3 ) | . . . | . . . | |
| FIELD STRENGTH c ~ d | . . . | . . . | . . . | |
| | . . . | . . . | . . . | |

VEHICLE CONTROL SYSTEM AND VEHICLE CONTROL APPARATUS

This is a Continuation-in-Part of the U.S. Patent Application entitled "VEHICLE CONTROL SYSTEM AND VEHICLE CONTROL APPARATUS" (Ser. No. 11/598,048) to Matsubara et al., filed Nov. 13, 2006, which claims priority of Japanese Patent Applications Nos.: 2005-327970, filed Nov. 11, 2005, 2005-339159, filed Nov. 24, 2005, and 2005-342958, filed Nov. 28, 2005. The disclosures of the prior applications are hereby incorporated by reference in their entirety.

FIELD OF THE INVENTION

The present invention relates generally to a vehicle control system capable of remotely controlling a vehicle through wireless communication, for example, to a technology applicable to a smart entry system in order to simplify the key manipulation of a vehicle or to eliminate the key manipulation.

Further, the invention relates to a vehicle control apparatus, for example, to a technology in which authentication is performed through radio waves according to the relative position between a vehicle and a portable device to remotely control the vehicle.

In the invention, a driving source includes an engine and a drive motor.

DESCRIPTION OF THE RELATED ART

As shown in Japanese Unexamined Patent Publication JP-A 2002-77972, for example, there has been a wireless apparatus having a main body installed in a vehicle, and a portable device for performing wireless communication with the main body. To be specific, the technology has been put in practice that the main body controls the locking or unlocking of a vehicle based on whether a user carrying the portable device is getting on or off the vehicle. The main body transmits three types of signals for detecting the portable device, the transmission power levels of which are different, from two antennas installed in the width direction of the vehicle to the portable device. When receiving the signals for detecting the portable device, the portable device transmits the received data of reception strength to the main body. The main body determines the position of the portable device based on the relationship between the reception strength data and the transmission power level of the signals for detection of the portable device. On the basis of the determined position of the portable device, the main body determines whether a user carrying the portable device gets on the vehicle or the user gets off the vehicle.

In the main body according to the related art, the position of the portable device in the width direction of a vehicle can be determined, but the position of the portable device in the traveling direction of the vehicle can not be determined. For example, when the portable device is located in front of the vehicle in the traveling direction of the vehicle, the main body can not determine whether the portable device is located within the vehicle or not. Therefore, although the portable device is located outside the vehicle, a determination that the portable device is within the vehicle may be made to lock or unlock the vehicle. To the contrary, although the portable device is located within the vehicle, it may be erroneously determined that the portable device is outside the vehicle. In this case, it is conceivable that, when a user leaves the portable device in the vehicle and moves away from the vehicle, the vehicle may be undesirably locked. Furthermore, the main body according to the related art can determine the position of the potable device within the range of the vehicle in the width direction of the vehicle, but can not determine the position of the potable device outside the range of the vehicle in the width direction of the vehicle.

Furthermore, according to the related art, the position of the portable device can be detected only when two antennas have respectively transmitted three times the signals for detection of the portable device, the transmission power levels of which are different, that is, only when the signals are transmitted six times, and it therefore requires a long time for checking the position as well as more complicated process of checking the position.

Further, as disclosed in JP-A 2002-77972, a technology for detecting first whether the portable device is located within or outside a vehicle and then controlling door lock operation has been put in practice. In the related art, an antenna for outside the vehicle and an antenna for inside the vehicle are provided on a vehicle, and a door lock control apparatus determines whether the portable device is located within the coverage area of those antennas.

In the related art, it is impossible to distinguish between a case where radio waves are cut off due to battery shutoff, propagation obstacle, shielding (hereinafter collectively referred to as battery shutoff) of the portable device located within the vehicle, and a case where the portable device is too far away from the vehicle to transmit/receive radio wave. When radio waves are cut off due to battery shutoff of the portable device within the vehicle, it is erroneously determined that the portable device is outside the vehicle, resulting in undesirable locking of the door. This impedes automation of door locks.

Also in a case where radio waves are cut off due to battery shutoff of the portable device during start-up of a driving source such as the drive motor of a vehicle, it is impossible to identify the cause of the cut-off; the battery shutoff or a position of the portable device too far away from the vehicle. It may not be possible to stop the driving source even in a state where the portable device is actually away from the vehicle, thus resulting in a deteriorated degree of security.

Furthermore, as disclosed in Japanese Unexamined Patent Publications JP-A 10-317754 (1998), JP-A 2003-269027, and JP-A 2001-115706, for example, a technology has been put in practice that, in a smart entry system for a vehicle, a plurality of transmission antennas are provided in the circumference of the vehicle in order to monitor the circumference of the vehicle, and the circumference of the vehicle is monitored by use of radio waves periodically transmitted from the respective antennas. In the technique, the constant monitoring of the circumference of the parked vehicle allows early detection of a driver or the like approaching the vehicle so that, for example, the temperature within the vehicle starts to be adjusted before the driver reaches the vehicle.

In JP-A 10-317754 is disclosed a technology of transmitting transmission request signals at different transmission time points through a plurality of transmission antennas, and receiving a response signal transmitted by a portable device, thereby identifying the position of a door which the portable device approaches. In JP-A 2003-269027 is disclosed a technology of turning off a lighting device and setting a security device to be operable when a driver or the like is away from the vehicle. In JP-A 2001-115706 is disclosed a technology of providing a relay in the output of a transmitter and controlling the relay to change the output of the transmitter through the outdoor antenna and indoor antenna of a vehicle.

In the conventional smart entry system, the circumstance of a vehicle is monitored by use of radio waves periodically transmitted from respective transmission antennas, but, when the vehicle is left alone for a long time, the battery of the vehicle is continuously discharged, which may cause a so-called dead battery. Also, in JP-A 10-317754, the transmission request signals are required to be sequentially transmitted from the plurality of transmission antennas, so that the load of the vehicle battery increases.

SUMMARY OF THE INVENTION

An object of the invention is to provide a vehicle control system by which a precision level can be enhanced in detecting a position of a portable unit relative to a vehicle without requiring a complicated process.

Another object of the invention is to provide a vehicle control apparatus capable of securely controlling a vehicle.

Still another object of the invention is to provide a vehicle control apparatus capable of reducing power consumption given to a main control portion and a portable unit, allowing decrease in load on either one of a vehicle battery and a battery of the portable unit.

The invention provides a vehicle control system comprising:

a portable unit for receiving radio waves transmitted through a plurality of antennas, measuring field strengths of the radio waves transmitted through the respective antennas, and transmitting the field strength of the respective antennas; and a main control portion disposed on a vehicle, having at least three antennas disposed at different positions on the vehicle, the antennas being capable of transmitting radio waves to the portable unit and receiving radio waves from the portable unit through wireless communication, the main control portion calculating, based on the field strength, relative position information of the portable unit to the vehicle.

According to the invention, the portable unit receives radio waves transmitted from at least three antennas and measures the respective field strengths of the radio waves. The field strengths of the radio waves are attenuated in proportion to the propagation distance of the radio waves, so that field strength information includes information representing the distance between the portable unit and the respective antennas. The relative positions of the portable unit to the respective antennas are determined based on the distances between the portable unit and the three antennas, and as compared to the related art, the main control portion can more precisely calculate the relative position information of the portable unit to the vehicle based on the field strengths of the respective antennas, without requiring a complicated process.

Further, in the invention, it is preferable that the main control portion further controls a locking section based on the relative position information.

According to the invention, the main control portion controls the locking section around the relative position of the portable unit. The relative position of the portable unit to the vehicle is changed depending on the movement of a user carrying the portable unit. The locking section is controlled depending on the movement of the user carrying the portable unit. For example, when the user carrying the portable unit moves away from the vehicle, the locking section is controlled to lock the doors. Even when the user leaves the portable means within the vehicle and moves out of the vehicle and then goes away from the vehicle, undesirable locking of the vehicle is not performed. The control of the locking section is thus performed reliably based on the relative position information of the portable unit.

The invention provides a vehicle control apparatus comprising:

a main control portion disposed on a vehicle, including a search signal transmitting section for transmitting search signal for detecting a portable unit; and a detecting section for detecting, based on a response signal sent back by the portable unit in response to the search signal, a relative position of the portable unit to the vehicle in a vehicle-inside area and a vehicle-outside area which are an acceptable range in which the portable unit receives the search signal, wherein the vehicle is controlled when the detecting section detects that a position of the portable unit is shifted from an out-of-range to a vehicle-outside area, or shifted from the vehicle-outside area to the out-of-range, or shifted within the vehicle-outside area.

According to the invention, the vehicle is controlled when the detecting section detects that a position of the portable unit is shifted from an out-of-range to a vehicle-outside area, or shifted from the vehicle-outside area, or shifted within the vehicle-outside area. In inverse, when the position information of the portable unit cannot be detected as described above, the control (for example, locking) is not performed, so that the vehicle is free from undesirable control even when a user moves out of the vehicle leaving the portable device within the vehicle. The control of the vehicle can be reliably performed.

Further, in the invention, it is preferable that the detecting section can detect a position of the portable unit within the vehicle, and when the position cannot be detected, controlling the vehicle is prohibited.

According to the invention, the position of the portable unit within the vehicle can be detected, so that the main control portion can perform a control of the vehicle in consideration of the position of the portable unit moving from the vehicle-inside area to the vehicle-outside area. Therefore, the reliability for the remote control of the vehicle can be enhanced. Further, when the position cannot be detected, controlling the vehicle is prohibited, with the result that undesired locking can be reliably prevented in a state where the portable unit is within the vehicle, even when the radio waves between the vehicle and the portable unit are cut off due to a battery shutoff or the like factor.

Further, in the invention, it is preferable that the detecting section can detect a position of the portable unit within the vehicle, and when a detection state that a position of the portable unit within the vehicle is detected by the detecting section is shifted to a non-detection state that a position of the portable unit cannot be detected by the detecting section, controlling the vehicle is prohibited.

According to the invention, the detecting section can detect a position of the portable unit within the vehicle, and when the detection state that the position of the portable unit within the vehicle can be detected by the detecting section is shifted to the non-detection state, the control of the vehicle is prohibited, with the result that undesired locking can be reliably prevented in a state where the portable unit is within the vehicle, even when the radio waves between the vehicle and the portable unit are cut off due to a battery shutoff or the like factor.

Further, in the invention, it is preferable that the vehicle control apparatus further comprises a suppressing section that suppresses output of the response signal when it is detected that the position of the portable unit is not shifted or changed.

According to the invention, when the detecting section detects that the position of the portable unit, the output of response signal is suspended for a predetermined length of time, so that power consumption of the portable unit can be reduced. The battery of the portable unit can be therefore prevented as much as possible from being exhausted. The lifetime of the battery of the portable unit can be thus made longer than that of the related art. To the contrary, when the portable unit is located within the vehicle-outside area in the acceptable range in which the portable unit receives the search signal, the output of response signal from the portable unit is not suspended for a predetermined length of time, so that the convenience of the user can be prevented from being deteriorated.

Further, in the invention, it is preferable that the suppressing section prolongs an output cycle of the search signal.

According to the invention, the suppressing section prolongs the output cycle of the search signal, thus allowing reduction in power consumption of the portable unit per unit time. Therefore, the load on the battery of the portable unit can be reduced.

The invention provides a vehicle control apparatus comprising:

a plurality of transmission antennas for transmit a search signal for detecting a portable unit which can communicate with the antennas;

a reception antenna for receiving a response signal which is sent back by the portable unit in response to the search signal; and an antenna limiting section for limiting a part of the transmission antennas that transmits the search signal.

Further, in the invention, it is preferable that the antenna limiting section limits a part of the transmission antennas that transmits the search signal, based on a length of lapse time when the antenna limiting section receives no response signal through the reception antenna.

According to the invention, the antenna limiting section limits the part of the transmission antennas that transmits the search signal, based on a length of lapse time that the antenna limiting section receives no response signal through the reception antenna, so that power consumption of the vehicle control apparatus can be reduced. Therefore, the load on the battery of the vehicle can be reduced.

Further, in the invention, it is preferable that the vehicle control apparatus further comprises a voltage monitoring section for monitoring battery power of a vehicle, wherein the antenna limiting section limits a part of the transmission antennas that transmits the search signal, based on the battery power monitored by the voltage monitoring section.

Furthermore, according to the invention, the antenna limiting section limits the part of the transmission antennas that transmits the search signal, based on the battery power monitored by the voltage monitoring section, so that the load on the battery of the vehicle can be reliably reduced. It is thus possible to prevent the battery of the vehicle as much as possible from being exhausted while the vehicle is not used.

BRIEF DESCRIPTION OF THE DRAWINGS

Other and further objects, features, and advantages of the invention will be more explicit from the following detailed description taken with reference to the drawings wherein:

FIGS. 6A and 6B are pattern diagrams illustrating position correspondence information which associates field strength information of respective antennas with relative position information of the smart key, and FIG. 6A is a view illustrating a map which stores the position correspondence information corresponding to the field strength information of search signals transmitted at a certain level of constant transmission power from a D seat antenna and a P seat antenna, and FIG. 6B is a view illustrating a map which stores the position correspondence information corresponding to the field strength information of search signals transmitted at a certain level of constant transmission power from a P seat antenna and the RL seat antenna;

FIG. 8A is a view illustrating the field strength saturated more than an upper limit strength Eu and the field strength lower than a lower limit strength $E_{LOW}$, and FIG. 8B is a view illustrating a state in which the field strength E is adjusted to be higher than the lower limit strength $E_{LOW}$ and lower than the upper limit strength Eu;

DETAILED DESCRIPTION

Figure 1:
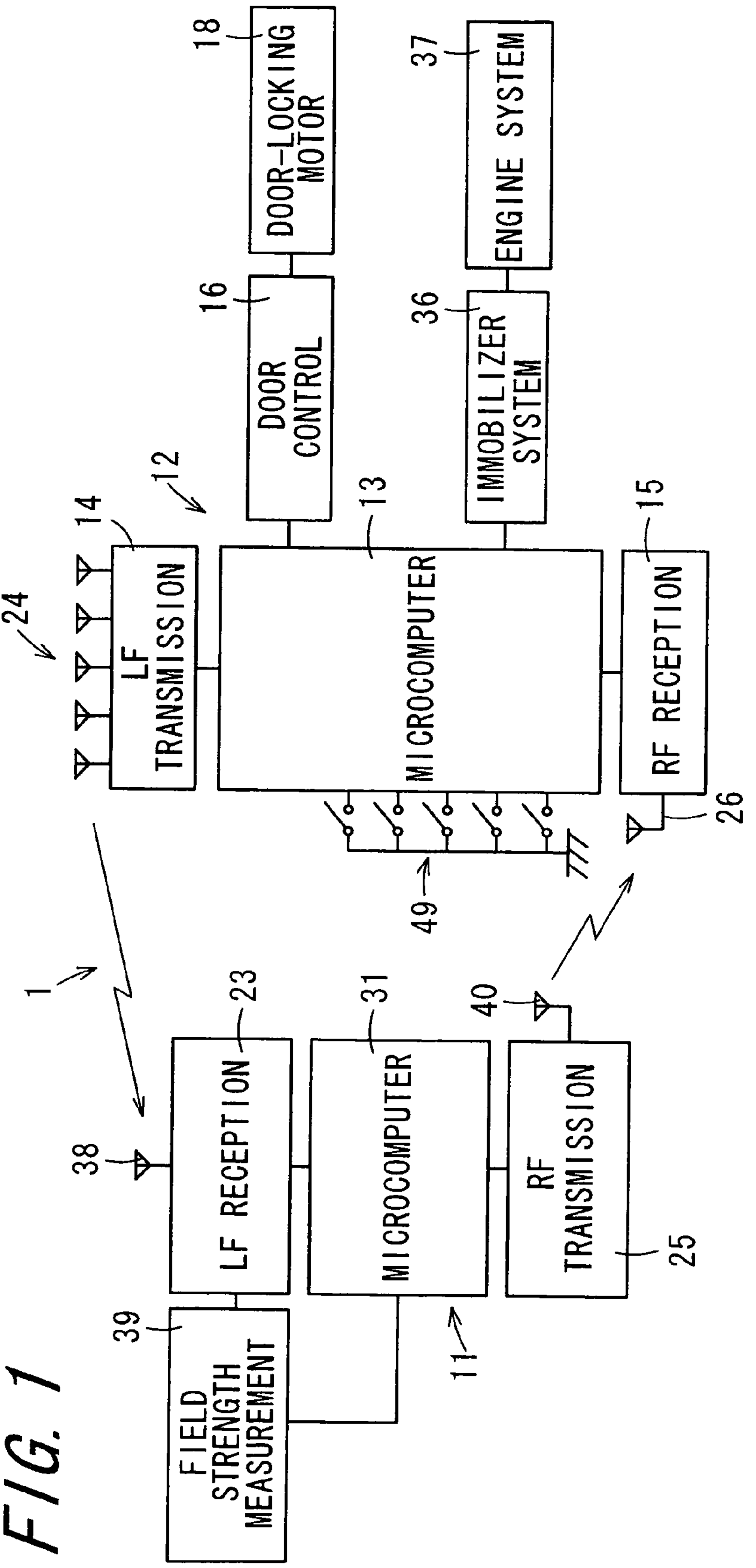
FIG. 1 is a block diagram illustrating the construction of a keyless entry system including a vehicle control system according to one embodiment of the invention.

Now referring to the drawings, preferred embodiments of the invention are described below.

Embodiment 1

A plurality of embodiments for implementing the invention are described with reference to the drawings. In the respective embodiments, parts corresponding to the matters described in the preceding embodiment are denoted by the same reference numerals or symbols, and overlapping description thereof may be omitted. When only a part of the configuration is described, the rest of the configuration of the embodiment is similar to that of the preceding embodiment. The invention is not limited to the combinations of parts described in the respective embodiments, and parts of two or more embodiments may be combined with one another as long as the combination does not cause a particular problem.

Figure 2:
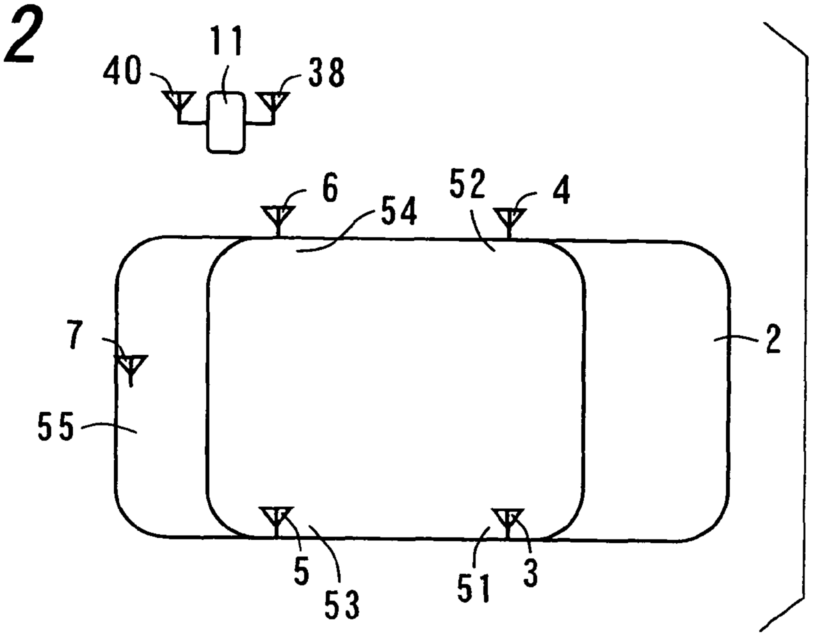
FIG. 2 is a pattern diagram illustrating the relationship between a vehicle and a smart key.

FIG. 1 is a block diagram illustrating the construction of a keyless entry system including a vehicle control system 1 according to one embodiment of the invention. FIG. 2 is a pattern diagram illustrating the position relationship between a vehicle 2 and a smart key 11 that is a portable unit. The vehicle control system 1 includes the smart key 11 and main control portion 12*a* main control portion 12. The main control portion 12 is installed in the vehicle 2 which is a four wheel vehicle, for example. The smart key 11 can move relatively to the vehicle 2, and the user of the vehicle 2 can carry it. The smart key 11 and the main control portion 12 are configured to wirelessly communicate with each other using the radio wave signal.

The keyless entry system acts as so called a smart entry system, and performs control, such as locking and unlocking the door of a vehicle 2 based on wireless communication between a smart key 11 and a main control portion 12. The keyless entry system includes a vehicle control system 1, a door control portion 16, a door-locking motor 18, an immobilizer system 36, an engine system 37, and a courtesy switch 49. The door control portion 16, the door-locking motor 18, the immobilizer system 36, the engine system 37 and the courtesy switch 49 are installed in the vehicle 2. Locking means is implemented by the door control portion 16 and the door-locking motor 18.

The main control portion 12 includes a main microcomputer 13, a Long Frequency (LF) transmission portion 14, an LF transmission antenna 24, a Radio Frequency (RF) reception portion 15, an RF reception antenna 26.

The main microcomputer 13 includes a central processing unit (CPU for short), a ROM (read only memory) and a RAM (random access memory) serving as storage portions, a bus, an input/output interface, and a timer. The CPU, the ROM, and the RAM each are electrically connected to the input/output interface via the bus. The main microcomputer 13 controls the door control portion 16, the immobilizer system 36, and the RF reception portion 15.

The main microcomputer 13 controls the LF transmission portion 14 so as to transmit radio wave signals as search signals for detection of the smart key 11 through the LF transmission antenna 24. The LF transmission antenna 24 is composed of at least three antennas. In the vehicle control system 1 of this embodiment, the LF transmission antenna 24 includes five antennas of a D seat antenna 3, a P seat antenna 4, a RR seat antenna 5, an RL seat antenna 6, and a back door antenna (which may be also referred to as a B antenna) 7. The D seat means a driver's seat. The P seat means a passenger's seat. The RR seat means a rear right seat. The RL seat means a rear left seat. "Right" is an end of the width direction of the vehicle. "Left" is another end of the width direction of the vehicle. The search signal includes an antenna code indicating which of the respective antennas 3 to 7 the search signal is transmitted from and the identification code (that is, the unique code of the smart key 11 identifying the smart key 11) for smart entry to be searched for.

The respective antennas 3 to 7 constituting the LF transmission antenna 24 are installed in the knob of a door which is a movable unit. In detail, the D seat antenna 3 is installed in the knob of the D seat door 51 of the driver's seat. The P seat antenna 4 is installed in the knob of the P seat door 52 of the passenger's seat. The RR seat antenna 5 is installed in the knob of the RR seat door 53 of the rear seat in the traveling direction of the vehicle 2 with respect to the driver's seat. The RL seat antenna 6 is installed in the knob of the RL seat door 54 of the rear seat in the traveling direction of the vehicle 2 with respect to the passenger's seat. The back door antenna 7 is installed in the knob of the back door 55 of the trunk. The main microcomputer 13 controls the LF transmission portion 14 so as to transmit search signals respectively through five antennas 3 to 7 constituting the LF transmission antenna 24. Furthermore, the main microcomputer 13 controls the field strength of the search signals transmitted from the LF transmission antenna 24 by controlling the LF transmission portion 14. Therefore, the main microcomputer 13 can control a coverage area in which the smart key 11 can receive the search signal from the LF transmission antenna 24. The main microcomputer 13 controls the field strength of the search signals from the respective antennas 3 to 7 such that the smart key 11 can receive the search signals transmitted from at least three antennas constituting the LF transmission antenna 24 when the smart key 11 is located around the D seat door 51, the P seat door 52, the RR seat door 53, the RL seat door 54 and back door 55 and with in the vehicle 2. The frequency of the search signals transmitted from the LF transmission antenna 24 is a relatively low frequency, which is 125 kHz or more and 135 kHz or less, for example.

The main microcomputer 13 controls the RF reception portion 15 so as to receive as response signals the radio wave signals which are transmitted from the smart key 11 and acquired through the RF reception antenna 26. The frequency of the response signals that can be acquired through the RF reception antenna 26 is a relatively high frequency of 433 MHz, for example. The main microcomputer 13 controls the door control portion 16 based on the unique smart entry identification code of the smart key 11 and the later-described field strength information corresponding to the search signals transmitted from the respective antennas 3 to 7 constituting the LF transmission antenna 24, which are included in the response signal transmitted from the smart key 11, to drive the door-locking motor 18 and then performs the locking or unlocking of a door. Furthermore, the main microcomputer 13 controls the immobilizer system 36 based on the immobilizer identification code, which is inherent to the smart key 11 and included in the response signal by the smart key 11.

The smart key 11 includes a portable microcomputer 31, the LF reception portion 23, an LF reception antenna 38, a field strength measurement portion 39, the RF transmission portion 25, and an RF transmission antenna 40. The portable microcomputer 31 includes the central processing unit (CPU for short), the ROM and RAM serving as a storage portion, the bus, the input/output interface, and the timer. The CPU, the ROM, and the RAM each are electrically connected to the input/output interface via the bus. The portable microcomputer 31 controls the LF reception portion 23, the field strength measurement portion 39, and the RF transmission portion 25. The storage portion, that is, the ROM of the portable microcomputer 31 stores smart entry identification information (the smart entry identification code) and immobilizer identification information (the identification code for immobilizer), which are inherent in the smart key 11. The field strength measurement portion 39 is electrically connected to the input/output interface via the LF reception portion 23. The RF reception portion 25 is electrically connected to the input/output interface.

The LF reception antenna 38 acquires the search signal transmitted from the LF transmission antenna 24. The frequency of the search signal, which can be acquired through the LF reception antenna 38 is a relatively low frequency, which is 125 kHz or more and 135 kHz or less, for example. Note that the radio frequency is not always limited to the above range. The portable microcomputer 31 controls the LF reception portion 23 so as to receive the search signal acquired through the LF reception antenna 38. The LF reception antenna 38 includes an X antenna, a Y antenna, and a Z antenna. The X antenna, the Y antenna, and the Z antenna are antennas having different directivities, which extend respectively, by a predetermined short length, in an X direction, a Y direction, and a Z direction. The X, Y and Z directions mean three-axis directions, which are mutually orthogonal.

In detail, the X, Y and Z antennas are arranged such that the directivities are different to each other by 90°. Therefore, regardless of the direction of the smart key 11 to the main control portion 12, the search signal transmitted from the main control portion 12 can be surely acquired. The field strength of the search signal acquired through the X antenna is referred to as a first strength Px, the field strength of the search signal acquired through the Y antenna is referred to as a second strength Py, and field strength of the search signal acquired through the Z antenna is referred to as a third strength Pz. The following formula (1) is used to calculate the field strength P of search signals acquired through the LF reception antenna 38. That is to say, the field strength P of the search signal acquired through the LF reception antenna 38 can be obtained by calculating the square root of sum of Px squared, Py squared, and Pz squared wherein Px represents the field strength of the search signal acquired through the X antenna, Py represents the field strength of the search signal acquired through the Y antenna, and Pz represents the field strength of the search signal acquired through the Z antenna. The field strength P of the search signal obtained by the formula (1) is not dependent on the direction of the smart key 11 with respect to the main control portion 12. That is, the field strength P of the search signal obtained by the formula (1) is not dependent on a manner in which the user carries the smart key 11.

$$P=\sqrt{Px^2+Py^2+Pz^2} \tag{1}$$

The search signal transmitted from the vehicle 2-side is each transmitted from the respective antennas 3 to 7 constituting the LF transmission antenna 24. The portable microcomputer 31 controls a field strength measurement portion 39 so as to measure the field strength of search signals respectively acquired through respective antennas constituting the LF reception antenna 38. The field strength information (representing the field strength data) respectively corresponding to the search signals which are transmitted from the respective antennas 3 to 7 constituting the LF transmission antenna 24 and are then acquired through the LF reception antenna 38, is given from the field strength measurement portion 39 to the portable microcomputer 31. The portable microcomputer 31 provides electric signals, such as the antenna code representing an antenna for transmitting the search signal, the field strength information of the search signal from the antenna and the smart entry identification code to the RF transmission portion 25, and controls the RF transmission portion 25 to transmit as response signals the radio wave signals including the antenna code, the field strength information and the smart entry identification code through the RF transmission antenna 40. The frequency of the response signals transmitted from the RF transmission antenna 40 is a relatively high frequency which is 433 M, for example. Note that the radio frequency is not always limited to the above range.

In addition, identification information included in the response signals transmitted by the smart key 11 is an smart entry identification code in the case of responding to general search signals, and are two pieces of identification information of an smart entry identification code and an identification code for immobilizer in the case of responding to search signals for the immobilizer verification.

The main control portion 12 receives the response signals transmitted by the smart key 11, and based on the smart entry identification code, recognizes that the response signals have been transmitted from the smart key 11, thereafter calculating a distance from the respective antennas 3 to 7 constituting the LF transmission antenna 24 to the smart key 11, that is, the relative position information of the smart key 11 to the vehicle 2, based on the antenna code and the field strength included in the response signal.

Figure 3:
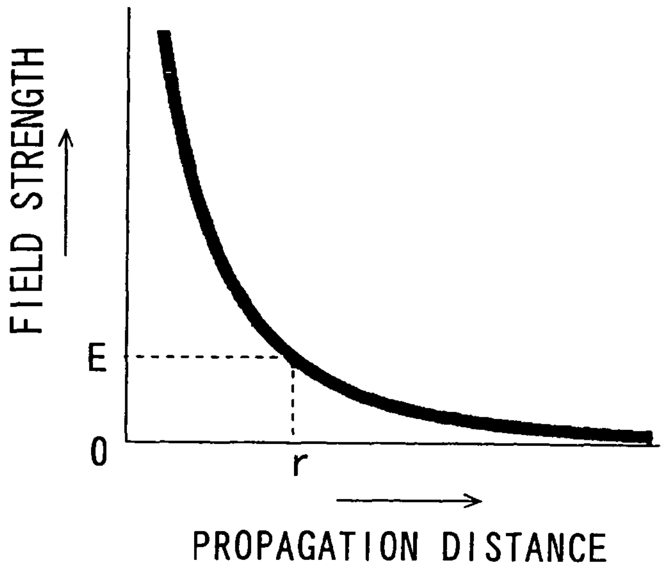
FIG. 3 is a graph illustrating the relationship between a propagation distance r of radio waves and a field strength E when the radio wavers are transmitted at a certain level of constant transmission power.

FIG. 3 is a graph illustrating the relationship between the propagation distance r of radio waves and the field strength E when radio waves are transmitted at a certain level of constant transmission power. A vertical axis represents the field strength of the radio waves, and a horizontal axis represents the propagation distance of the radio waves. As shown in FIG. 3, the radio waves are attenuated in reverse proportion to the propagation distance r squared. The use of this relationship allows the distance between an antenna transmitting the search signal and the smart key 11 to be calculated from the field strength of the search signal received by the smart key 11. In FIG. 3, it can be seen that, for example, the field strength of the search signals at a position which the search signals are received, is represented as "E", and the position at which the search signals are received is away by a distance r from the position at which the search signals are transmitted. The field strength information represents the field strength of the search signals acquired through the LF reception antenna 38, and it is therefore possible to, based on the field strength information, calculate the distance between the LF reception antenna 38 and the LF transmission antenna 24. That is, the main control portion 12 receives the response signal transmitted from the smart key 11, and when the smart entry identification information contained in the response signal corresponds to the identification information stored in the main control portion 12, the main control portion 12 determines that the response signal is a proper response signal from the smart key 11 and is designed to be capable of calculating the distance between the respective antennas 3 to 7 and the smart key 11, that is, the relative position information of the smart key 11 to the vehicle 2. A program for calculating the relative position is stored in the main microcomputer 13.

Figure 4:
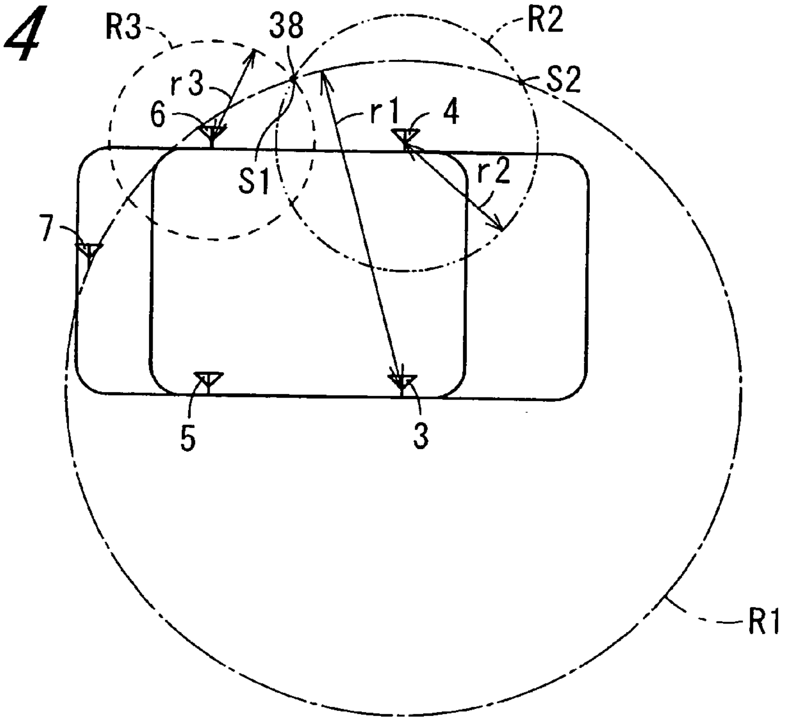
FIG. 4 is a pattern diagram illustrating the position relationship between an LF reception antenna and respective antennas of the vehicle.

FIG. 4 is a pattern diagram illustrating the position relationship between the LF reception antenna 38 and the respective antennas 3 to 7 of the vehicle. Theoretically, when the distance between the LF reception antenna 38 and the three antennas constituting the LF transmission antenna 24 is determined, the relative position of the LF reception antenna 38 to the LF transmission antenna 24 is determined. Descriptions will be given to a method of determining the relative position of the LF reception antenna 38, based on the distance between the D seat antenna 3, the P seat antenna 4 and the RL seat antenna 6 and the LF reception antenna 38.

The distance between the LF reception antenna 38 and the D seat antenna 3 which is determined based on the field strength information is denoted by r1, the distance between the LF reception antenna 38 and the P seat antenna 4 is denoted by r2, and the distance between the LF reception antenna 38 and the RL seat antenna 6 is denoted by r3. At the outset, assume a first circle R1, the radius of which is r1 and the center of which is the D seat antenna 3. The LF reception antenna 38 is located at a point on the circumference of the first circle R1. Thereafter, assume a second circle R2, the radius of which is r2 and the center of which is the P seat antenna 4. The LF reception antenna 38 is located at a point on the circumference of the first circle R1 and, at the same time, at a point on the circumference of the second circle R2, thereby being located at either one of two intersection points S1, S2 between the first circle R1 and the second circle R2. Then, assume a third circle R3, the radius of which is r3 and the center of which is the RL seat antenna 6. The LF reception antenna 38 is located at a point on the circumference of the first circle R1, at a point on the circumference of the second circle R2, and at a point on the circumference of the third circle R3, thereby being located at the intersection point S1 of three circles. As a result, the relative position of the LF reception antenna 38 to the LF transmission antenna 24 can be calculated based on the LF reception antenna 38 and three antennas constituting the LF transmission antenna 24.

Theoretically, the relative position information of the smart key 11 to the vehicle 2 can be calculated using the above-descried method. In the vehicle control system 1 according to one embodiment of the invention, however, the relative position information of the smart key 11 is calculated based on position correspondence information stored as a map in the storage portion of the main microcomputer 13.

Figure 5:
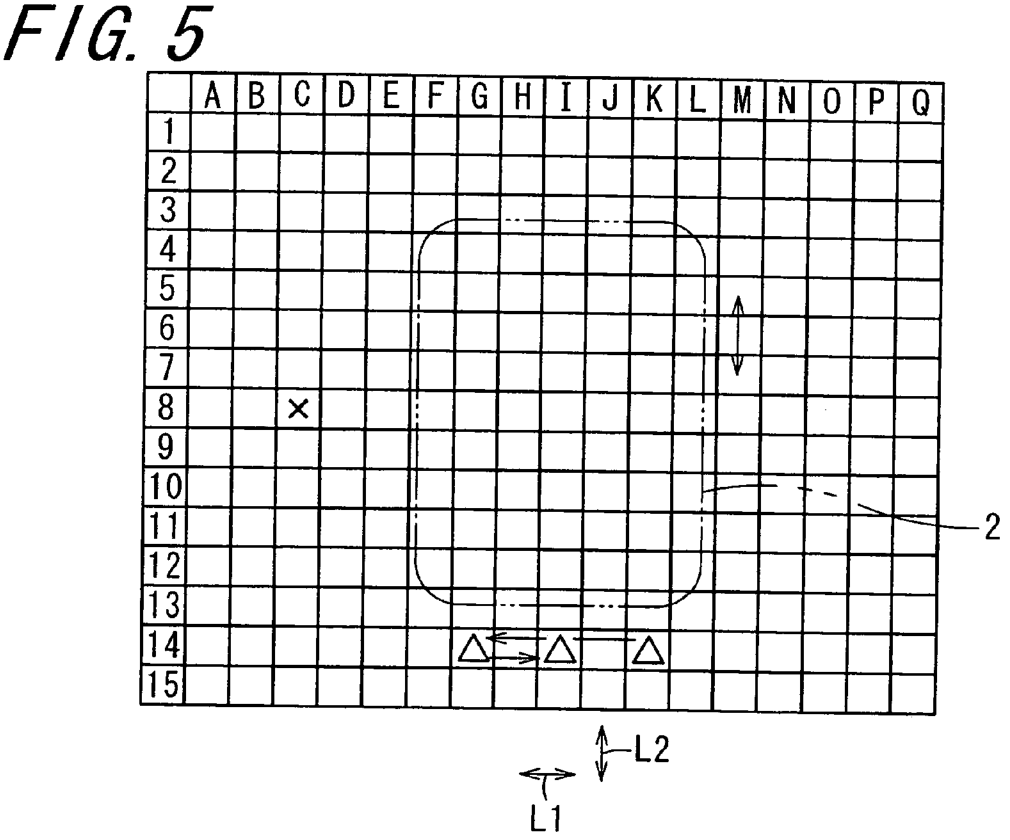
FIG. 5 is a pattern diagram illustrating a coordinate system set in the vehicle.

FIG. 5 is a pattern diagram illustrating a coordinate system set in the vehicle 2. In the vehicle 2 is set a mesh-shaped coordinate system which includes a plurality of rows parallel to the width direction L1 of the vehicle 2 and a plurality of columns parallel to the traveling direction L2 of the vehicle 2. The main microcomputer 13 serving as detecting means is designed to be capable of calculating the relative position information of the smart key 11 in the coordinate system set in the vehicle 2. In the coordinate system set in the vehicle 2, a square area specified by row n and column X are defined as (Xn). The symbol n represents a natural number, and the symbol X represents an alphabet. For example, in FIG. 5, an area indicated by a symbol "x" is referred to as (C8).

FIGS. 6A and 6B are pattern diagrams illustrating the position correspondence information which associates the field strength information of the respective antennas 3 to 7 with the relative position information of the smart key 11. FIG. 6A is a view illustrating a map which stores the relative correspondence information of the smart key 11 corresponding to the field strength information of the search signals transmitted at a certain level of constant transmission power from the D seat antenna 3 and the P seat antenna 4. FIG. 6B is a view illustrating a map which stores the relative correspondence information of the smart key 11 corresponding to the field strength information of the search signals transmitted from the P seat antenna 4 and the RL seat antenna 6 at a certain level of constant transmission power.

The position correspondence information is stored in the ROM of the main microcomputer 13, and the main control portion 12 is designed to be capable of calculating the relative position information of the smart key 11 based on this position correspondence information. The position correspondence information is information which associates the field strength information obtained through two selective antennas among the three antennas used upon calculation of the relative position information, with an area of the coordination system set in the vehicle 2. When the distances between the two selective antennas among the three antennas and the smart key 11 is determined, as described above, the position of the smart key 11 can be determined to either one of the two positions which are intersection points between two circles. Using this relationship, it can be seen that the smart key 11 is located in either position of (F3) or (F7) in FIG. 5, for example when the field strength information, that is, the position information of the smart key 11 corresponding to the search signal transmitted from the D antenna 3 indicates that the smart key 11 is located between b and c, and the field strength information, that is, the position information of the smart key 11 corresponding to the search signal transmitted from the P antenna 4 indicates that the smart key 11 is located between a and b. The relative correspondence information is information which associates such field strength information with the relative position information of the smart key 11.

Descriptions will be given to a method of calculating the relative position information of the smart key 11 in the case where the field strength information, that is, the position information of the smart key 11 corresponding to the search signal transmitted from the D seat antenna 3 indicates that the smart key 11 is located between b and c, the field strength information, that is, the position information of the smart key 11 corresponding to the search signal transmitted from the P seat antenna 4 indicates that the smart key 11 is located between a and b, and the field strength information, that is, the position information of the smart key 11 corresponding to the search signal transmitted from the RL seat antenna 6 indicates that the smart key 11 is located between b and c.

As described above, based on the field strength information obtained through the D seat antenna 3 and the P seat antenna 4, as shown in FIG. 6A, the smart key 11 is located at either position of (F3) or (F7) in FIG. 5. Next, based on the field strength information obtained through the P seat antenna 4 and the RL seat antenna 6, as shown in FIG. 6B, the smart key 11 is located at either position of (F3) or (K3) in FIG. 5. Therefore, it turns out that the smart key is located at the overlapping position of (F3) indicated by both pieces of the field strength information. Note that the number of these maps provided corresponds to the number of combination of selecting two antennas among all the antennas 3 to 7. In the present embodiment, there are five antennas of the antennas 3 to 7 and therefore, ten sorts of the map are previously provided.

Figure 7:
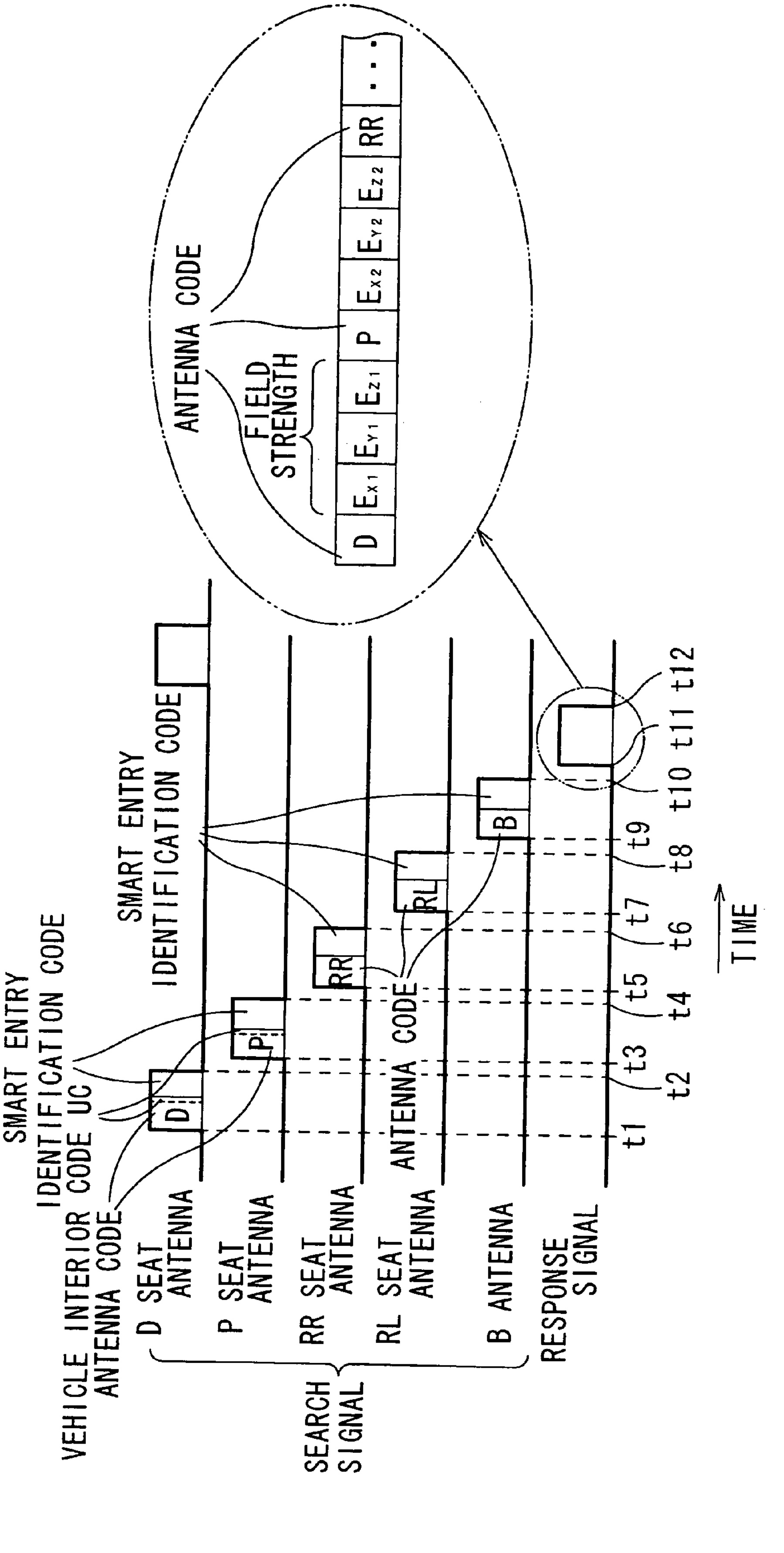
FIG. 7 is a timing-chart of search signals transmitted from respective antennas constituting an LF transmission antenna and response signals transmitted from an RF transmission antenna.

FIG. 7 is a timing-chart of the search signals transmitted from the respective antennas 3 to 7 constituting the LF transmission antenna 24 and the response signals transmitted from the RF transmission antenna 40. The main microcomputer 13 controls the LF transmission portion 14 so as to sequentially transmit the search signals through the respective antennas 3 to 7 constituting the LF transmission antenna 24 when performing the calculation of the relative position information of the smart key 11 to the vehicle 2. The main microcomputer 13 periodically performs the calculation of the relative position information at predetermined time intervals. The time intervals are counted by, for example, a timer of the main microcomputer 13. When the process is started, the main microcomputer 13 controls the LF transmission portion 14 so as to sequentially transmit the search signals through the respective antennas 3 to 7 constituting the LF transmission antenna 24 so that the transmissions are not simultaneously performed.

First, the main microcomputer 13 controls the LF transmission portion 14 so as to transmit the search signal including a D seat antenna code and the smart entry identification code through the D seat antenna 3 between time point t1 and time point t2. Thereafter, the main microcomputer 13 controls the LF transmission portion 14 so as to transmit the search signal including a P seat antenna code and the smart entry identification code through the P seat antenna 4 between time point t3 and time point t4. Next, the main microcomputer 13 controls the LF transmission portion 14 so as to transmit the search signal including an RR seat antenna code and the smart entry identification code through the RR seat antenna 5 between time point t5 and time point t6. Then, the main microcomputer 13 controls the LF transmission portion 14 so as to transmit the search signal including an RL seat antenna code and the smart entry identification code through the RL seat antenna 6 between time point t7 and time point t8. The main microcomputer 13 controls the LF transmission portion 14 so as to transmit the search signal including a back door antenna code and the smart entry identification code through the back door antenna 7 between time point t9 and time point t10.

Everytime X, Y and Z antennas constituting the LF reception antenna 38 acquire the search signals from the respective transmission antennas 3 to 7, the portable microcomputer 31 controls the field strength measurement portion 39 so as to measure the field strengths of the search signals acquired through the respective X, Y and Z antennas. When the field strengths of the search signals from all antennas 3 to 7 constituting the LF transmission antenna 24 are measured, the portable microcomputer 31 transmits through the RF transmission antenna 40 as response signals the field strength information of the search signals which are acquired through the respective X, Y and Z antennas constituting the LF reception antenna 38, between time point t11 and time point t12. That is, the response signals include the field strength information of the respective LF transmission antennas 24 which are pairs of the antenna codes (represented as "D", "P", "RR" etc. in FIG. 7) of the antenna transmitting the search signals and the field strength information (represented as "$E_{X1}$", "$E_{Y1}$", "$E_{Z1}$" etc. in FIG. 7) in the X, Y and Z directions corresponding to the antenna.

When the main microcomputer 13 receives the field strength information from the smart key 11, the main microcomputer 13 calculates the field strength of the search signal acquired through the LF reception antenna 38 by using the formula (1).

Furthermore, the measurement of the field strength using the formula (1) may be performed by the portable microcomputer 31. In this case, the field strength information of the respective transmission antennas 3 to 7, which is transmitted by the smart key 11 requires not three pieces of information of X, Y, and Z but only one piece of information which is obtained by the formula (1). Furthermore, the portable microcomputer 31 does not have to send back the response signal in one response to all the search signals transmitted from the respective transmission antennas 3 to 7, but may send back the response signal every time the portable microcomputer 31 receives a search signal.

Figure 8A:
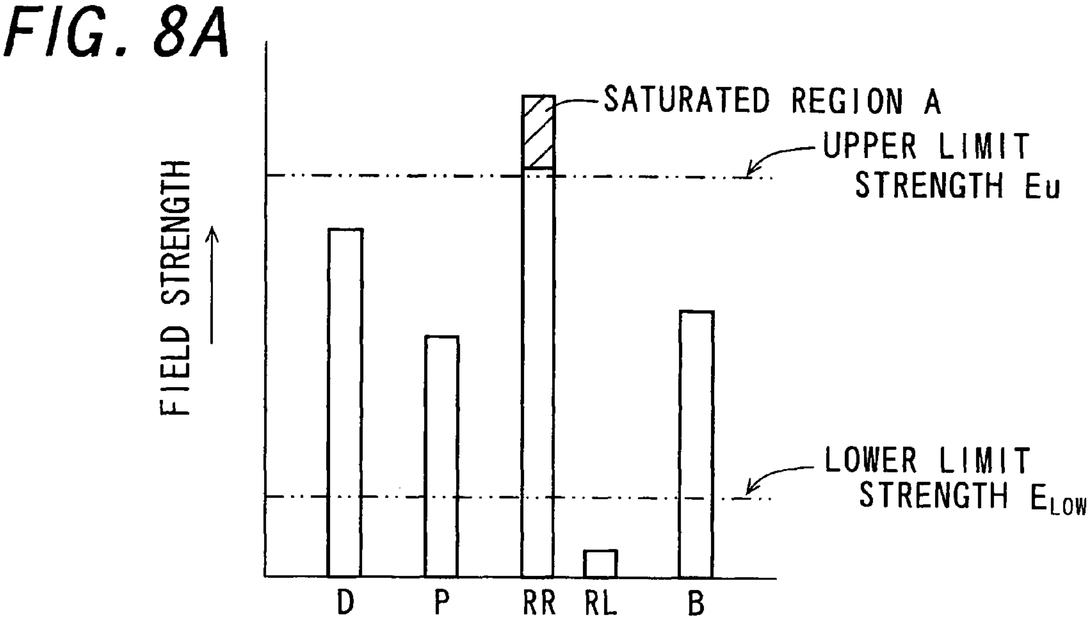
FIGS. 8A and 8B are views illustrating the relationship between respective antennas constituting an LF transmission antenna and field strengths of search signals which are transmitted from the respective antennas and are received by the smart key.
Figure 8B:
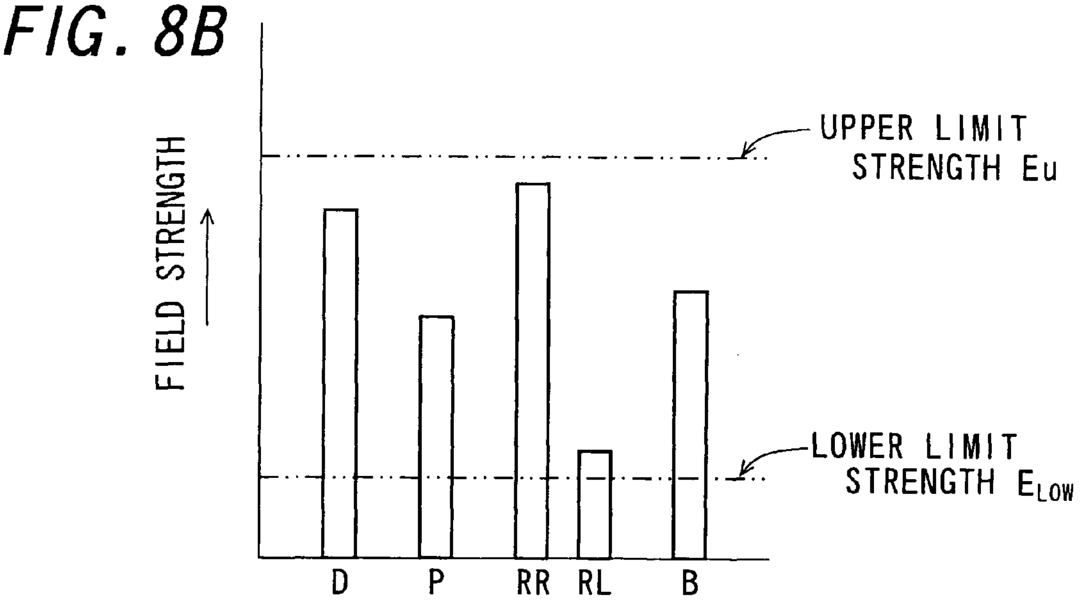

FIGS. 8A and 8B are view illustrating the relationship between the respective antennas 3 to 7 constituting the LF transmission antenna 24 and the field strengths E of the search signals which are transmitted from the respective antennas 3 to 7 and are received by the smart key 11. FIG. 8A is a view illustrating the field strength saturated more than the upper limit strength Eu and the field strength lower than the lower limit strength $E_{LOW}$. FIG. 8B is a view illustrating a state in which the field strength E is adjusted to be higher than the lower limit strength $E_{LOW}$ and lower than the upper limit strength Eu. In each of FIGS. 8A and 8B, the vertical axis represents the field strength of search signals received by the smart key 11. The field strength measurement portion 39 measures the field strength of search signals acquired through the LF reception antenna 38. When the field strength is too high, the measurement value is saturated, thus leading a failure in measuring correct field strength. In FIGS. 8A and 8B, the saturated area A shown with diagonal lines is a region in which the measurement value is saturated due to high field strength. In order to prevent the saturation of the measurement value, when the field strength of the search signal received by the smart key 11 is higher than a predetermined upper limit strength, the microcomputer 13 controls the LF transmission portion 14 so as to lower the field strength of the search signal which is too high. That is, the main microcomputer 13 lowers the transmission power of the search signal which is transmitted from the RR seat antenna 5. Specifically, the main microcomputer 13 decreases a voltage applied to the RR seat antenna 5 in order to decrease a current flowing in the RR seat antenna 5. The predetermined upper limit strength is set to a value lower than the field strength by which the measurement value is saturated (for example, a value equal to a MAX value of a dynamic range multiplied by "0.9").

Figure 9:
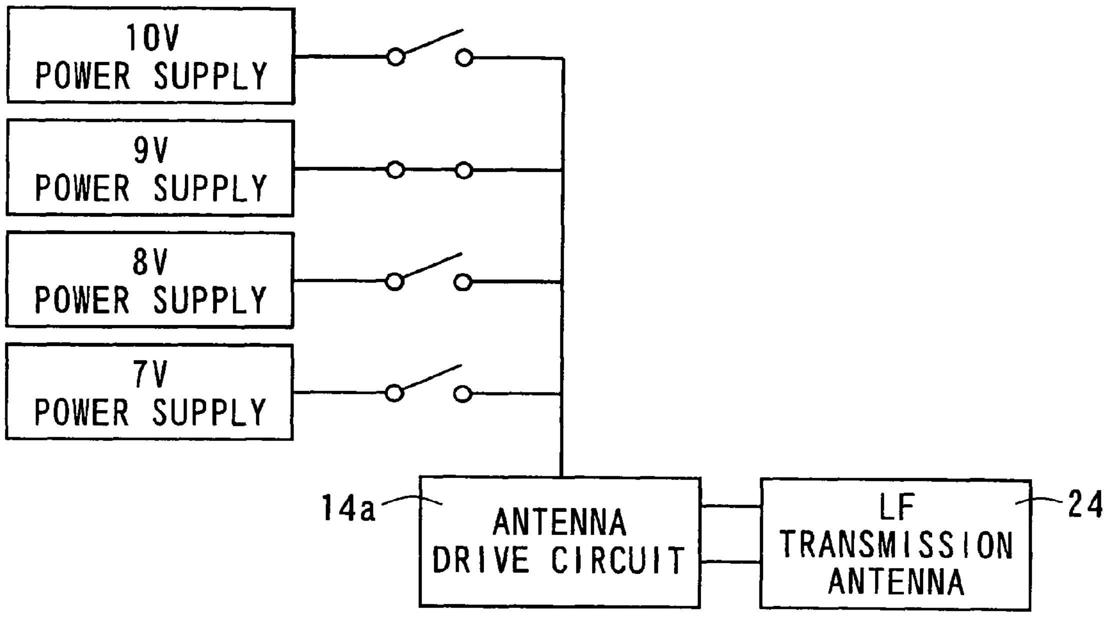
FIG. 9 is a view illustrating a construction for adjusting the field strengths of search signals transmitted from the respective antennas constituting the LF transmission antenna.

FIG. 9 is a view illustrating a construction for adjusting the field strength of search signals transmitted from the respective antennas 3 to 7 constituting the LF transmission antenna 24. The LF transmission portion 14 further includes an antenna drive circuit 14*a*. The antenna drive circuit 14*a* applies voltage to the LF transmission antenna 24, and flows alternating current to the LF transmission antenna 24, thereby transmitting the search signals from the LF transmission antenna 24. The voltage applied from the antenna drive circuit 14*a* to the LF transmission antenna 24 is determined by the voltage applied to the antenna drive circuit 14*a*. The voltage applied to the antenna drive circuit 14*a* can be selected from a plurality of voltage values. The main microcomputer 13 changes voltage applied to the LF transmission antenna 24 by changing the voltage applied to the antenna drive circuit 14*a*. Therefore, the main microcomputer 13 can adjust the field strength of search signals transmitted from the LF transmission antenna 24. FIG. 9 illustrates the state in which a voltage of 9 V is applied to the antenna drive circuit 14*a*.

Furthermore, the main microcomputer 13 controls the LF transmission portion 14 so as to increase the low field strength of the search signal when the field strength of the search signal received by the smart key 11 is lower than the predetermined lower limit strength $E_{LOW}$. In FIG. 8A, the main microcomputer 13 increases the transmission power of the search signal which is transmitted from the RL seat antenna 6 since the field strength of the search signal transmitted from the RL seat antenna 6 is lower than the lower limit strength $E_{LOW}$. Specifically, the main microcomputer 13 increases a voltage applied to the RR seat antenna 5 in order to increase a current flowing in the RL seat antenna 6. The predetermined lower limit strength is set to a value higher than the lower limit of the field strength in which the field strength measurement portion 39 is capable of measuring the field strength (for example, a value equal to a MAX value of a dynamic range multiplied by "0.1").

The main microcomputer 13 calculates relative position information based on the field strength information of the search signals acquired through the LF reception antenna 38, of which field strengths are the highest to the third highest in the field strength information of the field-strength-adjusted search signals transmitted from the respective antennas 3 to 7 constituting the LF transmission antenna 24. For example, in FIG. 8B, the field strength of the search signal which is transmitted from the RR seat antenna 5 and then acquired through the LF reception antenna 38 is the highest, the field strength of the search signal which is transmitted from the D seat antenna 3 and then acquired through the LF reception antenna 38 is the second highest, and the field strength of the search signal which is transmitted from the back door antenna 7 and then acquired through the LF reception antenna 38 is the third highest. In this case, based on the field strength information of the three search signals, which are transmitted from the D seat antenna 3, the RR seat antenna 5 and the back door antenna 7 and then acquired through the LF reception antenna 38, the relative position information is calculated.

When the field strength of the search signal transmitted from respective antennas 3 to 7 constituting the LF transmission antenna 24 is changed, it is necessary to change the formula for calculating the distance between the LF transmission antenna 24 and the LF reception antenna 38, or to correct the field strength information without correcting the formula and then apply the corrected field strength information to the formula. In the vehicle control system 1 of the embodiment, when the field strength of the search signal transmitted from the LF transmission antenna 24 is changed, the main microcomputer 13 multiplies the field strength by the field strength coefficient according to a voltage applied to the antenna drive circuit 14*a* to correct the field strength information. For example, when a voltage applied to the antenna drive circuit 14*a* is decreased from 10 V to 9 V to lower the field strength, the field strength information received by the smart key 11 becomes lower than the original value and therefore, the main microcomputer 13 multiplies the field strength by 1.1 as a correction coefficient to correct the field strength information. To the contrary, when a voltage applied to the antenna drive circuit 14*a* is increased from 9 V to 10 V, the main microcomputer 13 multiplies the field strength by 0.9 as a correction coefficient to correct the field strength information. The main microcomputer 13 relates this corrected field strength information to the position correspondence information to calculate the relative position information.

Figure 10A:
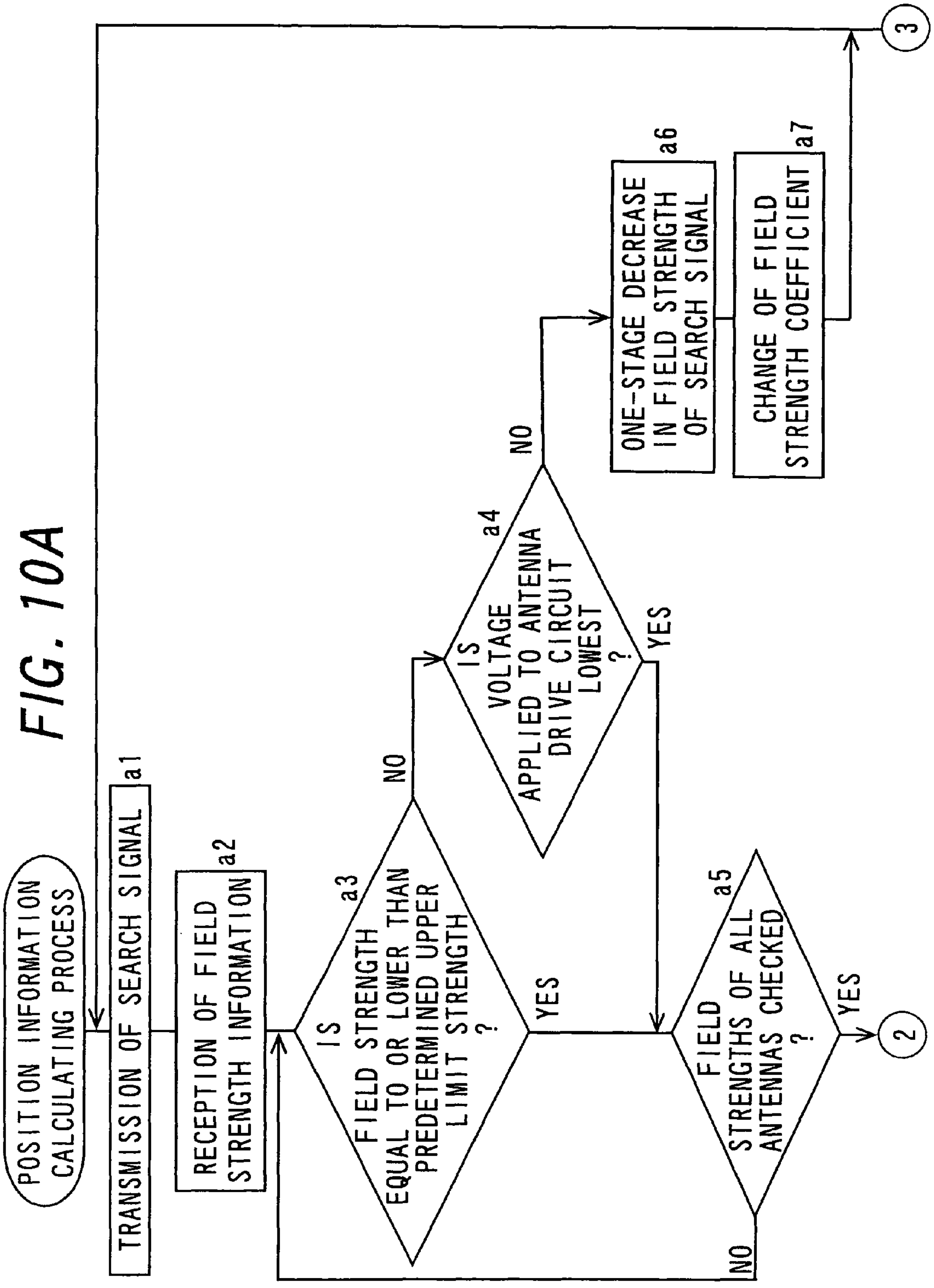
FIGS. 10A and 10B are flowcharts illustrating the sequence of a process of calculating the relative position information of the smart key to the vehicle by the main microcomputer.
Figure 10B:
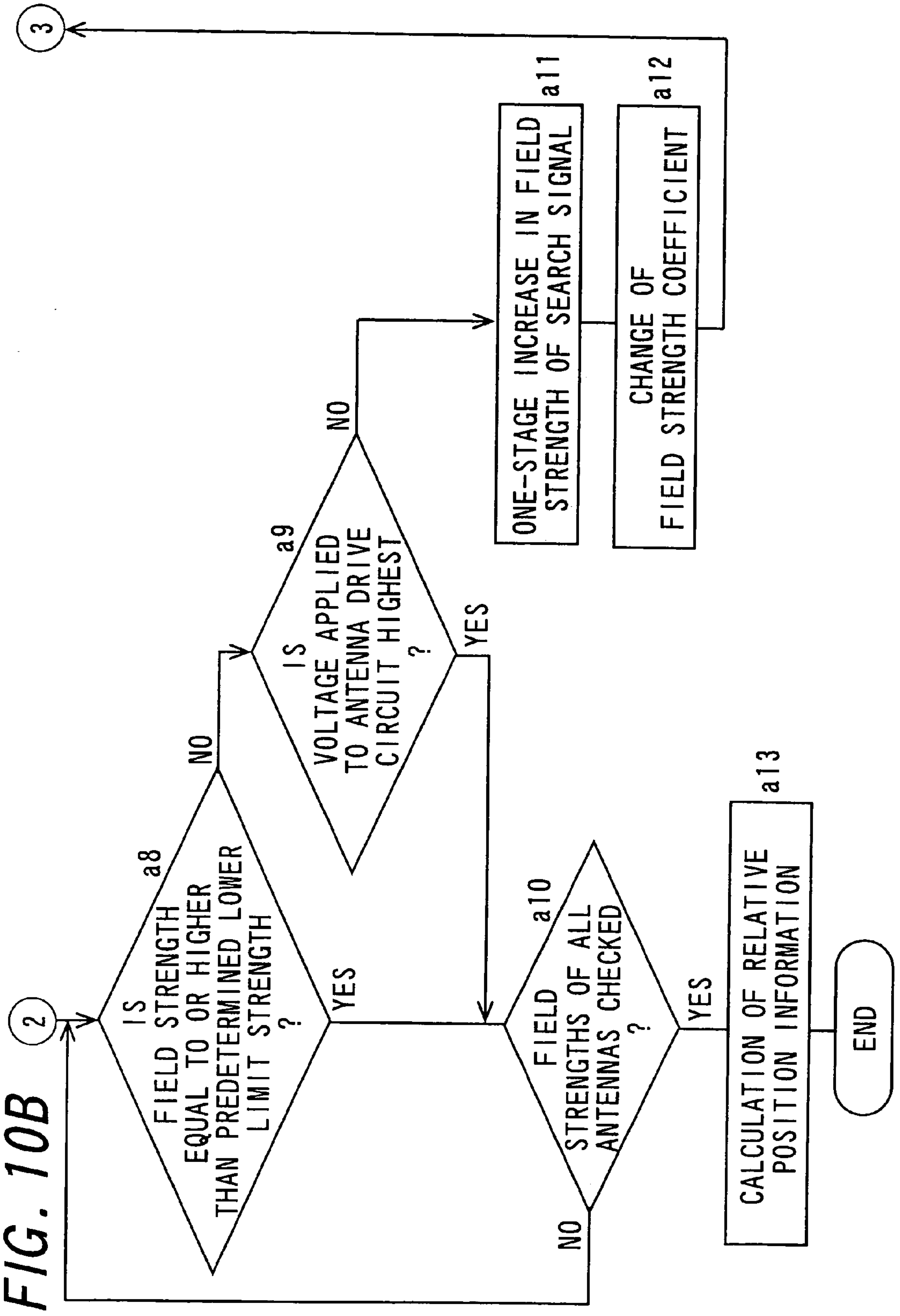

FIGS. 10A and 10B are flowcharts illustrating the sequence of a process of calculating the relative position information of the smart key 11 to the vehicle 2 by the main microcomputer 13. The process of calculating the relative position information is started, for example, upon emergence of an interrupt process to start a process of calculating the relative position information by use of the timer of the main microcomputer 13. First, at Step a1, the main microcomputer 13 controls the LF transmission portion 14 to sequentially transmit five search signals through the LF transmission antenna 24 as illustrated in FIG. 7.

Therefore, the portable microcomputer 31 controls the LF reception portion 23 so as to receive the search signals acquired through the LF reception antenna 38, controls the field strength measurement portion 39 so as to measure the field strength of the search signals acquired through the LF reception antenna 38, and controls the RF transmission portion 25 so as to transmit the field strength information represented in FIG. 7 as response signals through the RF transmission antenna 40.

Thereafter, at Step a2, the main microcomputer 13 controls the RF reception portion 15 so as to receive the response signals which are transmitted from the RF transmission antenna 40 and then acquired through the RF reception antenna 26, thereby receiving the field strength information. The process then proceeds to Step a3.

At Step a3, when the main microcomputer 13 determines that the field strength of the search signal which is transmitted by one of the respective antennas 3 to 7 constituting the LF transmission antenna 24 and is then acquired through the LF reception antenna 38 is higher than a predetermined upper limit strength Eu (indicated as "upper limit strength" in FIGS. 10A and 10B), the process proceeds to Step a4. When the main microcomputer 13 determines that the field strength of the search signal is equal to or lower than the upper limit strength Eu, the process proceeds to Step a5. At Step a4, the main microcomputer 13 determines whether or not the lowest voltage is being applied to the antenna drive circuit 14*a* for driving the antenna transmitting the search signal of which field strength is higher than the predetermined upper limit strength Eu, and when it is determined that the voltage is the lowest, the process proceeds to Step a5, and when it is determined that the voltage is not the lowest, the process proceeds to Step a6. At Step a6, the main microcomputer 13 changes the voltage being applied to the antenna drive circuit 14*a*, thereby attaining one-stage decrease in the field strength of the search signal transmitted by the antenna transmitting the search signal of which field strength is higher than the predetermined upper limit strength Eu, and then the process proceeds to Step a7. At Step a7, the main microcomputer 13 changes the field strength coefficient for the antenna transmitting the search signal of which field strength is decreased at Step a6, and then the process proceeds to Step a1 at which the search signal is transmitted once again.

At Step a5, the main microcomputer 13 determines whether or not all the field strength information of the search signals transmitted from the respective antennas 3 to 7 constituting the LF transmission antenna 24 have been compared in strength with the predetermined upper limit strength Eu at Step a3, and when it is determined that the field strength information of all the antennas has been compared with the predetermined upper limit strength Eu, the process proceeds to Step a8. When there still remains the field strength information of any one of the antennas, which has not been compared with the predetermined upper limit strength Eu, the process proceeds to Step a3.

At Step a8, when the main microcomputer 13 determines that the field strength of the search signal which is transmitted from one of the respective antennas 3 to 7 constituting the LF transmission antenna 24 and is then acquired through the LF reception antenna 38, is lower than a predetermined lower limit strength $E_{LOW}$ (indicated as "lower limit field strength" in FIGS. 10A and 10B), the process proceeds to Step a9. When it is determined that the field strength is equal to or higher than the lower limit field strength $E_{LOW}$, the process proceeds to Step a10. At Step a9, the main microcomputer 13 determines whether or not the lowest voltage is being applied to the antenna drive circuit 14*a* for driving the antenna transmitting the search signal of which field strength is lower than the predetermined lower limit strength $E_{LOW}$, and when it is determined that the voltage is the highest, the process proceeds to Step a10, and when it is determined that the voltage is not the highest, the process proceeds to Step a11. At Step a11, the main microcomputer 13 changes the voltage being applied to the antenna drive circuit 14*a*, thereby attaining one-stage increase in the field strength of the search signal transmitted by the antenna transmitting the search signal of which field strength is lower than the predetermined upper limit strength $E_{LOW}$, and then the process proceeds to Step a12. At Step a12, the main microcomputer 13 changes the field strength coefficient for the antenna transmitting the search signal of which field strength is increased at Step a11, and then the process proceeds to Step a1 at which the search signal is transmitted once again.

At Step a10, the main microcomputer 13 determines whether or not all the field strength information of the search signals transmitted from the respective antennas 3 to 7 constituting the LF transmission antenna 24 have been compared in strength with the predetermined lower limit strength $E_{LOW}$ at Step a8, and when it is determined that the field strength information of all the antennas has been compared with the predetermined lower limit strength $E_{LOW}$, the process proceeds to Step a13. When there still remains the field strength information of any one of the antennas, which has not been compared with the predetermined lower limit strength $E_{LOW}$, the process proceeds to Step a8.

At Step a13, the main microcomputer 13 calculates the relative position information of the smart key 11 to the vehicle 2 based on the field strength information of the search signals of which field strengths are the highest to the third highest among the search signals acquired through the LF reception antenna 38, and then terminates this process.

According to the above described keyless entry system, the relative position information of the smart key 11 to the vehicle 2 is calculated based on the field strength information of the search signals transmitted from the LF transmission antenna 24 including five antennas 3 to 7, so that the position of the smart key 11 is determined to one definitive position. As a result, it is possible to calculate the relative position information rapidly and precisely without complicating the process as compared to the related art.

Furthermore, according to the above-described keyless entry system, the relative position information of the smart key 11 is calculated based on the position correspondence information stored in the storage portion of the main microcomputer 13. Since the pre-stored position correspondence information is used, the amount of calculation being performed by the main microcomputer 13 can be smaller than that in the case where, upon the calculation of the relative position information, the distance between the LF transmission antenna 24 and the LF reception antenna 38 is first calculated and then, based on the obtained distance, the relative position information is calculated. As a result, it is possible to reduce load on the main microcomputer 13, which is imposed in the process of calculating the relative position information of the smart key 11.

Furthermore, according to the keyless entry system, the relative position information of the portable means is calculated based on the field strength information of the search signals of which field strengths are the highest to the third highest among the search signals acquired through four or more antennas. Radio waves generated by the antennas except for the respective antennas 3 to 7 constituting the LF transmission antenna 24 act as noise on the field strength information. However, as the field strength measured by the field strength measurement portion 39 is higher, the influence of the noise decreases. Accordingly, by calculating the relative position information based on the field strength information of which field strengths are the highest to the third highest and less easily affected by the noise as compared to the field strength information of the search signal of which field strength is the fourth highest or lower, it is possible to obtain precise relative position information.

According to the keyless entry system, when the field strength of the search signal received by the smart key 11 is higher than the predetermined upper limit strength, such high field strength of the search signal is decreased. The field strength measurement portion 39 can perform measurement of the field strength of the search signal, which is equal to or lower than the upper limit strength, without saturation, so that the field strength of the search signals transmitted from the respective antennas 3 to 7 constituting the LF transmission antenna 24 can be precisely measured.

According to the keyless entry system, when the field strength of the search signal received by the smart key 11 is lower than the predetermined lower limit strength, such low field strength of the search signal is increased. The influence of noise included in the field strength information can be reduced by increasing the field strength of the search signal received by the smart key 11. It is therefore possible to obtain the field strength information which contains a reduced amount of noise.

According to the keyless entry system, the field strength of the search signal received by the smart key 11 is controlled to be changed in stages. Therefore, when the field strength of the search signal received by the smart key 11 is higher than the predetermined upper limit strength, the field strength of the strong search signal can be gradually brought close to the upper limit strength and brought to a level lower than the upper limit strength. Since the field strength of the search signal received by the smart key 11 can be brought close to the upper limit strength, the influence of noise included in the field strength information can be reduced, thereby obtaining the field strength information containing the reduced noise. When the field strength of the search signal received by the smart key 11 is lower than the predetermined lower limit strength, it is possible to bring such low field strength of the search signal close to the lower limit strength. The field strength is thus changed gradually to a desired value to thereby maintain the relative position information of the smart key 11 to be precise. As a result, the influence of noise included in the field strength information can be reduced, so that the field strength information containing the reduced noise can be obtained.

Next, descriptions will be given to a process that the main microcomputer 13 controls the door control portion 16 so as to unlock a door based on a plural pieces of relative position information.

Figure 11:
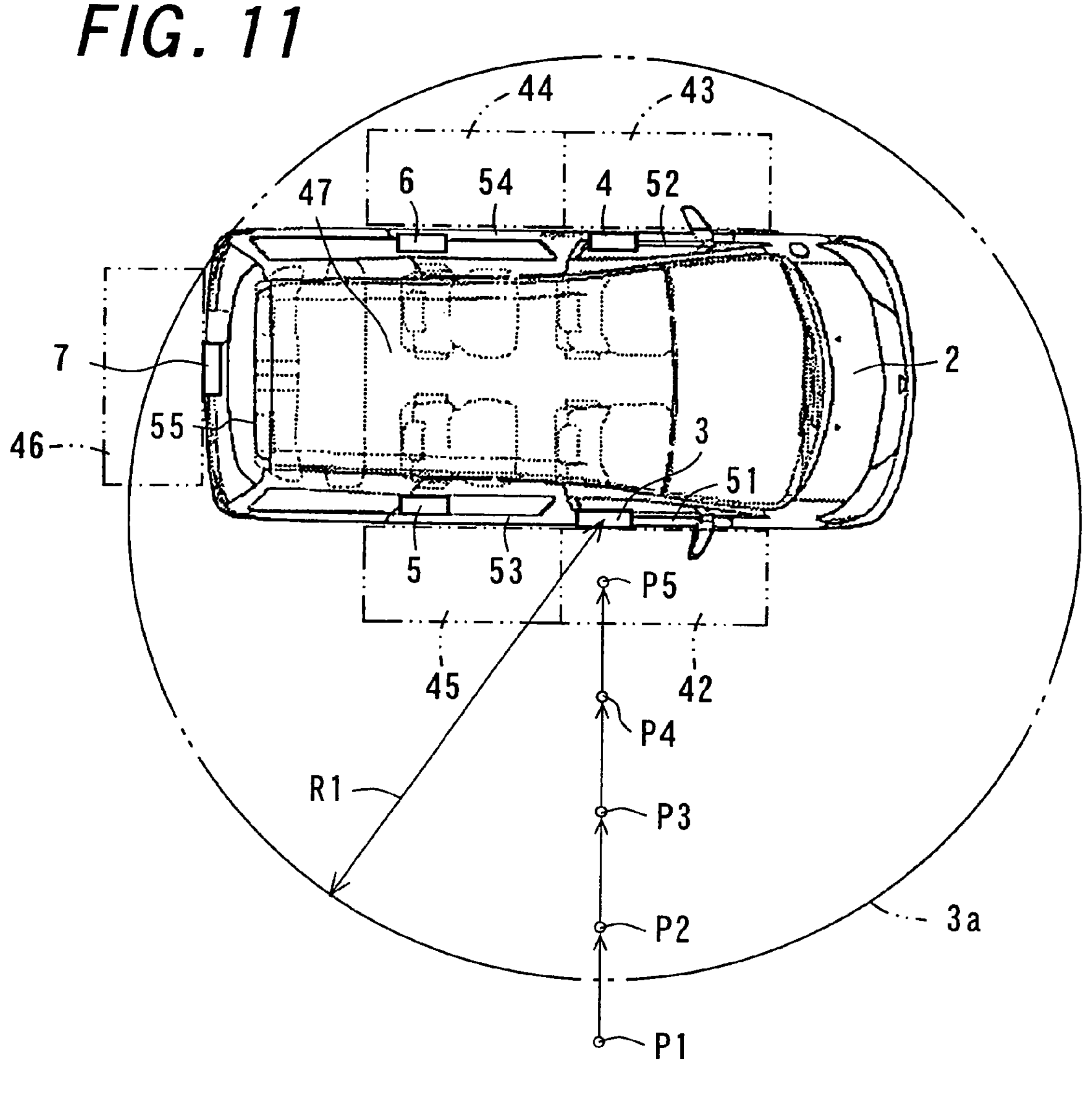
FIG. 11 is a view illustrating the relationship between the vehicle and a target area.

FIG. 11 is a view illustrating the relationship between the vehicle 2 and a target area. An area outside the vehicle 2 and around a D seat door 51 in the width direction of the vehicle is referred to as a D seat target area 42. An area outside the vehicle 2 and around a P seat door 52 in the width direction of the vehicle is referred to as a P seat target area 43. An area outside the vehicle 2 and around an RL seat door 54 in the width direction of the vehicle is referred to as an RL seat target area 44. An area outside the vehicle 2 and around an RR seat door 53 in the width direction of the vehicle is referred to as a RR seat target area 45. An area outside the vehicle 2 and around a back door 55 in the traveling direction of the vehicle 2 is referred to as a B target area 46. An area inside the vehicle 2 is referred to as a vehicle-inside area 47. In FIG. 11, a communicable area in which the search signal transmitted from the D seat antenna 3 can be received by the smart key 11 is indicted by "3*a*". An area outside the communicable area 3*a* is an area which the search signal of the D seat antenna 3 does not reach. The communicable area 3*a* has the area of a circle, the radius of which is R1 and at the center of which is the D seat antenna 3 including the P seat target area 43. That is, the transmission power of the search signal transmitted from the D seat antenna 3, that is, the field strength is previously set to have the area of the circle having the radius of R1. Although the communicable areas of other antennas 4 to 7 are not shown, these areas each have an area of circle having the radius of R1 with the respective antennas as its central point, as in the case of the communicable area 3*a* of the D seat antenna 3. Note that there is no need to set all the communicable areas of the antennas 3 to 7 to be the same with each other In FIG. 11, when a user having the smart key 11 is at a position indicated by P1 outside the communicable area 3*a*, the search signal outputted from the respective antennas 3 to 7 does not reach the smart key 11 and therefore, no response signal is transmitted from the smart key 11. Therefore, in this case, the main microcomputer 13 determines that the smart key 11 is outside the communicable area 3*a*.

Thereafter, when the user enters the communicable area 3*a* indicated by p2, the smart key 11 receives search signals transmitted from the respective antennas 3 to 7, and sends back the response signals in response to the received search signals. As described above, the main microcomputer 13 calculates the relative position information of the smart key 11 based on the field strength information included in the response signals, and then recognizes that the smart key 11 is located at a position of P2 (actually, the relative position information is recognized as a position on the coordinate system shown in FIG. 5). As a matter of course, depending on the position of the smart key 11, the search signal does not reach the smart key 11 and therefore, some antennas do not receive the response signal. Even in this case, the main microcomputer 13 measures the position of the smart key 11 based on the response signals which is sent back.

Thereafter, when the position of the smart key 11 changes in the order of P2, P3 and P4, thereby approaching the vehicle 2 to enter the D seat target area 42, the main microcomputer 13 determines that user intends to get on the vehicle 2, and then unlocks the D seat door 51. In this case, in order to determine whether the user accidentally enters the D seat target area 42 or really intends to get on the vehicle, the main microcomputer 13 is preferably designed to determine that the user intends to get on the vehicle, thus unlocking the D seat door 51 only when the user stays within the D seat target area 42 for a predetermined length of time. In this situation, upon determining that the user stays within the D seat target area 42 for a predetermined length of time, the user only needs to be within the D seat target area 42 for a predetermined length of time, that is to say, the user need not to stand still at one position.

Figure 12A:
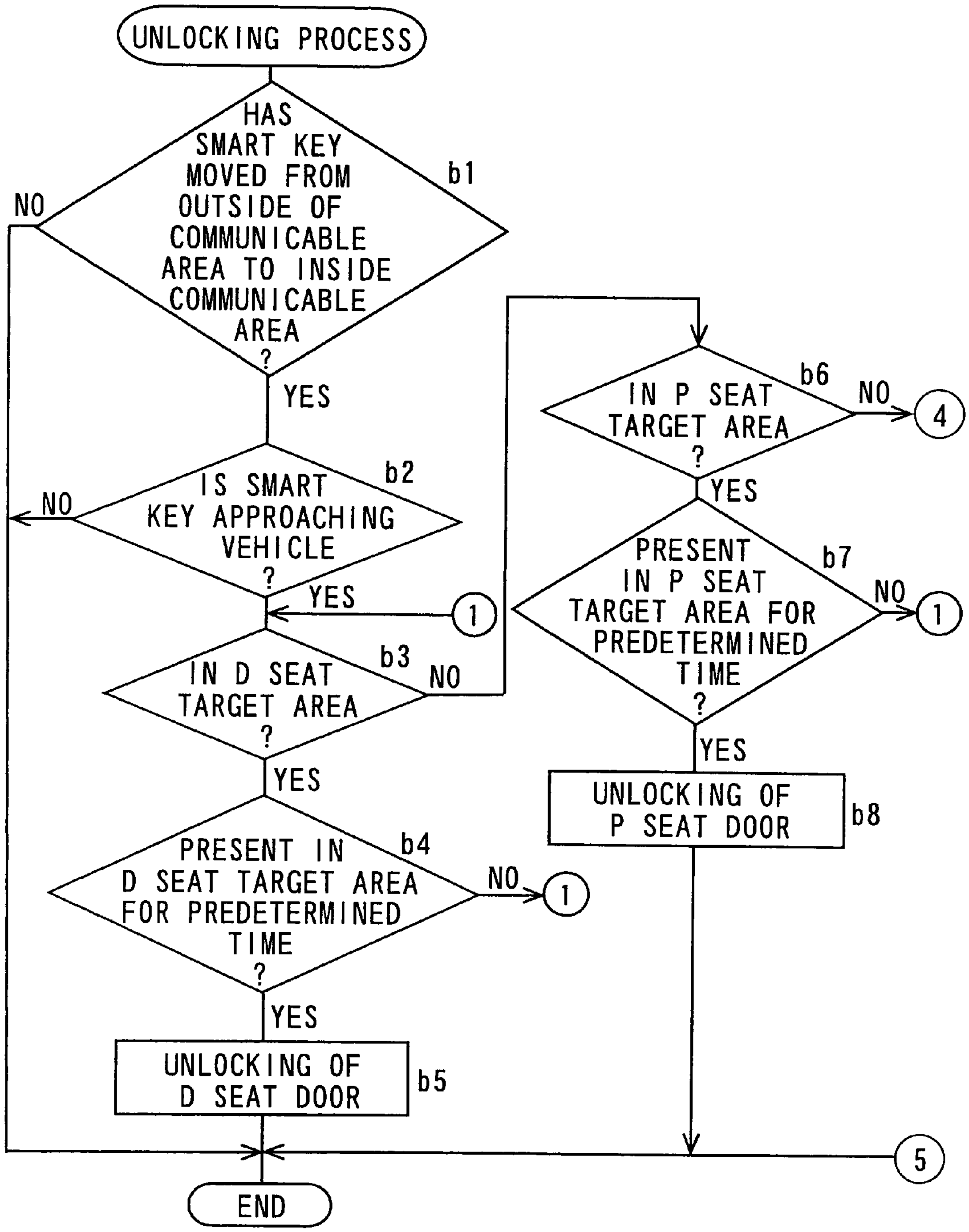
FIGS. 12A and 12B are flowcharts illustrating the sequence of an unlocking process performed by the main microcomputer.
Figure 12B:
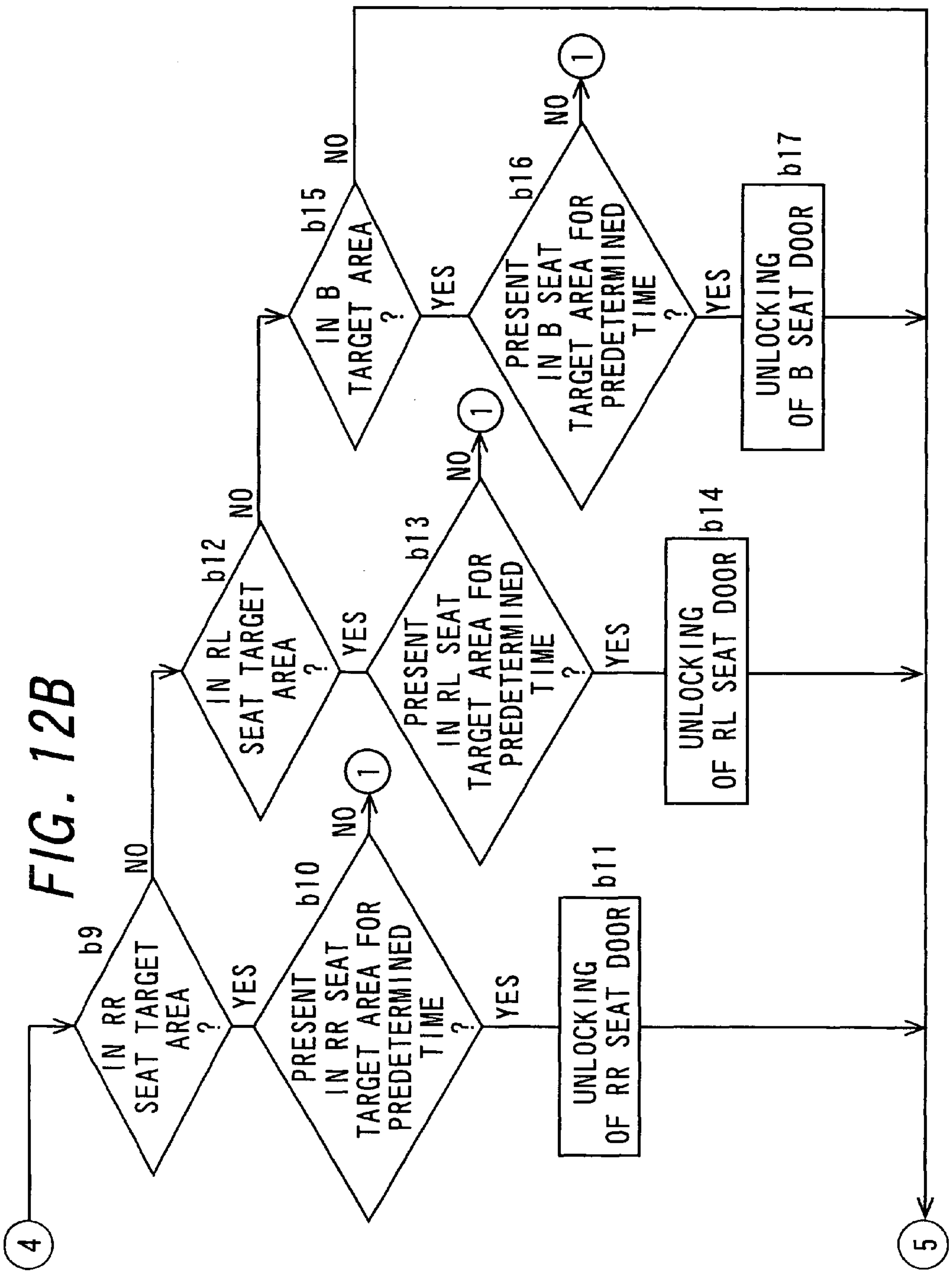

FIGS. 12A and 12B are flowcharts illustrating the sequence of an unlocking process performed by the main microcomputer 13. When power is applied to the main microcomputer 13, the main microcomputer 13 repeatedly performs the unlocking process. First, at Step b1, the main microcomputer 13 determines whether or not the smart key 11 enters the communicable area from the outside of the communicable area. In this case, when any response signal for the search signals transmitted from the respective antennas 3 to 7 is not received, it is determined that the smart key 11 is located outside the communicable area, and when the response signal for the search signal transmitted from any one of the respective antennas 3 to 7 is received, it is determined that the smart key 11 is located within the communicable area. Therefore, when the response signal for the search signals is first received, the main microcomputer 13 determines that the smart key 11 enters the communicable area from the outside of the communicable area, and the process then proceeds to Step b2. Furthermore, when no response signal for the search signals transmitted from the respective antennas 3 to 7 is received, the main microcomputer 13 determines that the smart key 11 is located outside the communicable area, and the unlocking process is then terminated.

At Step b2, the main microcomputer 13 determines whether or not the smart key 11 is approaching the vehicle 2, based on the relative position information of the smart key 11, which is calculated by use of the antenna code and the field strength information included in the response signal transmitted from the smart key 11. When it is determined that the smart key 11 is approaching the vehicle 2, the process proceeds to Step b3, and when it is determined that the smart key 11 is not approaching the vehicle 2, that is, the smart key 11 moves in a direction away from the vehicle 2, the main microcomputer 13 determines that the user does not intend to get on the vehicle 2, and terminates the unlocking process.

At Step b3, the main microcomputer 13 determines whether or not the smart key 11 is located within the D seat target area 42, based on the relative position information, and when it is determined that the smart key 11 is located within the D seat target area 42, the process proceeds to Step b4. At Step b4, the main microcomputer 13 determines whether or not the smart key 11 continuously stays within the D seat target area 42 for a predetermined length of time, and when it is determined that the smart key 11 continuously stays within the D seat target area 42 for a predetermined length of time, the process proceeds to Step b5. The determination of whether or not the smart key 11 continuously stays within the D seat target area 42 for a predetermined length of time is based on the plural pieces of relative position information calculated during the predetermined length of time. At Step b5, the main microcomputer 13 gives a command to the door control portion 16 so as to unlock the D seat door 51. The door control portion 16 controls a door-locking motor 18 based on the command given by the main microcomputer 13, to thereby unlock the D seat door 51, then terminating the unlocking process.

At Step b4, when it is determined that the smart key 11 does not continuously stay within the D seat target area 42 for a predetermined length of time, the process proceeds to Step b3.

At Step b3, when it is determined that the smart key 11 is not located within the D seat target area 42, the process proceeds to Step b6. At Step b6, the main microcomputer 13 determines whether or not the smart key 11 is located within the P seat target area 43, based on the relative position information, and when it is determined that the smart key 11 is located within the P seat target area 43, the process proceeds to Step b7. At Step b7, the main microcomputer 13 determines whether or not the smart key 11 continuously stays within the P seat target area 43 for a predetermined length of time, and when it is determined that the smart key 11 continuously stays within the P seat target area 43 for a predetermined length of time, the process proceeds to Step b8. The determination of whether or not the smart key 11 continuously stays within the P seat target area 43 for a predetermined length of time is based on the plural pieces of relative position information calculated during the predetermined length of time. At Step b8, the main microcomputer 13 gives a command to the door control portion 16 so as to unlock the P seat door 52. The door control portion 16 controls the door-locking motor 18 based on the command given by the main microcomputer 13, to thereby unlock the P seat door 52, then terminating the unlocking process.

At Step b7, when it is determined that the smart key 11 does not continuously stay within the P seat target area 43 for a predetermined length of time, the process proceeds to Step b3.

At Step b6, when it is determined that the smart key 11 is not located within the P seat target area 43, the process proceeds to Step b9. At Step b9, the main microcomputer 13 determines whether or not the smart key 11 is located within the RR seat target area 45, based on the relative position information and, when it is determined that the smart key 11 is located within the RR seat target area 45, the process proceeds to Step b10. At Step b10, the main microcomputer 13 determines whether or not the smart key 11 continuously stays within the RR seat target area 45 for a predetermined length of time and, when it is determined that the smart key 11 continuously stays within the RR seat target area 45 for a predetermined length of time, the process proceeds to Step b11. The determination of whether the smart key 11 continuously stays within the RR seat target area 45 for a predetermined length of time is based on the plural pieces of relative position information calculated during the predetermined length of time. At Step b11, the main microcomputer 13 gives a command to the RR seat door 53 so as to unlock the door control portion 16. The door control portion 16 controls the door-locking motor 18 based on the command given by the main microcomputer 13, to thereby unlock the RR seat door 53, then terminating the unlocking process.

At Step b10, when it is determined that the smart key 11 does not continuously stay within the RR seat target area 45 for a predetermined length of time, the process proceeds to Step b3.

At Step b9, when it is determined that the smart key 11 is not located within the RR seat target area 45, the process proceeds to Step b12. At Step b12, the main microcomputer 13 determines whether or not the smart key 11 is located within the RL seat target area 44, based on the relative position information, and when it is determined that the smart key 11 is located within the RL seat target area 44, the process proceeds to Step b13. At Step b13, the main microcomputer 13 determines whether or not the smart key 11 continuously stays within the RL seat target area 44 for a predetermined length of time, and when it is determined that the smart key 11 continuously stays within the RL seat target area 44 for a predetermined length of time, the process proceeds to Step b14. The determination of whether the smart key 11 continuously stays within the RL seat target area 44 for a predetermined length of time is based on the plural pieces of relative position information calculated during the predetermined length of time. At Step b14, the main microcomputer 13 gives a command to the RL seat door 54 so as to unlock the door control portion 16. The door control portion 16 controls the door-locking motor 18 based on the command give by the main microcomputer 13, to thereby unlock the RL seat door 54, then terminating the unlocking process.

At Step b13, when the main microcomputer 13 determines that the smart key 11 is continuously not within the RL seat target area 44 for the predetermined time, the process proceeds to Step b3.

At Step b12, when it is determined that the smart key 11 is not located within the RL seat target area 44, the process proceeds to Step b15. At Step b15, the main microcomputer 13 determines whether or not the smart key 11 is located within the B target area 46, based on the relative position information, and when it is determined that the smart key 11 is located within the B target area 46, the process proceeds to Step b16. At Step b16, the main microcomputer 13 determines whether or not the smart key 11 continuously stays within the B target area 46 for a predetermined length of time and, when it is determined that the smart key 11 continuously stays within the B target area 46 for a predetermined length of time, the process proceeds to Step b17. The determination of whether the smart key 11 continuously stays within the B target area 46 for a predetermined length of time is based on the plural pieces of relative position information calculated during the predetermined length of time. At Step b17, the main microcomputer 13 gives a command to the back door 55 so as to unlock the door control portion 16. The door control portion 16 controls the door-locking motor 18 based on the command give by the main microcomputer 13, to thereby unlock the back door 55, then terminating the unlocking process.

At Step b16, when it is determined that the smart key 11 does not continuously stay within the B target area 46 for a predetermined length of time, the process proceeds to Step b3. At Step b15, when it is determined that the smart key 11 is not located within the B target area 46, the main microcomputer 13 terminates the unlocking process.

According to the above-described keyless entry system, the door of the vehicle 2 around a position at which the smart key 11 stays for a predetermined length of time, is unlocked based on a plural pieces of relative position information of the smart key 11. That is to say, when a user carrying the smart key 11 approaches the door of the vehicle 2 and then stops in front of the door, it is determined that user intends to get on the vehicle 2, and the door is unlocked. It is therefore possible to perform the precise lock control reflecting the will of the user. Furthermore, when the D seat door 51 is unlocked, the other doors may also be unlocked simultaneously.

Next, descriptions will be given to a process in which the main microcomputer 13 controls the door control portion 16 based on a plural pieces of relative position information, thereby controlling the locking of a door.

Figure 13:
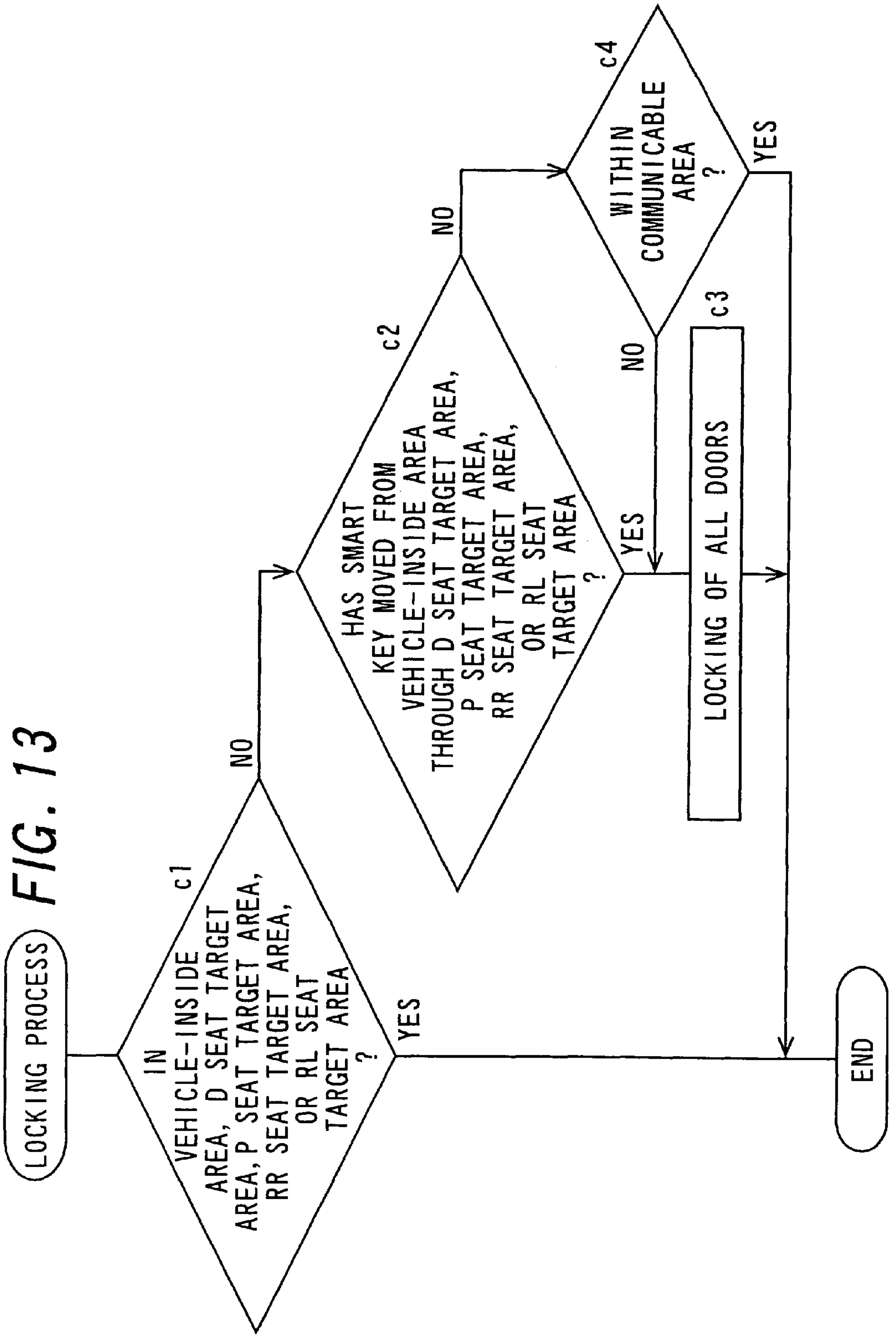
FIG. 13 is a flowchart illustrating the sequence of a locking process performed by the main microcomputer.

FIG. 13 is a flowchart illustrating the sequence of a locking process performed by the main microcomputer 13. When power is applied to the main microcomputer 13, the main microcomputer 13 repeatedly performs the locking process. At Step c1, the main microcomputer 13 determines which one of the vehicle-inside area 47, the D seat target area 42, the P seat target area 43, the RR seat target area 45 and the RL seat target area 44, the smart key 11 is located at, based on the relative position information, and when it is determined that the smart key 11 is located at any one of these areas, the locking process is terminated.

At Step c1, when it is determined that the smart key 11 is not located within any one of the vehicle-inside area 47, the D seat target area 42, the P seat target area 43, the RR seat target area 45, and the RL seat target area 44, that is, when it is determined that the smart key 11 is located inside a communicable area (hereinafter referred to as "non-targeted communicable area") excluding the target areas 42 to 45 and vehicle-inside area 47, or outside the communicable area, the process proceeds to Step c2. At Step c2, on the basis of the plural pieces of relative position information, the main microcomputer 13 determines whether or not the smart key 11 is brought from the vehicle-inside area 47 to a current position through any one of the D seat target area 42, the P seat target area 43, the RR seat target area 45, and the RL seat target area 44. When it is determined that the smart key 11 is brought from the vehicle-inside area 47 to a current position through any one of the D seat target area 42, the P seat target area 43, the RR seat target area 45, and the RL seat target area 44 based on the plural pieces of relative position information, it indicates that the user carrying the smart key 11 moves out of the vehicle and is going away from the vehicle 2. Accordingly, at Step c3, the main microcomputer 13 gives a command to the door control portion 16 so as to lock all the doors. The door control portion 16 controls the door-locking motor 18 to thereby lock all the doors based on the command given by the main microcomputer 13, and the locking process is terminated.

When the main microcomputer 13 determines at Step c2 that the smart key 11 is brought from the vehicle-inside area 47 to a current position without passing through the D seat target area 42, the P seat target area 43, the RR seat target area 45 and the RL seat target area 44, the main microcomputer 13 determines at Step c4 whether the current position is within the communicable area. When the current position is within the communicable area, it indicates that the smart key 11 has rapidly moved from the vehicle-inside area 47 to the non-targeted communicable area, and the process therefore proceeds to Step c3 where all the doors are locked. When it is determined at Step c4 that the current position of the smart key 11 is outside the communicable area, it indicates that the smart key 11 has suddenly moved from the vehicle-inside area 47 to the outside of the communicable area, which could not happen in an ordinary situation, thus leading a consideration that the main microcomputer 13 is in a state of being unable to check the position of the smart key 11 due to the battery shutoff of the smart key 11 or the influence of noise such as propagation obstacle. Accordingly, in this case, it is highly possible that the smart key 11 is placed within the vehicle-inside area 47, with the result that the main microcomputer 13 does not perform the locking of a door and then terminates the locking process. The main microcomputer 13 may be designed to inform, in the above case, a user that the main microcomputer 13 has failed to locate the smart key 11, by use of alarm means such as a lamp, a buzzer, and synthesized voice.

Furthermore, the door need not to be locked when the smart key 11 has moved from the vehicle-inside area 47 to the non-targeted communicable area through the target areas 42 to 45. Instead, it may be possible to lock the door after detecting that the smart key 11 is moving away from the vehicle 2 based on the successive relative position information of the smart key 11 in the non-targeted communicable area. This makes it possible to surely determine that the user intends to move away from the vehicle 2, thus achieving more appropriate locking control. Furthermore, when the smart key 11 moves from the vehicle-inside area 47 to the outside of the communicable area through the communicable area excluding the vehicle-inside area 47, all the doors may be designed to be locked.

According to the above-described keyless entry system, when the smart key 11 is brought away from the vehicle 2 by moving from the vehicle-inside area 47 through any one of the D seat target area 42, the P seat target area 43, the RR seat target area 45 and the RL seat target area 44 on the basis of a plural pieces of relative position information, all the doors of the vehicle 2 are locked. That is to say, when a user carrying the smart key 11 moves away from the vehicle 2 by passing from the vehicle-inside area 47 through any one of the D seat target area 42, the P seat target area 43, the RR seat target area 45 and the RL seat target area 44, all the doors of the vehicle 2 are locked. Furthermore, when the smart key 11 malfunctions in the vehicle 2, and the response signal is thus not transmitted from the smart key 11 to the main control portion 12, it cannot be confirmed that the smart key 11 has been brought away from the vehicle 2 through any one of the D seat target area 42, the P seat target area 43, the RR seat target area 45 and the RL seat target area 44, with the result that the locking for all the doors of the vehicle 2 is not performed. Therefore, for example, when the smart key 11 has been left alone within the vehicle 2, and the response signal from the smart key 11 is thus not received by the main control portion 12, the locking of the door of the vehicle 2 is not performed. Even if the user leaves the portable means within the vehicle and moves out of the vehicle 2 and then goes away from the vehicle 2, undesirable locking of the vehicle 2 is not performed. As described above, the locking of a door is performed based on the relative position information of the smart key 11, so that the convenience of the user is enhanced. Therefore, the smart key 11 can be prevented from being locked up in the vehicle 2.

Next, descriptions will be given to a process in which the main microcomputer 13 controls the immobilizer system 36 based on the plural pieces of relative position information.

Figure 14A:
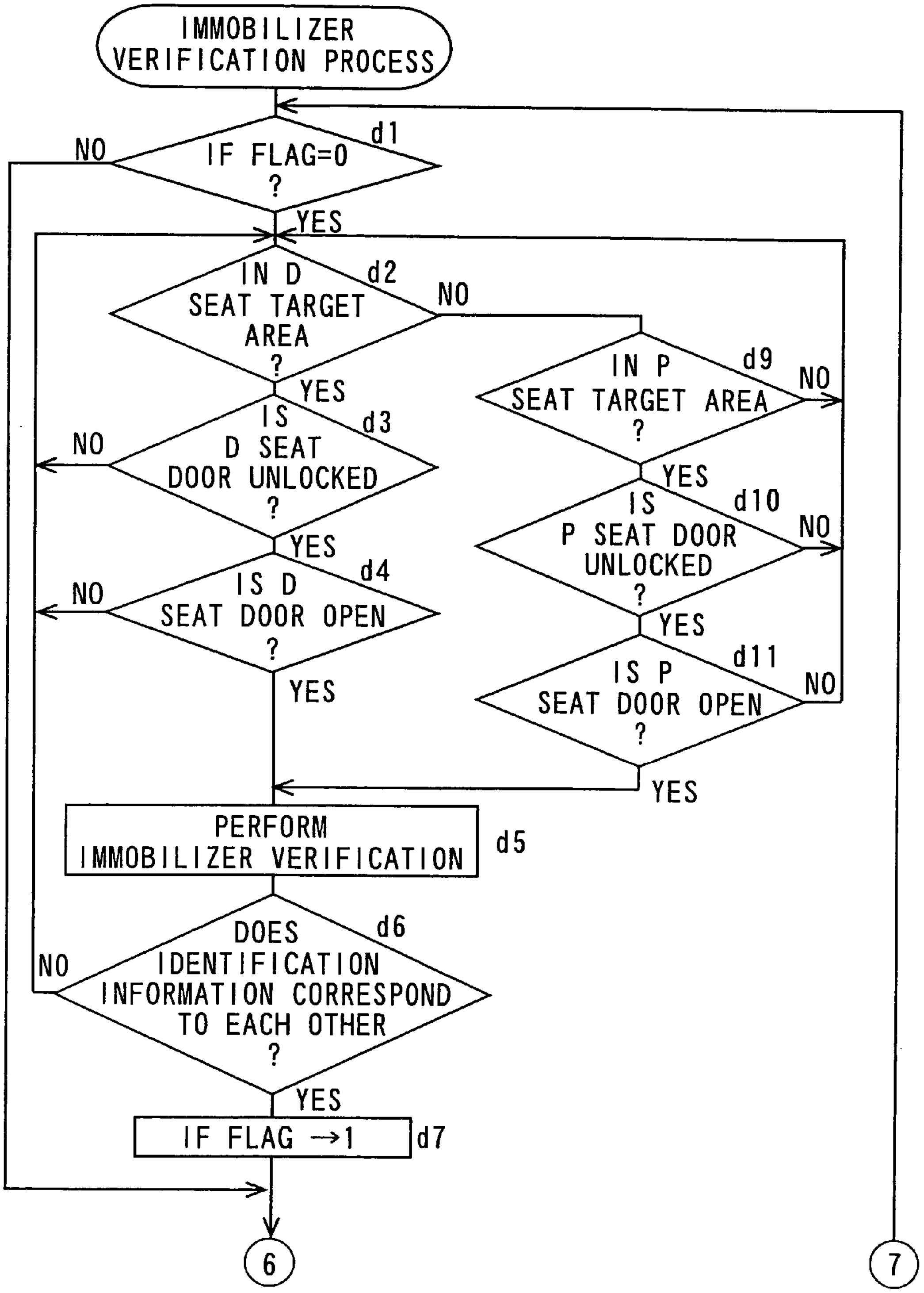
FIGS. 14A and 14B are flowcharts illustrating the sequence of a process of performing verification of an immobilizer.
Figure 14B:
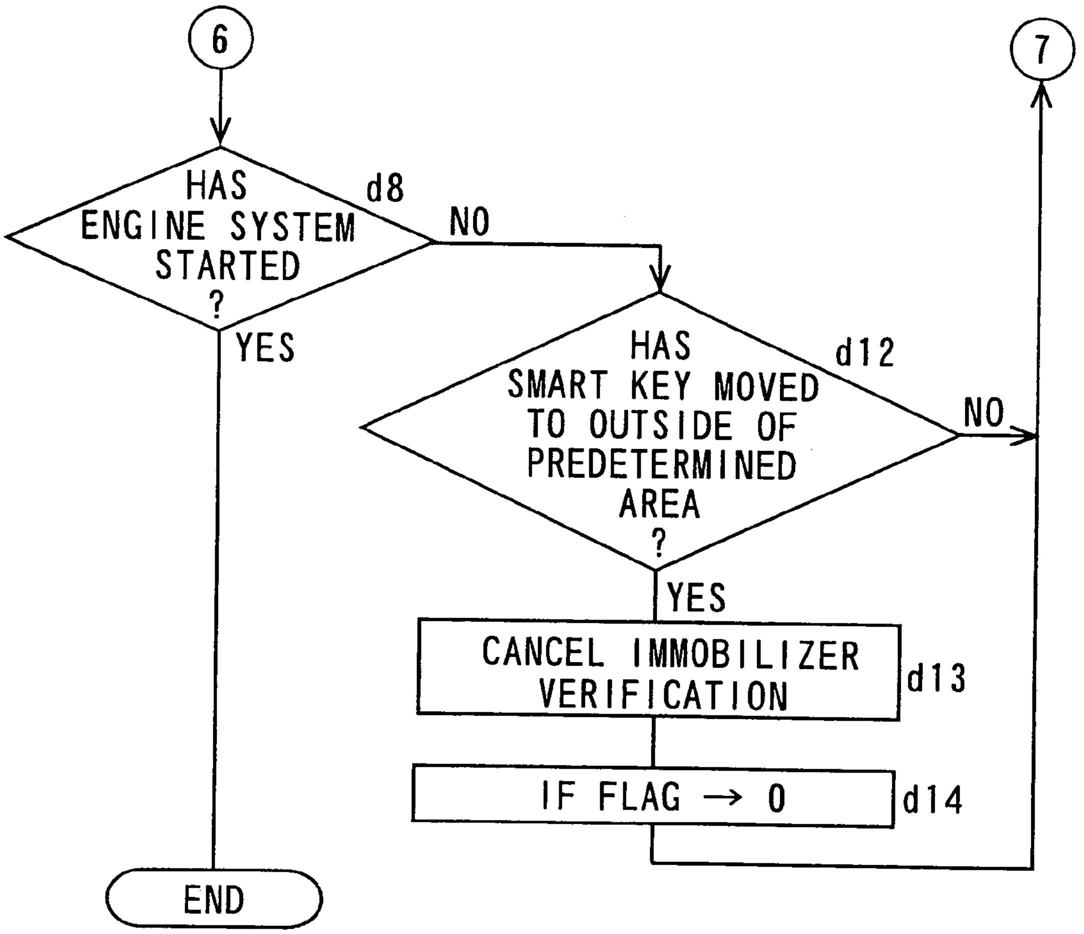
Figure 15:
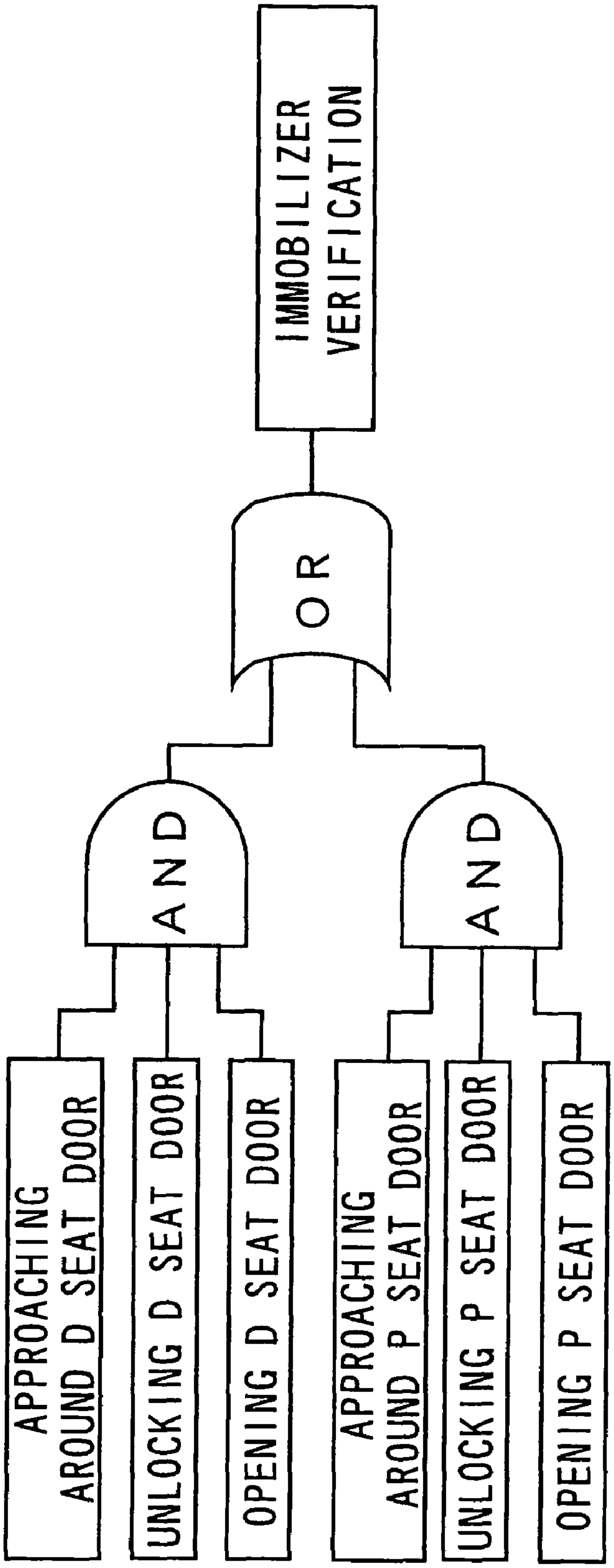
FIG. 15 is a view illustrating conditions for performing the immobilizer verification.
Figure 16:
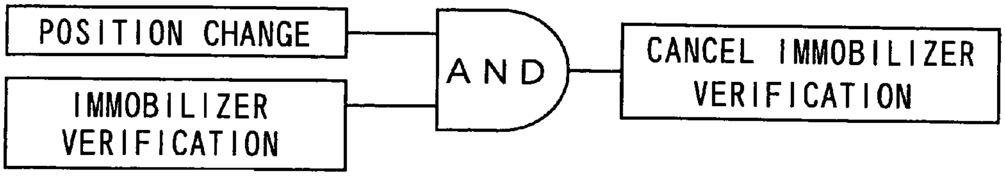
FIG. 16 is a view illustrating the conditions for canceling the immobilizer verification.

FIGS. 14A and 14B are flowcharts illustrating the sequence of the process of performing the immobilizer verification. FIG. 15 is a view illustrating the conditions for performing the immobilizer verification. FIG. 16 is a view illustrating the conditions for canceling the immobilizer verification.

The main microcomputer 13 performs the immobilizer verification in the case where the D seat door 51 is unlocked and is opened when the smart key 11 approaches the D seat target area 42 from a position distanced away from the vehicle 2. Furthermore, the main microcomputer 13 performs the immobilizer verification in the case where the P seat door 52 is unlocked and is opened when the smart key 11 approaches the P seat target area 43 from a position distanced away from the vehicle 2.

Whether the P seat door 52 or the D seat door 51 is open or closed, is determined by the main microcomputer 13 based on electrical signals provided from the courtesy switch 49 to the main microcomputer 13. Furthermore, the main microcomputer 13 transmits a signal requesting an immobilizer identification code to the smart key 11 when inquiring the immobilizer. When the smart key 11 receives the signal requesting an immobilizer identification code, the portable microcomputer 31 transmits through the RF transmission antenna 40 the immobilizer identification code and the smart entry identification code, which are inherent in the smart key 11 and stored in the storage portion. When the main control portion 12 determines that the information has been transmitted from the normal smart key 11, based on the received smart entry identification code, the main microcomputer 13 provides the received immobilizer identification code to the immobilizer system 36, and effects the immobilizer verification identification code to be performed. When the immobilizer identification code corresponds to the immobilizer identification code stored in the immobilizer system 36, the immobilizer system 36 provides permission for start-up of the engine system 37. When the immobilizer identification code does not correspond to the immobilizer identification code stored in the immobilizer system 36, the immobilizer system 36 provides to the main microcomputer 13 electric signals representing the mismatching.

When the user carrying the smart key 11 moves away from the vehicle 2 after one-time execution of the immobilizer verification, the main microcomputer 13 cancels the immobilizer verification based on the calculated relative position information of the smart key 11.

The process of performing the immobilizer verification is repeatedly performed while electrical power is supplied to the main microcomputer 13. At Step d1, the main microcomputer 13 checks the value of an IF flag stored in the storage portion and, when the value of the IF flag is 0, the process proceeds to Step d2. The value of the IF flag indicates whether or not the immobilizer verification has been completed. The value "0" of the IF flag represents that the immobilizer verification has not been completed while, the value "1" of the IF flag represents that the immobilizer verification has been completed, that is, the immobilizer identification code is matched.

At Step d2, the main microcomputer 13 determines whether or not the smart key 11 is located within the D seat target area 42 based on the relative position information and, when it is determined that the smart key 11 is located within the D seat target area 42, the process proceeds to Step d3. At Step d3, the main microcomputer 13 determines whether or not the D seat door 51 is unlocked. When the D seat door 51 is unlocked at Step b5 of FIG. 12A, an unlocking flag is set, so that it is possible to determine whether the D seat door 51 is unlocked based on the unlocking flag. When the D seat door 51 is unlocked, the process proceeds to Step d4, and when the D seat door 51 is locked, the process proceeds to Step d2. At Step d4, the main microcomputer 13 determines whether or not the D seat door 51 is open, based on the courtesy switch 49. When the D seat door 51 is open, the process proceeds to Step d5, and when the D seat door 51 is closed, the process proceeds to Step d2.

At Step d5, the main microcomputer 13 performs the immobilizer verification, and the process then proceeds to Step d6. At Step d6, when the received immobilizer identification code corresponds to the immobilizer identification code stored in the immobilizer system 36, the process proceeds to Step d7, and when the received immobilizer identification code does not correspond to the immobilizer identification code stored in the immobilizer system 36, the process proceeds to Step d2. At Step d7, the main microcomputer 13 sets the IF flag to a number of "1" representing the completion of the immobilizer verification, and the process then proceeds to Step d8. At Step d8, the main microcomputer 13 determines whether or not the engine system 37 is started and, when it is determined that the engine system 37 is started, the process is terminated.

At Step d1, when the value of the IF flag is 1, the main microcomputer 13 determines that the immobilizer verification has been completed, and the process then proceeds to Step d8.

At Step d2, when the main microcomputer 13 determines that the smart key 11 is not located within the D seat target area 42, the process proceeds to Step d9. At Step d9, the main microcomputer 13 determines whether or not the smart key 11 is located within the P seat target area 43, based on the relative position information. When the main microcomputer 13 determines that the smart key 11 is located within the P seat target area 43, the process proceeds to Step d10, and when the main microcomputer 13 determines that the smart key 11 is not located within the P seat target area 43, the process proceeds to Step d2. At Step d10, on the basis of the unlocking flag representing whether or not the door is unlocked, the main microcomputer 13 determines whether or not the P seat door 52 is unlocked. When the P seat door 52 is unlocked, the process proceeds to Step d11, and when the P seat door 52 is locked, the process proceeds to Step d2. At Step d11, on the basis of the P seat door switch 30 of the courtesy switch 49, the main microcomputer 13 determines whether or not the P seat door 52 is open. When the P seat door 52 is open, the process proceeds to Step d5, and when the P seat door is closed, the process proceeds to Step d2.

At Step d8, in the case where the engine system 37 is not started, the process proceeds to Step d12. At Step d12, on the basis of the plural pieces of relative position information, the main microcomputer 13 determines whether the smart key 11 moves out of a predetermined area. The predetermined area is an area including, for example, the vehicle-inside area 47, the D seat target area 42, the P seat target area 43, the RR seat target area 45 and the RL seat target area 44. That is, when the main microcomputer 13 determines that the smart key 11 passes through any one area of the D seat target area 42, the P seat target area 43, the RR seat target area 45 and the RL seat target area 44 and moves away from the vehicle 2, the process proceeds to d13. At Step d13, the main microcomputer 13 cancels the immobilizer verification, and the process then proceeds to d14. At Step d14, the main microcomputer 13 sets the IF flag to "0" representing that no immobilizer verification has been performed, and the process then proceeds to d1.

At Step d12, when the smart key 11 does not move out of the predetermined area, the process proceeds to d1.

According to the above-described keyless entry system, the main microcomputer 13 performs the immobilizer verification in the case in which the D seat door 51 is unlocked and is open when the smart key 11 approaches the D seat target area 42 from a position distanced away from the vehicle 2. Furthermore, the main microcomputer 13 performs the immobilizer verification in the case in which the P seat door 52 is unlocked and is open when the smart key 11 approaches the P seat target area 43 from a position distanced away from the vehicle 2. Note that the immobilizer verification may be performed on a condition that not both but only one of the D seat door 51 and the P seat door 52 is locked. The chronological check of plural positions of the smart key 11 allows the check of the user's intention to get on the vehicle 2, and moreover allows the immobilizer verification to the vehicle 2 at a time point when the plural pieces of relative position information are detected, so that a length of time for the verification can be made as short as possible after the user gets on the vehicle. Therefore, the convenience of the user is enhanced.

Furthermore, according to the keyless entry system, when the smart key 11 moves away from the vehicle 2 after the immobilizer verification has been performed, the immobilizer verification is cancelled. That is, when the user carrying the smart key 11 moves away from the vehicle after the immobilizer verification, the immobilizer verification is automatically canceled. Since the immobilizer verification is automatically canceled without the user's manipulation of canceling the immobilizer verification, the convenience of the user is enhanced, and the vehicle 2 can be prevented from being stolen.

In the vehicle control system 1 according to the embodiment of the invention, when the smart key 11 stays in any one of the D seat target area 42, the P seat target area 43, the RR seat target area 45, the RL seat target area 44 and the B target area 46 for a predetermined length of time, any one of doors of the vehicle 2 is controlled to be opened. It is also applicable that any one of doors of the vehicle 2 is controlled to be open when the smart key 11 moves to a predetermined area. For example, in the coordinate system set in the vehicle 2, when the smart key 11 moves back and forth between plural areas predetermined times, any one of doors of the vehicle 2 may be controlled to be unlocked. In detail, in FIG. 5, when the smart key 11 repeatedly moves from (M5) to (M6), from (M6) to (M7), from (M7) to (M6), from (M6) to (MS) predetermined-times, for example, the D seat door 51 may be caused to be unlocked. In this case, the user can unlock the door of the vehicle 2 by moving the smart key 11 in a predetermined way. The user's intention to unlock the door can be thus determined more securely so that the door can be more reliably prevented from being unlocked without the user's intention.

In the vehicle control system 1 according to the embodiment of the invention, when the smart key 11 passes from the vehicle-inside area 47 through any one of the D seat target area 42, the P seat target area 43, the RR seat target area 45, and the RL seat target area and then reaches a current position, locking of all doors are controlled. It is also applicable that any one of doors of the vehicle 2 is locked when the smart key 11 moves to a predetermined area. For example, in the coordinate system set in the vehicle 2, when the smart key 11 moves back and forth between plurality areas predetermined times, any one of doors of the vehicle 2 may be controlled to be locked. In detail, in FIG. 5, when the smart key 11 repeatedly moves from (M5) to (M6), from (M6) to (M7), from (M7) to (M6), from (M6) to (M5) predetermined times, for example, the D seat door 51 may be caused to be locked. In this case, the user can lock the door of the vehicle 2 by moving the smart key 11 in a predetermined way. The user's intention to lock the door can be thus determined more securely so that the door can be more reliably prevented from being locked without the user's intention.

In the vehicle control system 1 according to the embodiment of the invention, when the smart key 11 passes from the vehicle-inside area 47 through any one of the D seat target area 42, the P seat target area 43, the RR seat target area 45, and the RL seat target area 44 and then reaches a current position, the immobilizer verification is canceled. It is also applicable that the immobilizer verification is cancelled when the smart key 11 moves to a predetermined area. For example, in the coordinate system set in the vehicle 2, when the smart key 11 moves back and forth between plural areas, the immobilizer verification may be controlled to be cancelled. In detail, in FIG. 5, when the smart key 11 repeatedly moves from (M5) to (M6), from (M6) to (M7), from (M7) to (M6), from (M6) to (M5) predetermined times, the immobilizer verification may be canceled. In this case, the user can cancel the immobilizer verification by moving the smart key 11 in a predetermined way, thereby enhancing the convenience of the user.

In the vehicle control system 1 according to the embodiment of the invention, when the field strength of the search signal received by the smart key 11 is equal to or higher than a predetermined upper limit strength or equal to or lower than a predetermined lower limit strength, the field strength of search signal transmitted from the LF transmission antenna 24 is adjusted. In this case, it may be possible to adjust the amplification rate of electric signal corresponding to search signal received by the LF reception portion 23. For example, when the field strength of search signal acquired through the LF reception antenna 38 is lower than a predetermined strength, the LF reception portion 23 increases the amplification rate of electric signals corresponding to search signals acquired through the LF reception antenna 38. When the field strength of search signals acquired through the LF reception antenna 38 is higher than a predetermined strength, the LF reception portion 23 decreases the amplification rate of electric signal corresponding to search signal acquired through the LF reception antenna 38. In the case in which the amplification rate of electric signal corresponding to search signal received by the LF reception portion 23 is adjusted, the field strength information and information representing the amplification rate of electric signal are transmitted from the smart key 11 to the main control portion 12. The main microcomputer 13 changes a field strength coefficient based on the amplification rate of electric signal, and calculates the relative position information.

In the vehicle control system 1 according to the embodiment of the invention, the main microcomputer 13 calculates the field strength received by the LF reception antenna 38 using formula (1). It is also applicable that the portable microcomputer 31 calculates the field strength received by the LF reception antenna 38 using formula (1).

In the vehicle control system 1 according to the embodiment of the invention, the main control portion 12 is installed in a four-wheel vehicle. However, the invention is not limited to the four-wheel vehicle, and the main control portion 12 may be installed in a two-wheel vehicle and a three-wheel vehicle. Furthermore, the vehicle control system 1 can be used in a system for controlling the locking or unlocking of home key system through wireless communication.

In the vehicle control system 1 according to the embodiment of the invention, the relative position of the smart key 11 to the vehicle 2 is calculated in two-dimension. However, the relative position of the smart key 11 to the vehicle 2 may be calculated in three-dimension by using four antennas. Assuming four virtual circles, each of which has a center of each antenna and a radius of a distance between the smart key 11 and each of the respective antennas, the smart key 11 is located at the intersected region of the four virtual circles.

Figure 17:
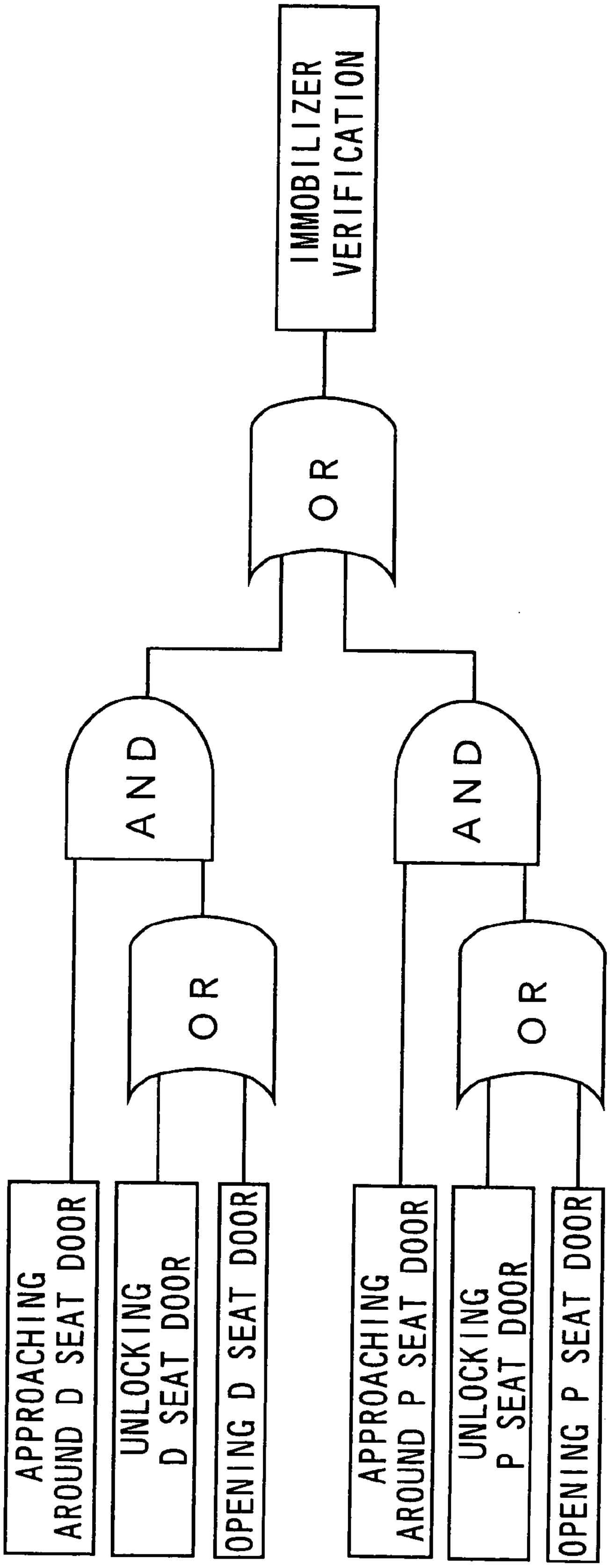
FIG. 17 is a view illustrating the conditions for performing the immobilizer verification in a vehicle control system according to another embodiment of the invention.

FIG. 17 is a view illustrating the conditions for performing the immobilizer verification in the vehicle control system 1 according to another embodiment of the invention. The vehicle control system 1 according to another embodiment of the invention has the same configuration as that of the above-described vehicle control system 1, so that corresponding parts will be denoted by the same numerals or symbols, and descriptions thereof will be omitted. The main microcomputer 13 performs the immobilizer verification when the smart key 11 approaches the D seat target area 42 from a position distanced away from the vehicle 2, and the D seat door 51 is unlocked or open. Furthermore, the main microcomputer 13 performs the immobilizer verification when the smart key 11 approaches the P seat target area 43 from a position distanced away from the vehicle 2, and the P seat door 52 is unlocked or open.

Figure 18:
FIG. 18 is a view illustrating the conditions for performing the immobilizer verification in a vehicle control system according to another embodiment of the invention.

FIG. 18 is a view illustrating conditions for performing the immobilizer verification in the vehicle control system 1 according to another embodiment of the invention. The vehicle control system 1 according to another embodiment of the present invention has the same configuration as that of the above-described vehicle control system 1, so that corresponding parts will be denoted by the same numerals or symbols, and descriptions thereof will be omitted. The main microcomputer 13 performs the immobilizer verification when the smart key 11 approaches the D seat door 51 or the P seat door 52 from a position distanced away from the vehicle 2, and then enters the D seat target area 42 or the P seat target area 43. That is, when the smart key 11 approaches around the doors, the microcomputer performs the immobilizer verification without detecting the state of doors. Furthermore, the main microcomputer 13 performs the immobilizer verification when the smart key 11 moves to a predetermined area. For example, in the coordinate system set in the vehicle 2, the main microcomputer 13 performs the immobilizer verification when the smart key 11 moves back and forth between plural areas predetermined times. In detail, in FIG. 5, when the smart key 11 repeatedly moves from (M5) to (M6), from (M6) to (M7), from (M7) to (M6), from (M6) to (M5) predetermined times, the main microcomputer 13 performs the immobilizer verification. In this case, the user can perform the immobilizer verification by moving the smart key 11 in a predetermined way, thereby enhancing the convenience of the user.

Figure 19:
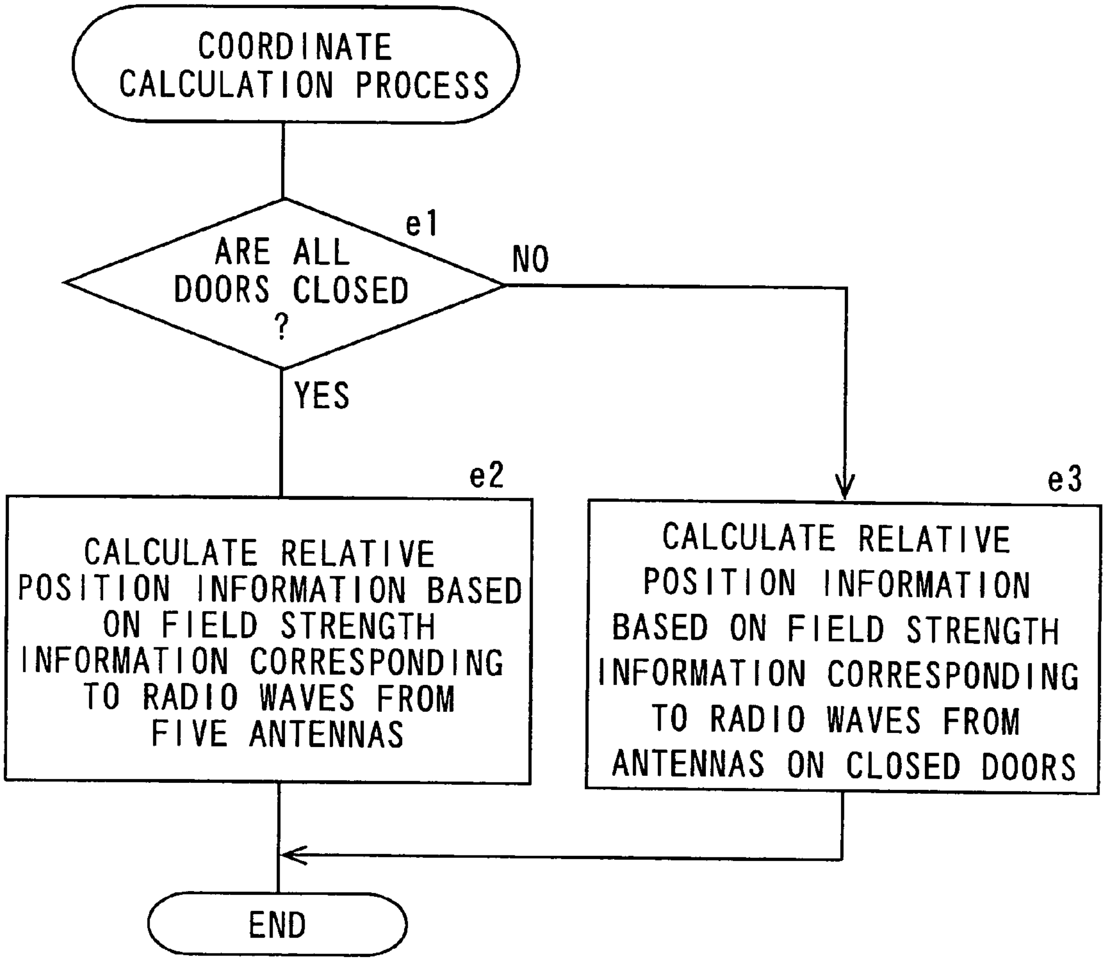
FIG. 19 is a flowchart illustrating the sequence of a process of calculating the relative position information of the smart key, which is performed by the vehicle control system according to another embodiment of the invention.

FIG. 19 is a flowchart illustrating the sequence of a process of calculating the relative position information of the smart key 11, which is performed by a vehicle control system 1 according to another embodiment of the invention. The vehicle control system 1 according to another embodiment of the invention has the same configuration as that of the above-described vehicle control system 1, so that corresponding parts will be denoted by the same numerals or symbols, and descriptions thereof will be omitted. The process of calculating the relative position information is started, for example, upon emergence of an interrupt process to start a process of calculating the relative position information by use of the timer of the main microcomputer 13. At Step e1, on the basis of electric signals from the courtesy switch 49, the main microcomputer 13 determines whether or not all doors of D seat door 51, the P seat door 52, the RR seat door 53, the RL seat door 54, and back door 55 are at default positions, and when all the doors are at the default positions, the process proceeds to Step e2. The default position means a position at which a door is closed. That is, when all the doors are closed, the process proceeds to Step e2. At Step e2, the main microcomputer 13 performs the calculation of the relative position information based on the field strength information corresponding to the search signals from the five antennas constituting the LF transmission antenna 24. In detail, the process shown in FIGS. 10A and 10B is performed. When the calculation of the relative position information is performed, the process is terminated.

At Step e1, when any one of the doors is open, the process proceeds to Step e3. At Step e3, the main microcomputer 13 performs the calculation of the relative position information based on the field strength information corresponding to search signals transmitted from the antennas which are installed in doors excepting doors being not at the default position, among the five antennas 3 to 7 constituting the LF transmission antenna 24. In detail, processing for the field strength information corresponding to the search signals transmitted from the antennas installed in the open doors among the five antennas 3 to 7 constituting the LF transmission antenna 24 is omitted, and the process shown in FIGS. 10A and 10B is performed.

In the case where the position correspondence information is made based on the state in which all the doors are closed, when the relative position information of the smart key 11 is calculated based on the field strength information corresponding to the search signals transmitted from an antenna installed in a door being not at the default position, the relative position information of the smart key 11 cannot be precisely calculated. The main microcomputer 13 calculates the relative position information of the smart key 11 based on respective field strength information corresponding to search signals transmitted from the antenna installed in the door being at the default position, so that the precise relative position information can be obtained. In this case, it is preferred that the transmission of the search signals from the antenna installed in an open door is suspended.

Figure 20:
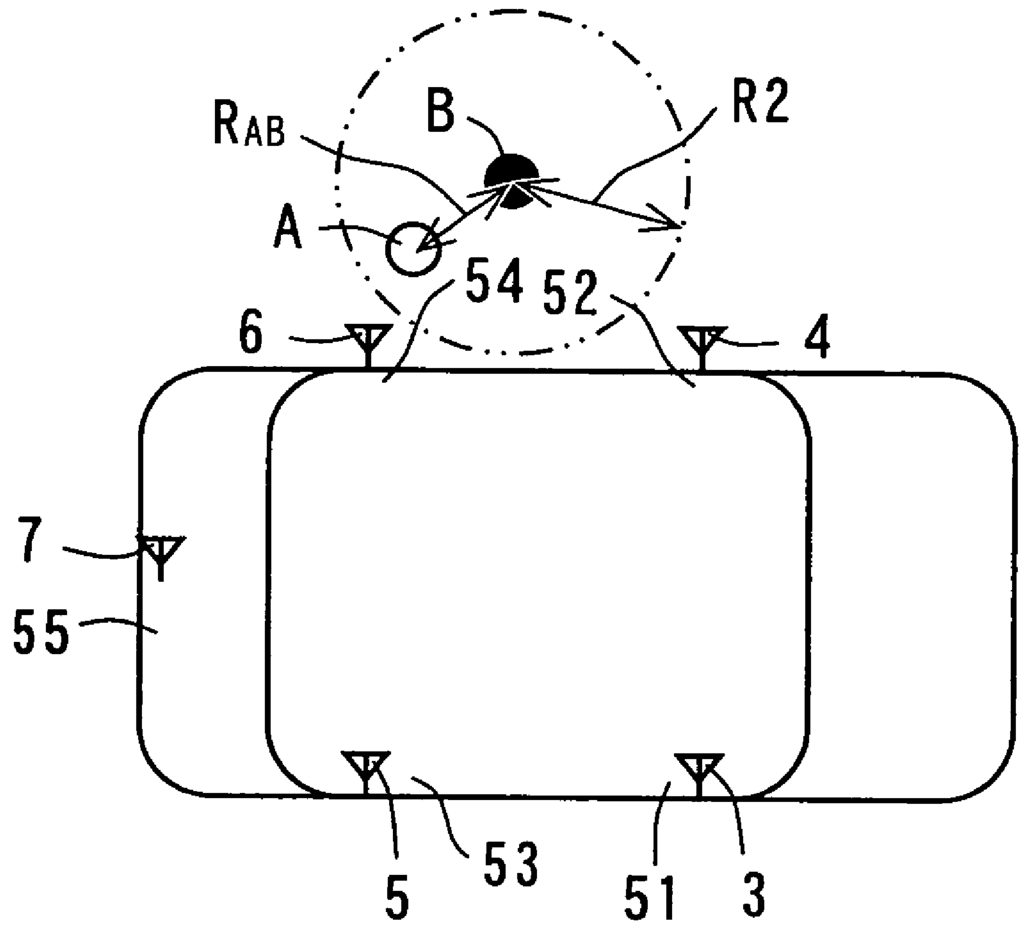
FIG. 20 is a view illustrating a process of calculating the relative position information of the smart key, which is performed by the vehicle control system according to still another embodiment of the invention.

FIG. 20 is a view illustrating a process of calculating the relative position information of the smart key 11, which is performed by a vehicle control system 1 according to still another embodiment of the invention. The vehicle control system 1 according to still another embodiment of the invention has the same configuration as that of the above-described vehicle control system 1, so that corresponding parts will be denoted by the same numerals or symbols, and descriptions thereof will be omitted. In the vehicle control system 1 according to still another embodiment of the invention, the process of Step a13 performed by the main microcomputer 13 is different among Steps in the process for calculating the relative position information shown in FIGS. 10A and 10B. Only described will be thus a process corresponding to Step a13, of which process is different among Steps in the process for calculating the relative position information.

The main microcomputer 13 calculates first relative position information of the smart key 11 to the vehicle 2 based on the field strength information of the search signals of which field strengths are the highest to the third highest among the search signals acquired through the LF reception antenna 38, as in the case of the process at Step a13. Thereafter, the main microcomputer 13 calculates second relative position information of the smart key 11 to the vehicle 2 based on the field strength information of the search signals of which field strengths are the highest, the second highest, and the fourth highest. The main microcomputer 13 calculates the difference between the first relative position information and the second relative position information and, when the difference is lower than a predetermined value, the first relative position information is used as information representing the relative position of the smart key 11 to the vehicle 2. In detail, the main microcomputer 13 calculates a distance $R_{AB}$ between a position A of the smart key 11 specified by the first relative position information and a position B of the smart key 11 specified by the second relative position information. Then, when the distance $R_{AB}$ is lower than a predetermined tolerable distance R2, the main microcomputer 13 uses the first relative position information as information representing the relative position of the smart key 11 to the vehicle 2. The main microcomputer 13 calculates the difference between the first relative position information and the second relative position information and, when the difference is larger than a predetermined value, the relative position information previously calculated is used as information representing the relative position of the smart key 11 to the vehicle 2. The predetermined value is selected to a fraction of the distance between antennas, for example.

According to the above-described keyless entry system, the difference between the first relative position information and the second relative position information is calculated, and when the difference is lower than a predetermined value, the first relative position information is used. When the field strength information of the search signals of which field strengths are the highest to the third highest contain a large error due to the influence of noise, incorrect relative position information is obtained. In this case, however, when there is a small difference between the incorrect relative position information and the secondarily reliable relative position information calculated based on the field strength information of the search signals of which field strengths are the highest, the second highest, and the fourth highest, it can be determined that both pieces of the relative position information are correct. Therefore, the reliability of the calculated relative position information of the smart key 11 can be further enhanced.

Figure 21A:
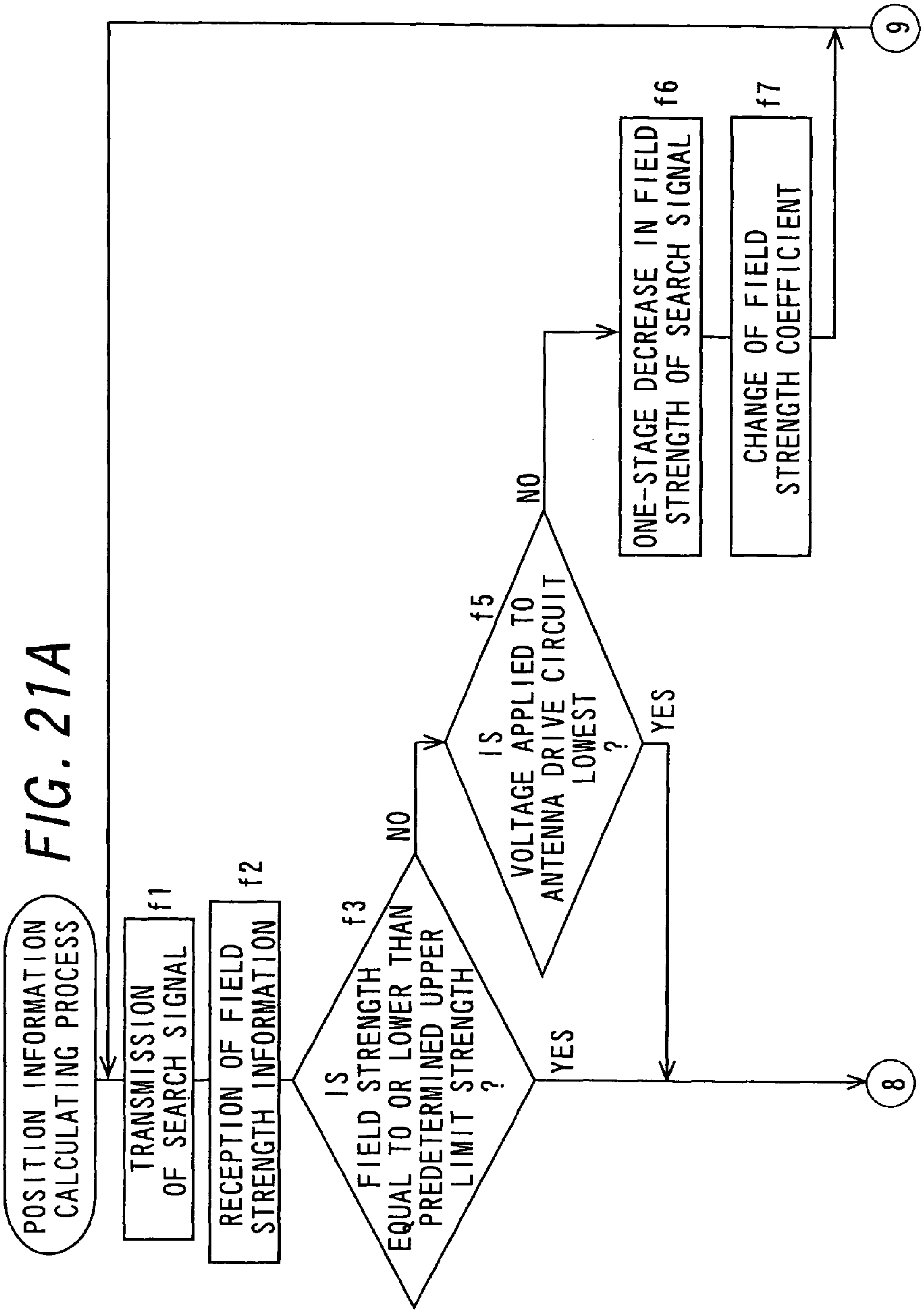
FIGS. 21A and 21B are flowcharts illustrating the sequence of a process of calculating the relative position information of the smart key, which is performed by the vehicle control system according to still another embodiment of the invention.
Figure 21B:
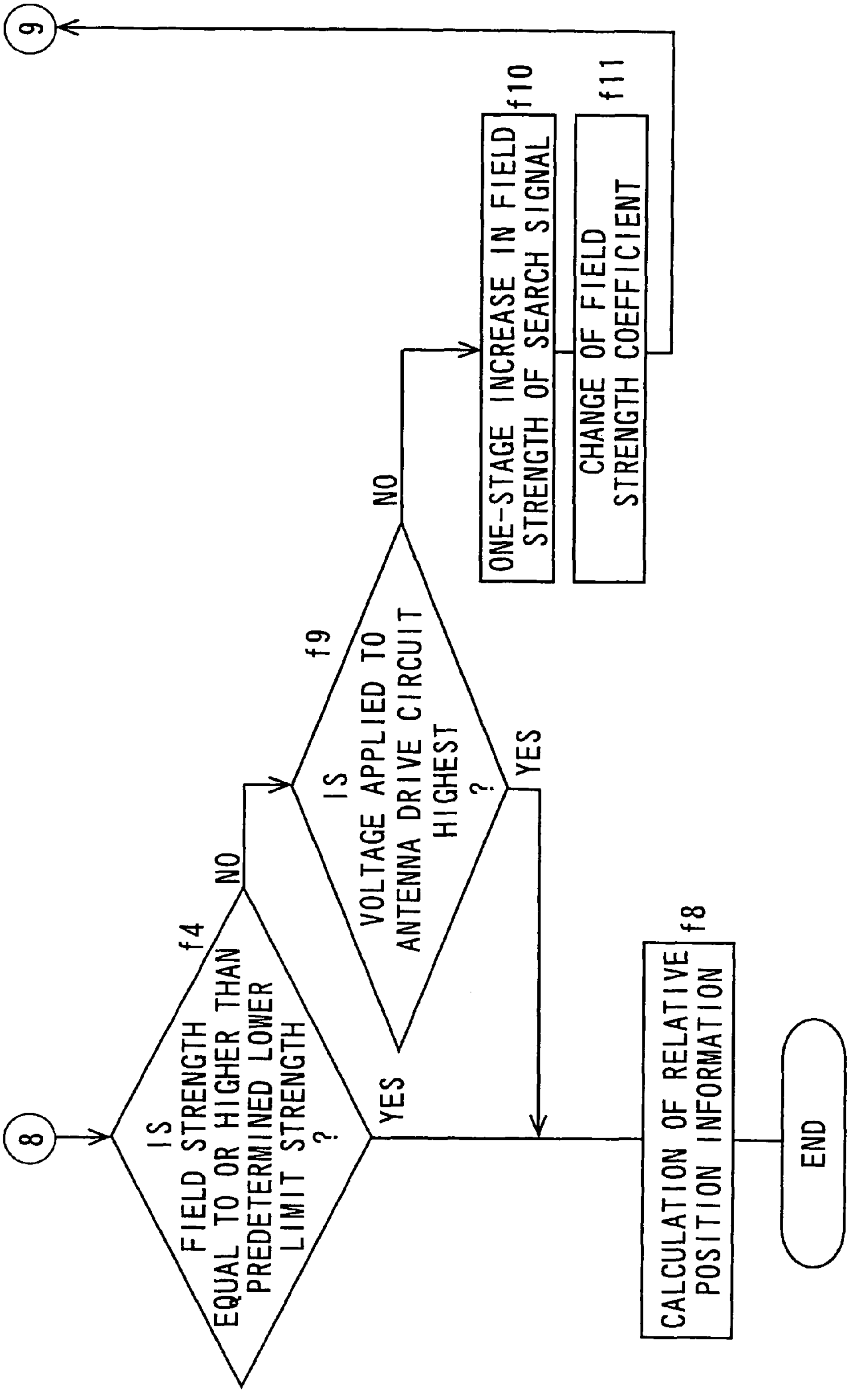

FIGS. 21A and 21B is a flowchart illustrating the sequence of a process of calculating the relative position information of the smart key 11, which is performed by the vehicle control system 1 according to still another embodiment of the invention. In the above-described process of calculating the relative position information as shown in FIGS. 10A and 10B, the field strengths of the search signals transmitted from the respective antennas 3 to 7 constituting the LF transmission antenna 24 are subjected to the adjustments for the respective search signals, whereas in the vehicle control system 1 according to still another embodiment of the invention, the field strengths of the search signals transmitted from the respective antennas 3 to 7 constituting the LF transmission antenna 24 are subjected to just one-time adjustment.

The process of calculating the relative position information is started, for example, upon emergence of an interrupt process to start a process of calculating the relative position information by use of the timer of the main microcomputer 13. A process through Step f1 to Step f2 is the same as the process through Step a1 to Step a2, and descriptions thereof will be thus omitted. When the main microcomputer 13 determines at Step f3 that the field strength information corresponding to the search signals from the respective antennas 3 to 7 constituting the LF transmission antenna 24 indicates a level of strength equal to or lower than the predetermined upper limit strength Eu, the process proceeds to Step f4. When the main microcomputer 13 determines at Step f3 that the field strength information corresponding to the search signals transmitted from the respective antennas 3 to 7 constituting the LF transmission antenna 24 indicates a level of strength not equal to or lower than the predetermined upper limit strength Eu, the process proceeds to Step f5.

At Step f5, the main microcomputer 13 determines whether or not the voltage being applied to the antenna drive circuit 14*a* is the lowest, and when it is determined that the voltage is the lowest, the process proceeds to Step f4, and when it is determined that the voltage is not the lowest, the process proceeds to Step f6. At Step f6, the main microcomputer 13 changes voltage being applied to the antenna drive circuit 14*a*, thereby attaining one-stage decrease in the field strength of the search signal transmitted by all the antennas constituting the LF transmission antenna 24, and then the process proceeds to Step f7. At Step f7, the main microcomputer 13 changes the field strength coefficient so as to correspond to the voltage being applied to the antenna drive circuit 14*a*, and then the process proceeds to Step f1.

When the main microcomputer 13 determines at Step f4 that the field strength information corresponding to the search signals transmitted from the respective antennas 3 to 7 constituting the LF transmission antenna 24 indicates a level of strength equal to or higher than the predetermined lower limit strength $E_{LOW}$, the process proceeds to Step f8. When the main microcomputer 13 determines at Step f4 that the field strength information corresponding to the search signal transmitted from at least one of the respective antennas 3 to 7 constituting the LF transmission antenna 24 indicates a level of strength not equal to or higher than the predetermined lower limit strength $E_{LOW}$, the process proceeds to Step f9.

At Step f9, the main microcomputer 13 determines whether or not the voltage being applied to the antenna drive circuit 14*a* is the highest, and when it is determined that the voltage is the highest, the process proceeds to Step f8, and when it is determined that the voltage is not the highest, the process proceeds to Step 10. At Step f10, the main microcomputer 13 changes voltage being applied to the antenna drive circuit 14*a*, thereby attaining one-stage increase in the field strength of the search signal transmitted by all the antennas constituting the LF transmission antenna 24, and then the process proceeds to Step f11. At Step f11, the main microcomputer 13 changes the field strength coefficient so as to correspond to the voltage being applied to the antenna drive circuit 14*a*, and then the process proceeds to Step f1.

At Step f8, the relative position information of the smart key 11 to the vehicle 2 is calculated based on the field strength information of the search signals of which field strengths are the highest to the third highest among the search signals acquired through the LF reception antenna 38, and this process is then terminated.

According to the above-described keyless entry system, the field strength of the search signals transmitted from the respective antennas 3 to 7 constituting the LF transmission antenna 24 is subjected to not the adjustments for the respective search signals but just one-time adjustment. Accordingly, there is the reduced number of processes for adjusting the field strength of the search signal transmitted from the respective antennas 3 to 7 constituting the LF transmission antenna 24. As a result, a length of time required for the calculation of the relative position information can be shortened.

In the vehicle control system 1 according to still another embodiment of the invention, the respective antennas 3 to 7 constituting the LF transmission antenna 24 are installed in a fixed part of the vehicle 2 excluding a moveable unit such as a door.

Figure 22A:
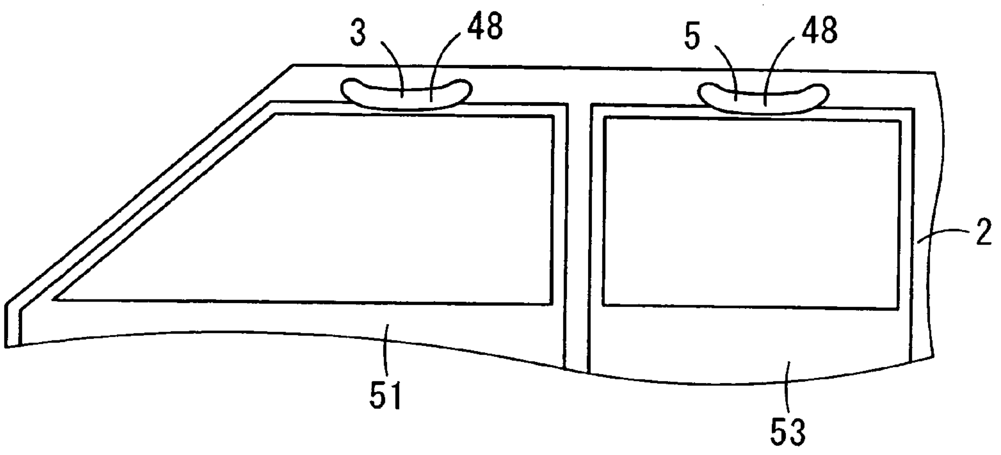
FIGS. 22A and 22B are pattern diagrams illustrating part of the vehicle.
Figure 22B:
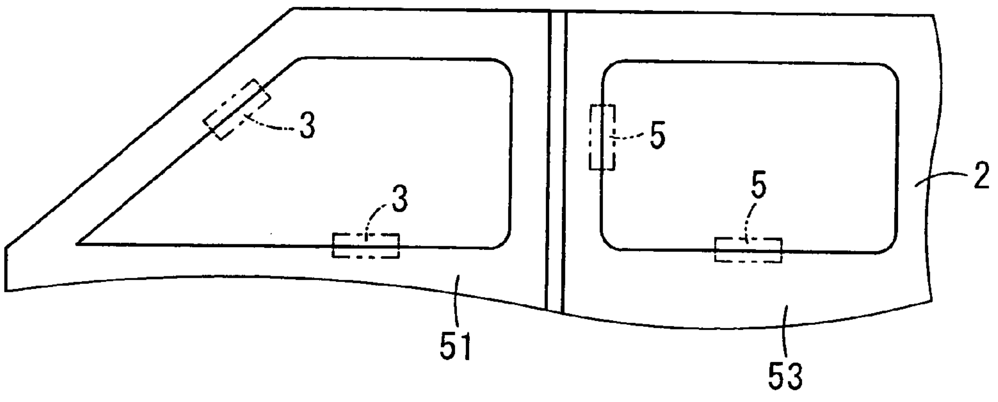

FIGS. 22A and 22B are pattern diagrams illustrating part of the vehicle 2. The LF transmission antenna 24 is provided in an assist grip 48 installed in a vehicle body at a position of upper part of, or in at least one part corresponding to a window frame portion of, for example, the D seat door 51 or RR seat door 53 inside the vehicle. Since the LF transmission antenna 24 is installed in the fixed part excluding a movable unit such as a door, the LF transmission antenna 24 does not move relatively to the vehicle 2 upon calculating the relative position information. The calculation of the relative position information by use of the field strength information corresponding to the search signal transmitted from the LF transmission antenna 24 which does not move relatively to the vehicle 2 is able to give accurate information of relative position.

The above-described embodiments relates to, as an example of the remote control, the smart entry system where the locking of a door is controlled based on a position of the smart key 11. Nevertheless, the vehicle control system may be applied to a remote control apparatus such as an anti-theft apparatus. In a vehicle control system designed for anti-theft application, setting and resetting of an anti-theft function are controlled based on a position of the smart key 11.

Embodiment 2

Figure 23:
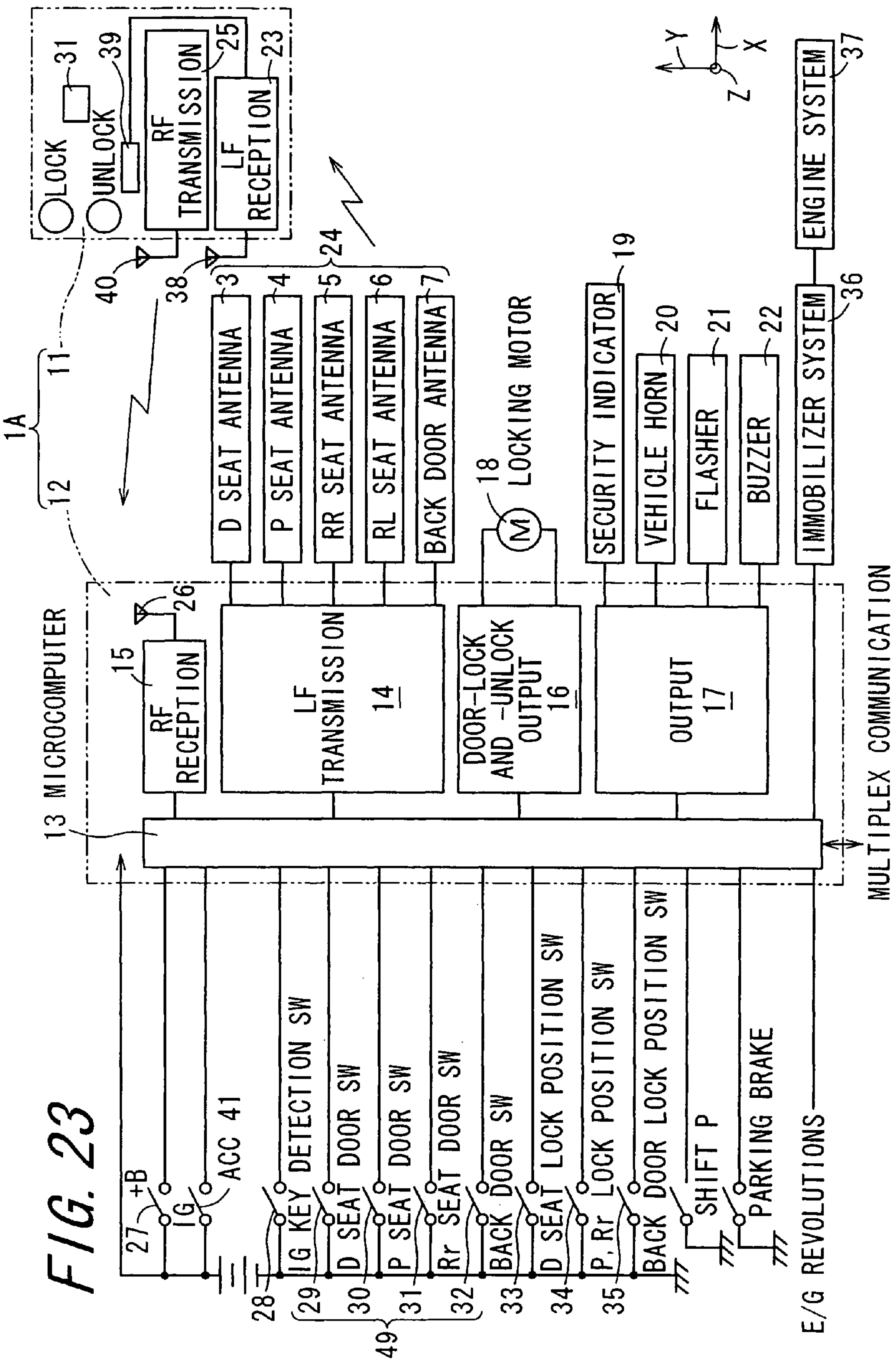
FIG. 23 is a block diagram illustrating an electrical configuration of a vehicle control apparatus according to one embodiment of the invention.
Figure 24:
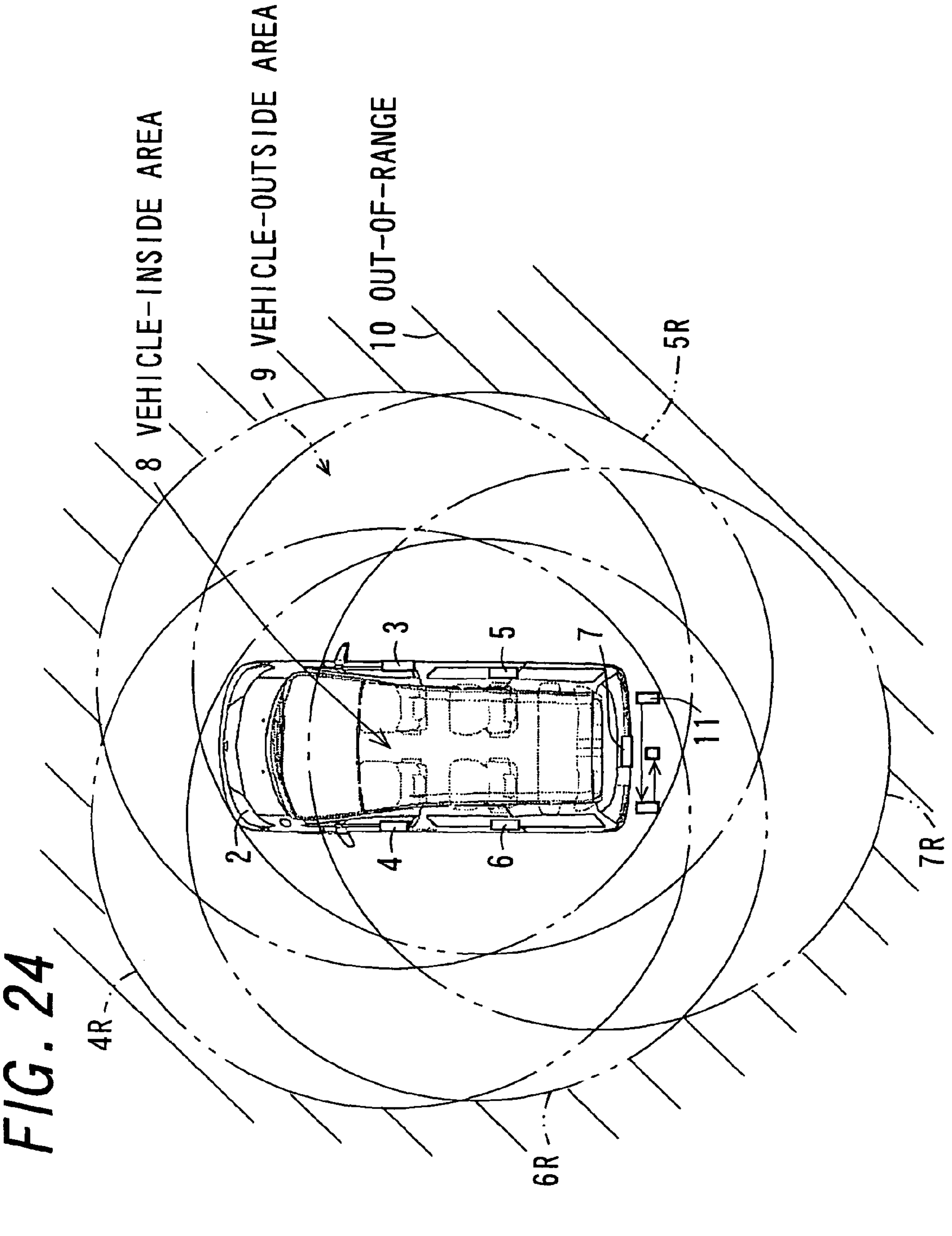
FIG. 24 is a plan view illustrating the relationship between the respective transmission antennas for the vehicle, and a vehicle-inside area, a vehicle-outside area and an out-of-range area.

A vehicle control apparatus according to the present embodiment is preferably applied to a so-called smart entry system of a vehicle. Descriptions hereinbelow include descriptions of a method of controlling a vehicle. FIG. 23 is a block diagram illustrating an electrical configuration of the vehicle control apparatus 1A according to one embodiment of the invention. FIG. 24 is a plan view illustrating the relationship between the respective transmission antennas 3 to 7 for the vehicle 2, and a vehicle-inside area 8, a vehicle-outside area 9 and an out-of-range 10. These areas will be defined later. The vehicle control apparatus 1A is an apparatus for remotely controlling the vehicle 2 through identification of a relative position between the vehicle 2 and a smart key 11 by use of radio waves. The vehicle control apparatus 1A includes a main control portion 12 provided in the vehicle 2 and the smart key 11 serving as a portable unit which can be carried. The main control portion 12 and the smart key 11 communicate with each other, and according to the relative position between the vehicle 2 and the smart key 11, the remote control of the vehicle 2 is performed. The main control portion 12, which is used for controlling the vehicle 2, includes a main microcomputer 13, an LF (long frequency) transmission portion 14, an RF (radio frequency) reception portion 15, a door-lock/door-unlock output driver 16 serving as a door control portion, and an other-output driver 17. Note that the LF transmission portion 14, the RF reception portion 15, the door-lock/door-unlock output driver 16, and the other-output driver 17 may be separate units. Each antenna may incorporate the LF transmission portion therein. The antenna of the RF reception portion may be an external antenna. That is to say, the antenna may be provided an outside of the chassis; in more detail, the antenna may be an antenna disposed on another position of the vehicle 2, that is, the antenna may be a film antenna attached to a window surface, or may be an antenna disposed on the top of the dashboard.

The main computer 13 includes a central processing unit (CPU for short), a ROM (read only memory), a RAM (random access memory), a bus, an input/output interface, and a timer. The CPU, the ROM, and the RAM each are electrically connected to the input/output interface via the bus. The input/output interface are electrically connected the LF transmission portion 14, the RF reception portion 15, the door-lock/door-unlock output driver 16 for driving and controlling a particular electric component which includes a security indicator 19, a vehicle horn 20, a flasher 21, a buzzer 22, and a power window (not shown).

The LF transmission portion 14 is electrically connected to an LF transmission antenna 24 for transmitting a search signal for detecting the smart key 11 to the LF reception antenna 38 (as described later). The RF reception portion 15 is electrically connected to an RF reception antenna 26 for acquiring a response signal which is transmitted from an RF transmission antenna 40 (as described later). The LF transmission antenna 24 is composed of a driver seat (D seat) antenna 3, a passenger seat (P seat) antenna 4, a rear right seat (RR seat) antenna 5, a rear left seat (RL seat) 6, and a back door antenna 7.

An ignition (IG) switch 27, an ACC (accessory) switch 41, an IG key detection switch 28 are electrically connected to the input/output interface respectively. A D door switch 29, a P door switch 30, a rear seat door switch 31 (there are a RR door switch and an RL door switch but only one of them is shown in FIG. 23 as a switch for the rear seat use), and a back door switch 32 are electrically connected to the input/output interface respectively. A D seat lock position switch 33, a P seat and a rear seat lock position switch 34 (which are provided in each door, but only one switch is shown in FIG. 23), and a back door lock position switch 35 are electrically connected to the input/output interface. Moreover, a shift position switch (referred to as a shift P) for determining a shift position, and a parking brake switch for determining whether a parking brake is ON or OFF are electrically connected to the input/output position switch. For example, a tachometer for detecting engine revolutions is connected to the input/output interface. And a multiplex communication bus line such as a CAN is connected to the input/output interface. Furthermore, an engine system 37 is electrically connected to the input/output interface via an immobilizer system 36.

The IG key detection switch 28 detects whether or not the ignition key has been inserted into an ignition key cylinder (not shown). Each of the door switches 29 to 32 which is referred to as a courtesy switch 49, detects whether each door is open or closed. Each of the lock position switches 33 to 35 detects whether a lock mechanism of each door is locked or unlocked.

As shown in FIG. 24, the vehicle-inside area 8 is an area within a vehicle, in which the relative position information of the smart key 11 to the vehicle 2 can be calculated. The vehicle-outside area 9 is an area located in the acceptable range in which the smart key 11 can receive the search signal transmitted from the respective antennas 3 to 7 of the vehicle 2. The out-of-range 10 is an outside area of the vehicle (as illustrated by diagonal lines in FIG. 24) in which the smart key 11 cannot receive the search signal from any of the LF transmission antennas 24. In FIG. 24, a communicable area in the vehicle-outside area 9 is described as 3R, in which the smart key 11 is capable of receiving the search signal transmitted from the D seat antenna 3. The communicable area 3R has a circle area having a radius of, for example, 3 m centered on the D seat antenna 3. However, it is not necessary to set all the communicable areas 3R, 4R, 5R, 6R, and 7R of antennas 3 to 7 to have the circle with the same radius.

When the smart key 11 is located in the out-of-range 10, the search signal outputted from the respective antennas 3 to 7 does not reach the smart key 11 and therefore, no response signal is transmitted from the smart key 11. In this case, the main microcomputer 13 determines that the smart key 11 is located in the vehicle-outside area.

When the smart key 11 enters the communicable area 3R, the smart key 11 receives the search signals transmitted from the respective antennas 3 to 7, and sends back the response signals in response to the received search signals. As described above, the main microcomputer 13 calculates the relative position information of the smart key 11 based on the field strength information included in the response signal (actually, the relative position information is recognized as a position on the coordinate system shown in FIGS. 6A and 6B). Depending on the position of the smart key 11, the search signal does not reach the smart key 11 and therefore, some antennas do not receive the response signal. Even in this case, the main microcomputer 13 measures the position of the smart key 11 based on the response signal which is sent back. Thereafter, when the smart key 11 gradually approaches the vehicle 2 and enters an area adjacent to the D seat door 51, the main microcomputer 13 performs a control of unlocking the D seat door 51. To the contrary, when the smart key 11 is first located in the vehicle-outside area 9 with the door unlocked and then brought away from the vehicle 2 to enter the out-of-range 10, the main microcomputer 13 performs a control of locking all the doors.

When the position of the smart key 11 is changed in a stored way in the vehicle-outside area 9, the main microcomputer 13 may perform a control of locking or unlocking the doors. That is to say, the main computer 13 is adapted to perform a remote control on the vehicle 2 or the electrical components of the vehicle 2 in response to conformity of the position information of the moving smart key 11 with the predetermined relative position information to the vehicle 2 in the vehicle-outside area 9. In the embodiment, the remote control on the vehicle 2 includes a control of locking doors, and with an electromotive slide door, a control of opening or closing the doors, or a control of stopping the driving source of the vehicle 2. The electrical components include a power window and a back door 55. As an electrical component, an electromotive mirror etc. may be also applicable.

To be specific, as illustrated in FIG. 24, in a case where the relative position information to the vehicle 2, previously stored in the ROM of the main microcomputer 13 is composed of information that the position is sequentially shifted to (K14), (G14), and (I14), when the user sequentially moves the smart key 11 to (K14), (G14), and (I14) in the vehicle-outside area 9, that is, when the position is changed in the predetermined way, in response to conformity of the stored position information with the position information of the smart key 11, the main microcomputer 13 determines that the user intends to unlock the door, and thus performs a remote control of unlocking, for example, the back door 55. The configuration may be designed such that upon matching of the position information, the doors including the D seat door 51, P seat door 52, RR seat door 53, and the back door 55 are unlocked, or security is brought to an alarm status with all the doors being locked. Alternatively, applicable is that the power window is subject to the remote control of opening or closing upon matching of the position information.

Figure 25A:
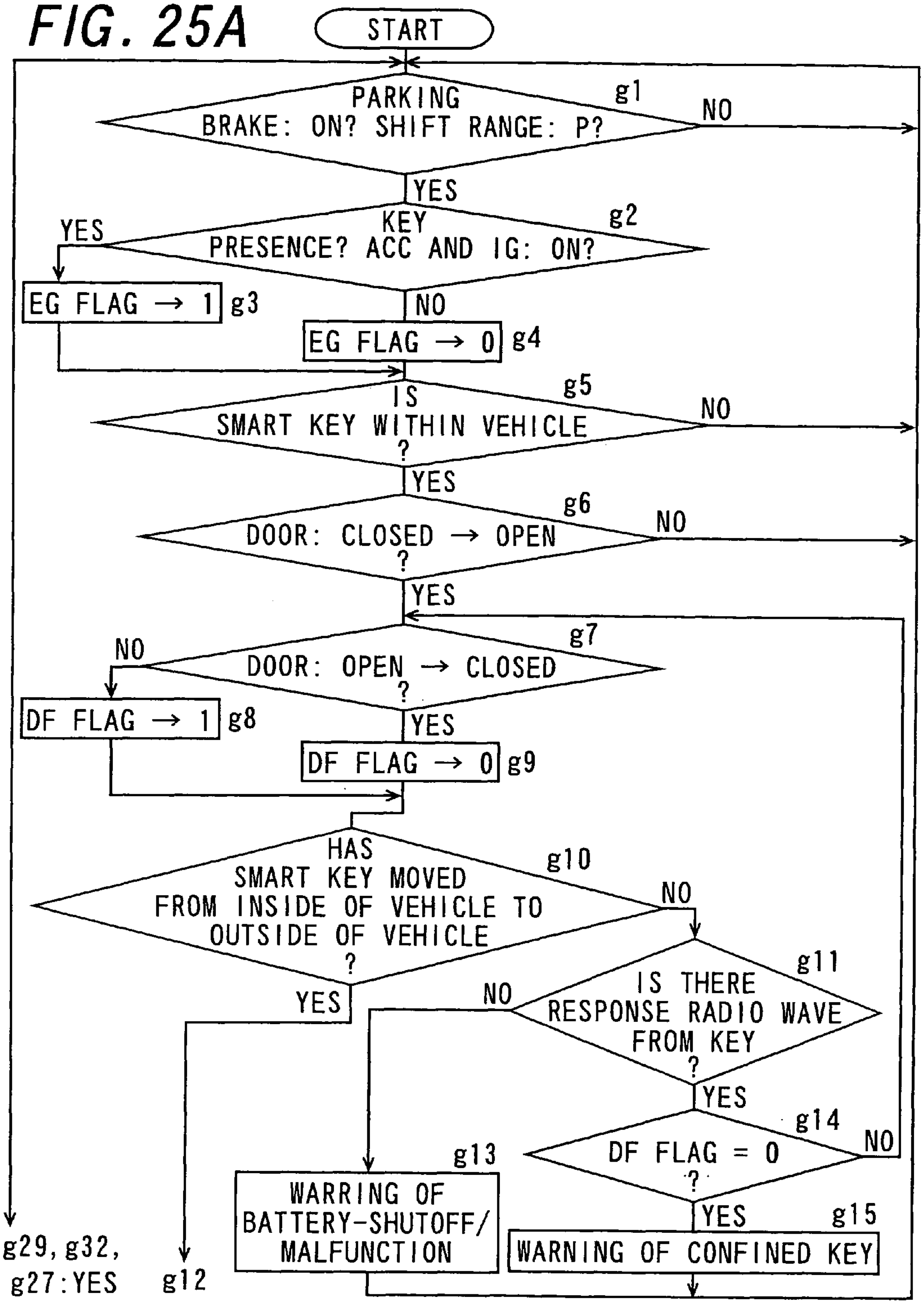
FIGS. 25A to 25C are flowcharts illustrating a method of remotely controlling the vehicle in stages.
Figure 25B:
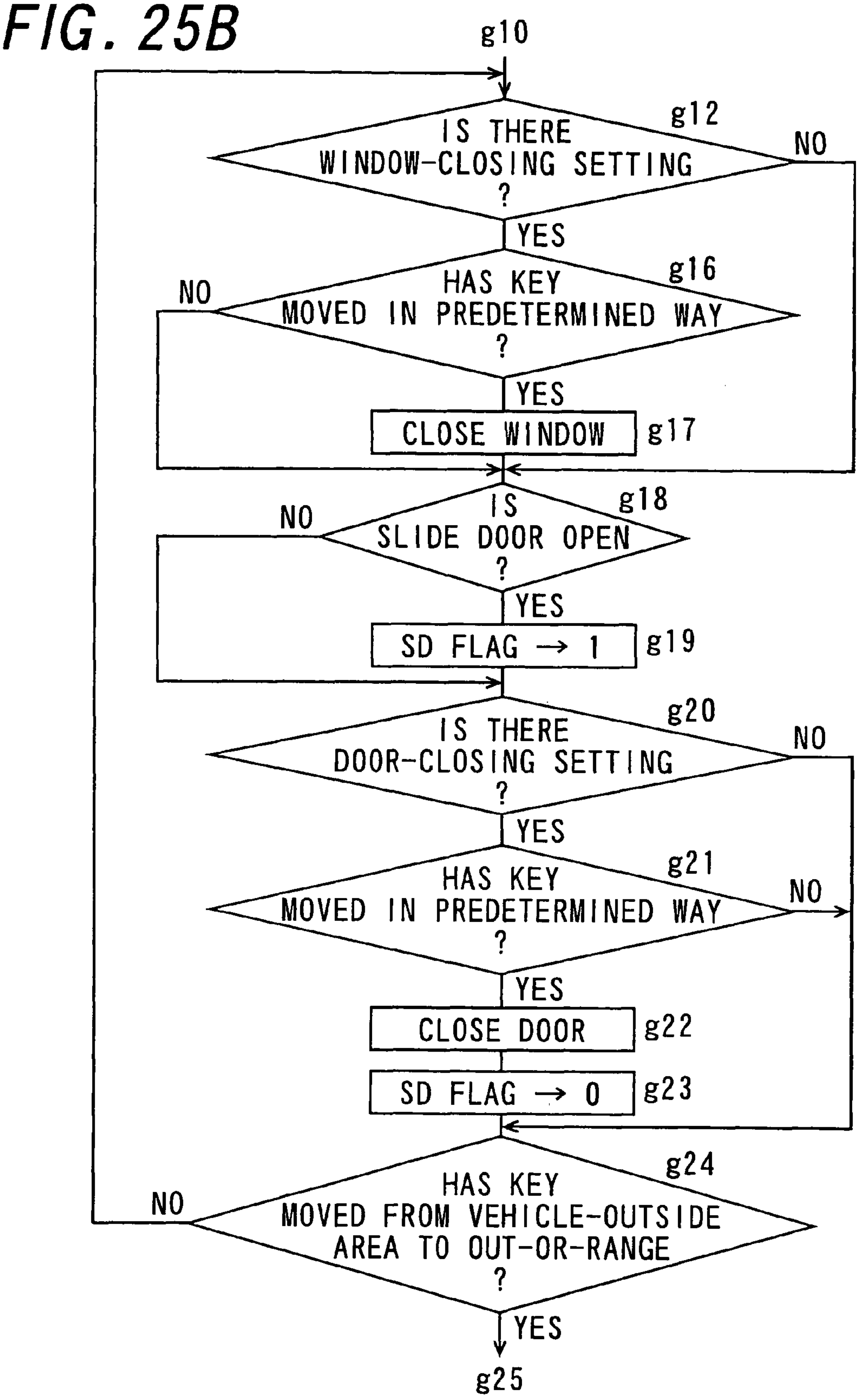
Figure 25C:
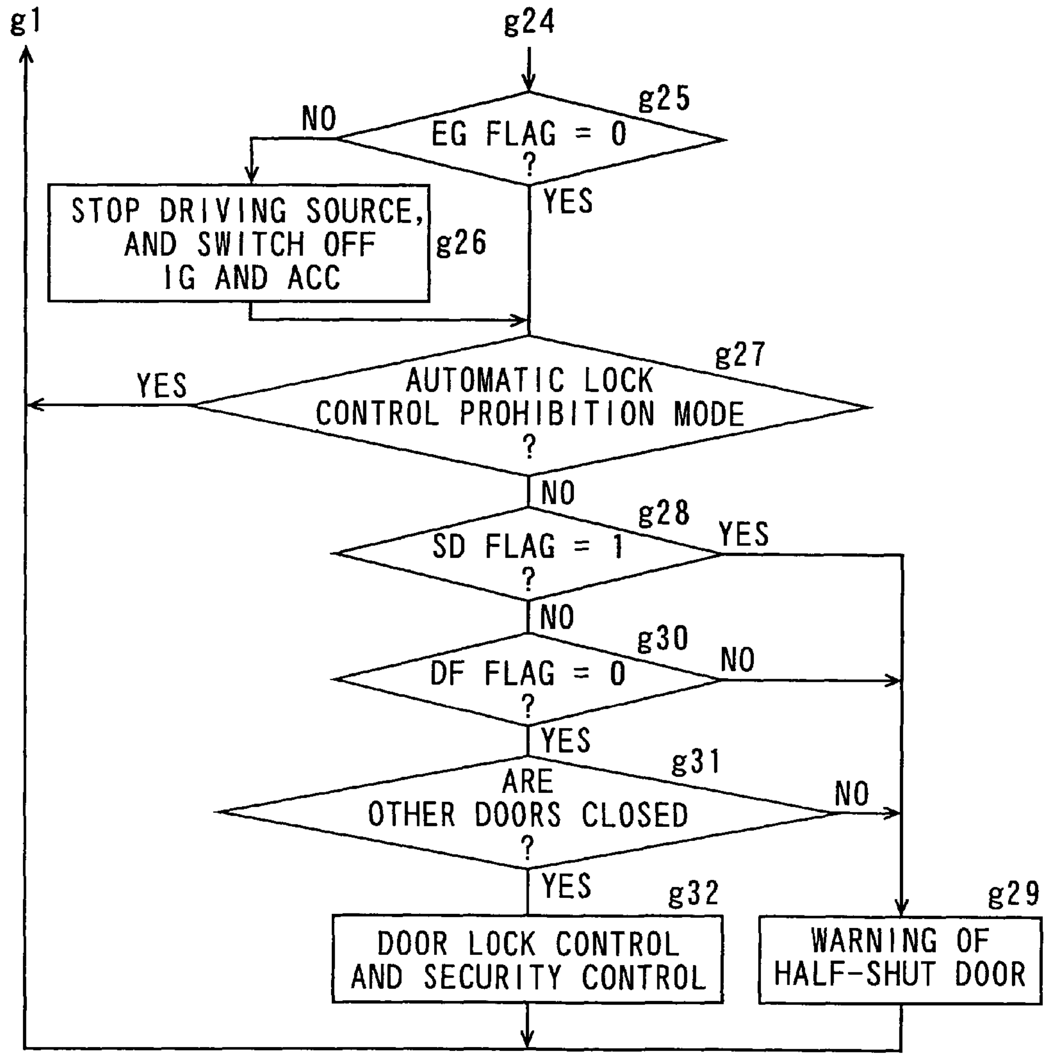

FIGS. 25A to 25C are flowcharts illustrating a method of remotely controlling the vehicle in stages. The process is started on the condition that electrical power is supplied to the main microcomputer 13. First, at Step g1, the main microcomputer 13 determines whether or not a parking brake of the vehicle 2 is ON and the shift range is in a parking position, that is, whether or not the vehicle 2 is parked. When the determination result is NO, the process returns to Step g1. When the determination result is that the parking brake is ON and the shift range is in a parking position, the process proceeds to Step g2. On the basis of an IG key detection switch 28, an IG switch 27 and an ACC switch 41, the main microcomputer 13 determines whether or not a key is inserted into a key cylinder (hereinafter referred to as a key presence) and both of the ACC switch 41 and the IG switch 27 are ON. In this process, it is determined whether or not a driving source is in operation, and with the key presence and the ACC switch 41 and IG switch 27 in ON state, the main microcomputer 13 determines that the driving source is in operation. It will be understood that a status of the driving source may be determined by direct input of the information of whether or not the driving source is in operation, from the engine system 37 shown in FIG. 23 and a driving source remote control apparatus (not shown). The engine revolutions or motor revolutions can be monitored to determine whether or not the driving source is in operation. A status of the driving source may be obtained from a signal through a multiplex communication such as a CAN.

At Step g2, when the determination result is YES, the process proceeds to Step g3 and the main microcomputer 13 sets an engine flag (referred to as an EG flag) to "1" to indicate that the driving source is in operation. When the determination result is NO, the process proceeds to Step g4 and the main microcomputer 13 sets the EG flag to "0" to indicate that the driving source is halted.

Following Step g3 and a4, the process proceeds to Step g5 where on the basis of a calculation method of the relative position information for the smart key 11 as described above, the main microcomputer 13 determines whether or not the smart key 11 is located within the vehicle. When the determination result is NO, the process returns to Step g1. When the determination result is that the smart key 11 is located within the vehicle, the process proceeds to Step g6. At this time, the main microcomputer 13 determines whether or not a D seat door 51 or the like is opened from a closed status thereof, by a detection signal from respective door switches 29 to 32. When the determination result is NO, the process returns to Step g1. When the determination result is that the D seat door is opened, the process proceeds to Step g7.

At Step g7, the main microcomputer 13 determines whether or not each door is opened or closed, by a detection signal transmitted from respective door switches 29 to 32. When the determination result is NO, the process proceeds to Step g8 where the main microcomputer 13 sets a door flag (hereinafter referred to as a DF flag) to "1" to indicate that the door is opened. When the main microcomputer 13 determines that the door is closed, the process proceeds to Step g9 where the main microcomputer 13 sets the DF flag to "0" to indicate that the door is closed. That is, in the subsequent Steps following Steps g7 to g9, the DF flag of "1" indicates that the door is opened, and the DF flag of "0" indicates that the door is opened from a closed status and then closed. Following Steps g8 and g9, the process proceeds to Step g10 where the main microcomputer 13 determines whether or not the smart key 11 has moved from the inside of the vehicle to the outside thereof, based on the relative position information of the smart key 11 calculated as described above. When the determination result is NO, the process proceeds to Step g11, and when the determination result is that the smart key has moved, the process proceeds to Step g12.

At Step g11, the main microcomputer 13 determines whether or not the main microcomputer 13 receives a response signal transmitted from the smart key 11. When the determination result is NO, it can be determined that the communication between the main microcomputer 13 and the smart key 11 is cut off in a state where the smart key is located within the vehicle. This indicates the battery shutoff or malfunction of the smart key 11. Therefore, in this case, the process proceeds to Step g13 where the main microcomputer 13 sounds a buzzer (a warning "pip-pip, pip-pip" telling the battery shutoff or malfunction of the smart key 11) via an other-output driver 17. The process then returns to Step g1. At Step g11, when the main microcomputer 13 determines that the main microcomputer 13 receives the response signal transmitted from the smart key 11, the process proceeds to Step g14 where the main microcomputer 13 determines whether or not the DF flag is "0". When the determination result is that the DF flag is "0", that is, the door is opened and closed, this indicates that a driver has moved out of the vehicle, leaving the smart key 11 in the vehicle, or the driver possibly has done so. Consequently, in this case, the process proceeds to Step g15 where the main microcomputer 13, for example, sounds a buzzer (a warning "peep-peep, peep-peep" for telling that the smart key 11 is confined in the vehicle) via the other-output driver 17. Thereafter, the process returns to Step g1. At Step g14, when the determination result is NO, the process returns to Step g7.

At Step g12, the main microcomputer 13 determines whether or not a window-closing control is set to a permission mode. The setting method will be described later. When the determination result is NO, the process proceeds to Step g18. When the determination result is that the window-closing control is set, the process proceeds to Step g16 where the main microcomputer 13 determines whether or not the smart key 11 has moved in a predetermined way. When the determination result is NO, the process proceeds to Step g18. When the determination result is that the smart key 11 has moved in a predetermined way, the process proceeds to Step g17 where the main microcomputer 13 controls, via the other-output driver 17, a power window to be driven to be closed.

Next, the process proceeds to Step g18 where the main microcomputer 13 determines whether or not a RR seat door 53 or an RL seat door 54 set as an electromotive slide door is opened, by a rear seat door switch 31. When the determination result is that both of the RR seat door 53 and the RL seat door 54 (which may be referred to as a slide door) are closed, the process proceeds to Step g20. When it is determined that any one of the doors is opened, the process proceeds to Step g19 where the main microcomputer 13 sets a slide door flag (hereinafter referred to as a SD flag) to "1" to indicate that the RR seat door 53 or the RL seat door 54 is opened.

At Step g18, when the main microcomputer 13 determines that the slide door is closed or that a setting of the slide door to be previously stored in a ROM is absent, the process proceeds to Step g20. At this time, the main microcomputer 13 determines whether or not the control for automatically closing the slide door is set to a permission mode. When the determination result is that the control is not set to the permission mode, the process proceeds to Step g24. When the determination result is that the control is set to the permission mode, the process proceeds to Step g21 where the main microcomputer 13 determines whether or not the smart key has moved in a predetermined way. When the determination result is that the smart key has moved in a predetermined way, the process proceeds to Step g22 where the main microcomputer 13 performs a control of closing the slide door. At Step g21, when the determination result is that the smart key has not moved in a predetermined way, the process proceeds to Step g24. Following Step g22, the process proceeds to Step g23, the main microcomputer 13 sets the SD flag to "0" to indicate that the slide door is closed.

At Step g24, the main microcomputer 13 determines whether or not the smart key 11 has moved from a vehicle-outside area 9 to an out-of-range 10. When the determination result is NO, the process returns to Step g12. The main microcomputer 13 determines that the smart key 11 has moved to the out-of-range 10 when the main microcomputer 13 recognizes a tendency of the relative position information of the smart key 11 that is gradually distanced away from the vehicle 2, and thereafter falls into a state in which the main microcomputer 13 cannot receive all the search signals from respective transmission antennas 3 to 7.

When the determination result is that the smart key 11 has moved, the process proceeds to Step g25 where the main microcomputer 13 determines whether or not the EG flag is "0", that is, whether or not the driving source is halted. When the determination result is NO, that is, the driving source is in operation, the process proceeds to Step g26 where the main microcomputer 13 stops the driving source such as a drive motor, and turns off the IG and the ACC. When the determination result is then YES at Step g25, the process proceeds to Step g27 where the main microcomputer 13 determines whether or not an automatic lock control prohibition mode is ON. A setting of this mode will be described later. When the determination result is NO, the process proceeds to Step g28 and when the determination result is YES, the process returns to Step g1.

At Step g28, the main microcomputer 13 determines whether or not the SD flag is "1". At this time, when the slide door, or the D seat door 51, or the other doors are open by respective door switches 29 to 32, that is, when the determination result is YES at Step g28, the process proceeds to Step g29 where the main microcomputer 13 controls, via the other-output driver 17, the buzzer 22 to output a half-shut warning telling that a door is not completely shut. The process then returns to Step g1. At Step g28, when the determination result is that the SD flag is not "1", that is, the slide door is closed, the process proceeds to Step g30.

At Step g30, the main microcomputer 13 determines whether or not the DF flag is "0". When the determination result is NO, that is, when the door has not been opened and closed, the process proceeds to Step g29. When the determination result is that the DF flag is "0", that is, when the door has been opened and closed, the process proceeds to Step g31. At this time, the main microcomputer 13 determines whether or not all other doors are closed. When it is determined that any one of the doors is opened, that is, when the determination result is No at Step g31, the process proceeds to g29.

At Step g31, when the determination result is that all other doors are closed, the process proceeds to Step g32 where the main microcomputer 13 locks all the doors (hereinafter referred to as a door lock control) and sets security to an alarm status (hereinafter referred to as security control). As in the case of the window-closing control at Step g17 as described above, the door lock control and the security control may be adapted to operate when the position of the smart key 11 is changed in a predetermined way in the vehicle-outside area 9.

Figure 26A:
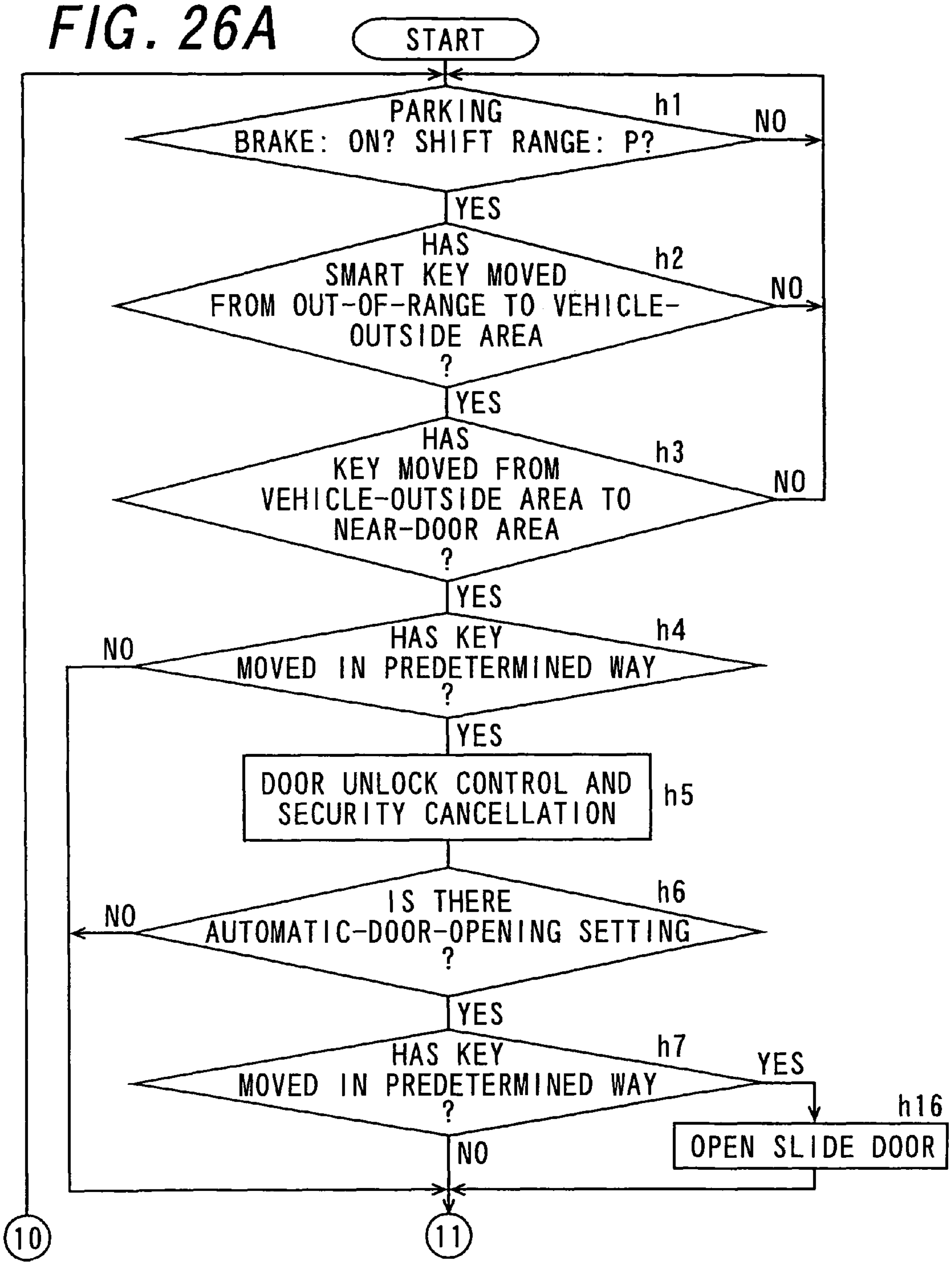
FIGS. 26A and 26B are flowcharts illustrating another method of remotely controlling the vehicle in stages.
Figure 26B:
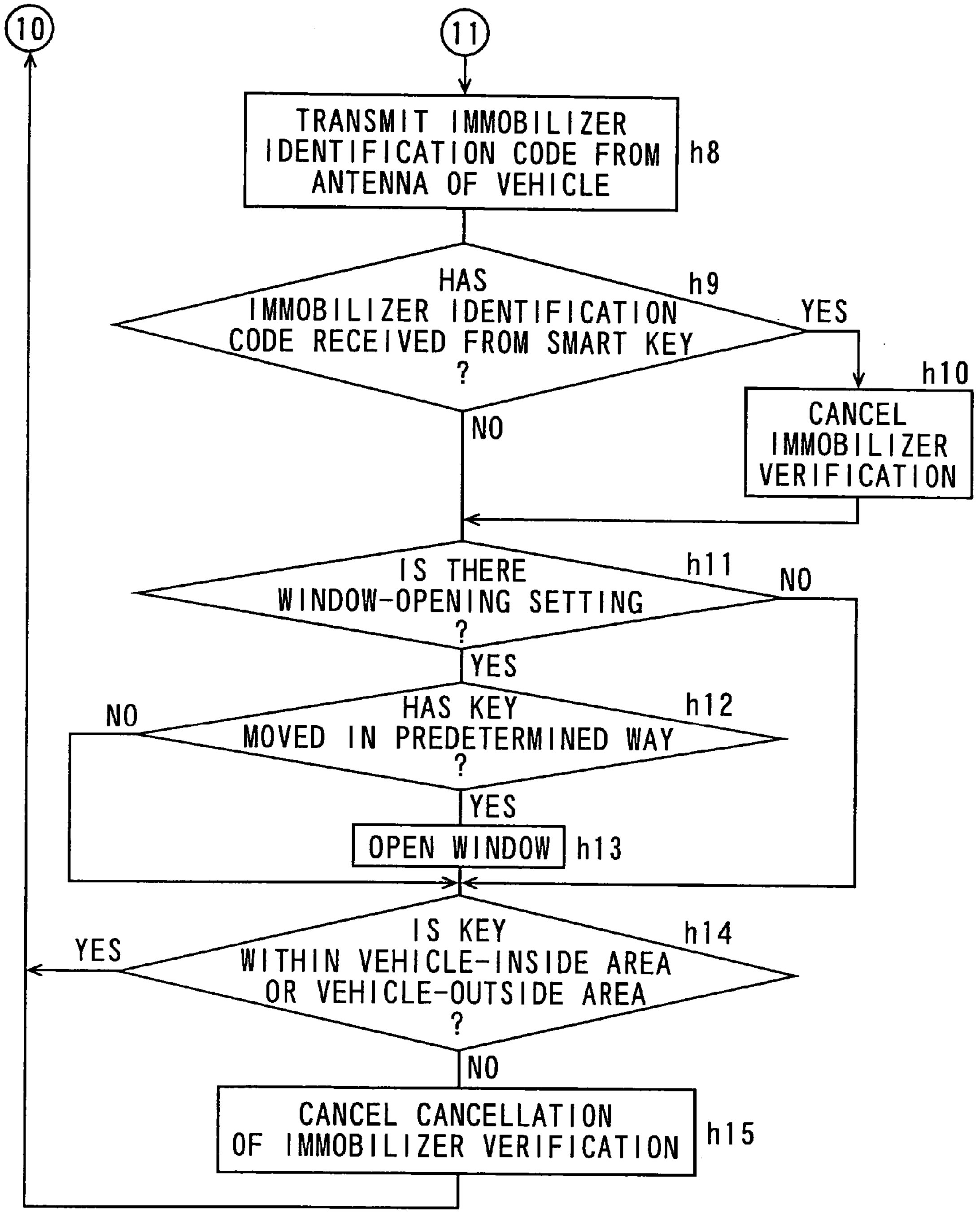

FIGS. 26A and 26B are flowcharts illustrating another method of remotely controlling the vehicle 2 in stages. The process is started on the condition that electrical power is supplied to the main microcomputer 13. First, at Step h1, the main microcomputer 13 determines whether or not a parking brake of the vehicle 2 is ON and the shift range is in a parking position, that is, whether or not the vehicle 2 is parked. When the determination result is that the parking brake is ON and the shift range is in a parking position, the process proceeds to Step h2 where the main microcomputer 13 determines whether or not the smart key 11 has moved from the out-of-range 10 into the vehicle-outside area 9.

Upon determining the position of the smart key 11, first of all, when the main microcomputer 13 cannot receive the response signals to the search signal from any of the antennas 3 to 7 in a state where the search signals are transmitted from the vehicle 2 side at a constant interval, the main microcomputer 13 determines that the smart key 11 is located in the out-of-range 10. Next, when the smart key 11 enters the vehicle-outside area 9 to allow any of the antennas 3 to 7 to receive the response signal, the main microcomputer 13 determines that the smart key 11 enters from the out-of-range 10 to the vehicle-outside area 9. When the main microcomputer 13 determines that the smart key 11 is located in the out-of-range 10, the process returns to Step h1. When the main microcomputer 13 determines that the smart key 11 has entered the vehicle-outside area 9, the process proceeds to Step h3 where the main microcomputer 13 determines whether or not the smart key moves from the vehicle-outside area 9 to the area adjacent to the door, based on the relative position information of the smart key 11 calculated as described above. When the determination result is NO, the process returns to Step h1.

When the determination result is YES at Step h3, the process proceeds to Step h4 where the main microcomputer 13 determines whether or not the smart key 11 has moved in a predetermined way. When the relative position information corresponds to the predetermined setting, that is, when the determination result is YES at Step h4, the process proceeds to Step h5. When the relative position information does not correspond to the predetermined setting, the process proceeds to Step h8. At Step h5, the main microcomputer 13 unlocks the door and controls the security so as to be released. Note that the predetermined movement at Step h4 refers to a position change of the smart key 11, for example, M5→M7→M5 in FIG. 5, which is set to indicate the user's intention to unlock the door. The position change also includes that the smart key 11 stays at a certain position such as the front of the door (for example, M6 in FIG. 5) for a predetermined length of time. Alternatively, Step h4 may be eliminated and the door unlocking and the security release may be achieved when the smart key has moved to the area adjacent to the door at Step h3.

Next, at Step h6, the main microcomputer 13 determines whether or not the control for automatically opening the slide door is set to a permission mode. When the control is not set to the permission mode, the process proceeds to Step h8. When the control is set to the permission mode, the process proceeds to Step h7. At Step h7, the main microcomputer 13 determines whether or not the smart key 11 has moved in a predetermined way. When the determination result is that the smart key 11 has moved in a predetermined way, the process proceeds to Step h16 where the main microcomputer 13 performs a control of opening the slide door. The process then proceeds to the h8. When the determination result is that the smart key 11 has not moved in a predetermined way, the process proceeds to Step h8.

At Step h8, the main microcomputer 13 allows transmission of the immobilizer identification code from the LF transmission antenna 24 of the vehicle 2. The process then proceeds to Step h9 where the main microcomputer 13 determines whether or not the main microcomputer 13 receives the immobilizer identification code from the smart key 11. When the determination result is NO, the process proceeds to Step h11. When the determination result is that the main microcomputer 13 receives the immobilizer identification code, the process proceeds to Step h10 where the main microcomputer 13 cancels the immobilizer verification (this will be described later) The process then proceeds to Step h11.

At Step h11, the main microcomputer 13 determines whether or not the window-opening control is set to the permission mode. When the determination result is NO, the process proceeds to Step h14. When the determination result is YES, the process proceeds to Step h12 where the main microcomputer 13 determines whether or not the smart key 11 has moved in a predetermined way. When the determination result is NO, the process proceeds to Step h14. When the determination result is that the smart key 11 has moved in a predetermined way, the process proceeds to Step h13 where the main microcomputer 13 controls, via the other-output driver 17, the power window to be driven to be opened. At Step h14, the main microcomputer 13 determines whether or not the smart key 11 is located in the vehicle-inside area 8 or in the vehicle-outside area 9. When the determination result is NO, the process proceeds to Step h15 where the main microcomputer 13 cancels the cancellation of immobilizer verification. When the determination result is YES, the process returns to Step h1.

There will be described one example of a method of the window-closing setting at Step g12 as shown in FIG. 25B, the automatic lock control prohibition mode at Step g27 as shown in FIG. 25C, and the door-closing setting at Step g20 as shown in FIG. 25B. And one example of a method of the door-opening setting at Step h6, and the window-opening setting at Step h11 as shown in FIG. 26B will be described. The normal process proceeds from the operation mode to the setting mode. The predetermined operation of the various switches allows the process to proceed to the setting mode. For example, when the IG is ON five times and the door is opened and shut five times within a predetermined length of time, the normal process proceeds from the operation mode to the setting mode.

When the process enters the setting mode, an item of which setting is to be changed is selected by a predetermined switch. The item includes a window-close permission setting, a window-open permission setting, a door-close permission setting, a door-open permission setting, and the automatic lock control inhibition mode setting. For example, the item is selected by the number of the operation of the IG switch. For example, in the setting mode, when the IG is ON once, the window-close permission setting is selected, when the IG is ON twice, the window-open permission setting is selected, when the IG is ON three times, the door-close permission setting is selected, when the IG is ON four times, the door-open permission setting is selected, and when the IG is ON five times, the automatic lock control inhibition mode setting is selected.

The selection of the item leads a change in the setting of the item selected by the predetermined operation of the switch. Suppose that default values of all the items are set to prohibition. For example, while the window close permission setting is being selected, the setting is changed to "permission" when the IG is ON once and the setting is changed to "prohibition" when the IG is ON twice. The other items also have the similar function.

According to the vehicle control apparatus 1A as described above, when the main microcomputer 13 determines that the smart key 11 has moved from the vehicle-outside area 9 to the out-of-range 10, the door lock control and the like are carried out. Conversely, when the main microcomputer 13 cannot determine that the smart key 11 has moved from the vehicle-outside area 9 to the out-of-range 10, the door lock is not carried out. Therefore, even when a user or the like moves to the out-of-range 10 leaving the smart key 11 in the vehicle-inside, it is helpful in preventing the vehicle 2 from being remotely controlled undesirably. As described above, the vehicle 2 can be remotely controlled reliably.

When the process proceeds from a detection status for detecting position information of the smart key 11 within the vehicle, to a non-detection status, the main microcomputer 13 is designed to prohibit the remote control of the vehicle 2. Therefore, even when radio waves between the vehicle 2 and the smart key 11 are cut off due to battery shutoff etc. of the smart key 11 while the user moves to the out-of-range 10 leaving the smart key 11 within the vehicle, the vehicle 2 can be reliably prevented from being undesirably locked.

The main microcomputer 13 stops the driving source of the vehicle 2 and performs the remote control for locking the door of the vehicle 2 based on the position information of the smart key 11, thus allowing security to be improved. Even when a user or the like cannot recognize the driving source in operation because the silence performance of the driving source is superior, the main microcomputer 13 can securely halt the driving source. The main microcomputer 13 can control electrical components such as a power window when the position information of the moving smart key 11 corresponds to the predetermined relative position information of the vehicle 2, thus allowing operability for controlling the electrical components to be simplified. This also makes it possible to omit switching means for driving the electrical components. As a result, the production cost can be reduced accordingly.

The main microcomputer 13 can perform a remote control of locking the door of the vehicle 2 when the position information of the moving smart key 11 corresponds to the predetermined relative position information of the vehicle 2, there by allowing simplified locking operation compared to the manual key operation. A user or the like can change over a status between a control status for halting the driving source or the like and locking the door and a non-control status for prohibiting the above-described control, as may be necessary, when a third person exists adjacent to the vehicle 2, or when the vehicle 2 is continuously loaded and unloaded, or the like. The LF reception antenna 38 of the smart key 11 can acquire the field strength in X, Y, and Z directions in parallel to three axes perpendicular to one another. Therefore, the LF reception antenna 38 of the smart key 11 can surely acquire the search signal, notwithstanding a position of the smart key 11 which is carried.

Embodiment 3

Figure 27:
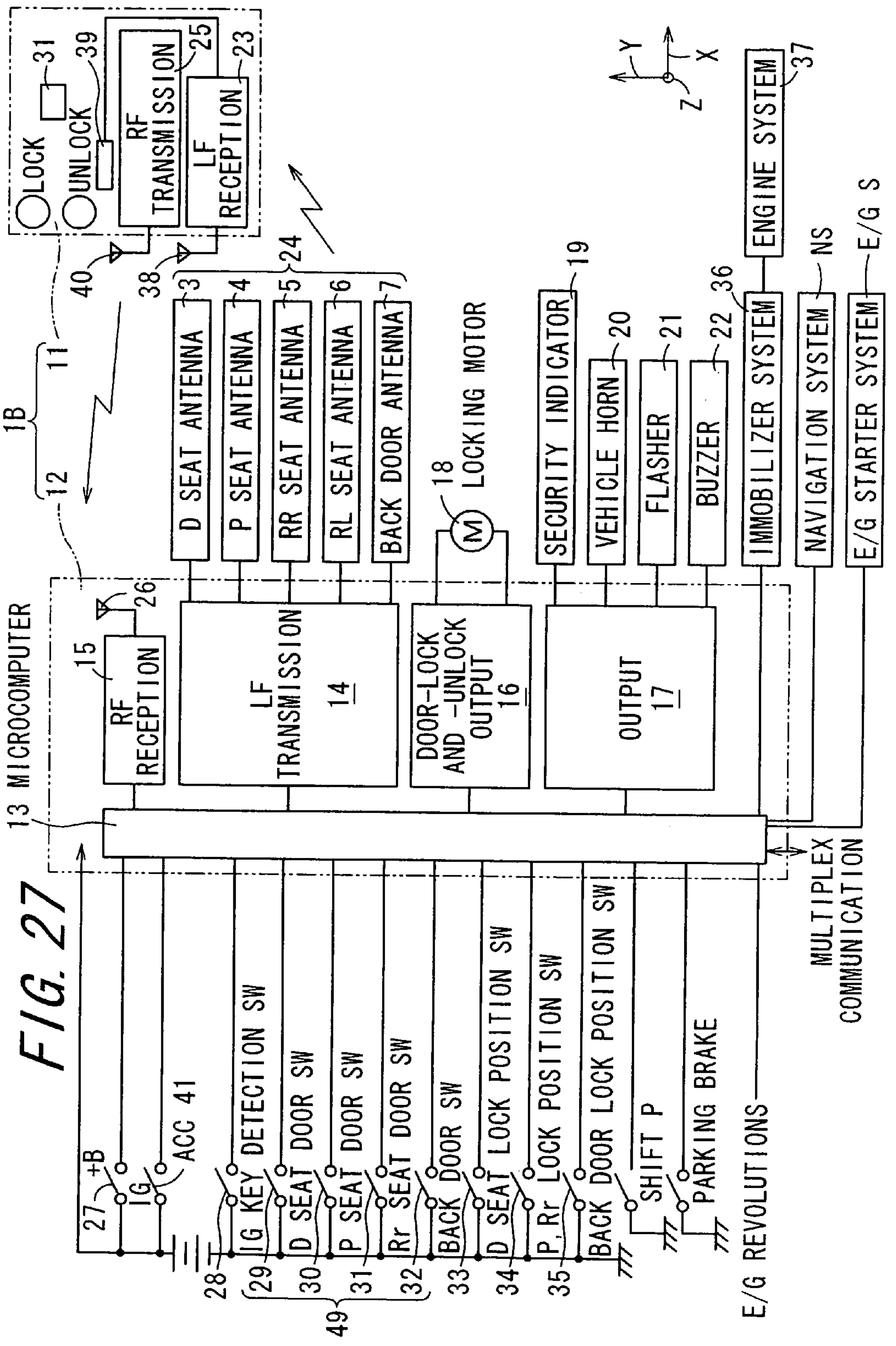
FIG. 27 is a block diagram illustrating a construction of a vehicle control apparatus according to one embodiment of the invention.

FIG. 27 is a block diagram illustrating a constitution of the vehicle control apparatus 1A according to one embodiment of the invention. In the embodiment, portions corresponding to the configuration described in the above-described embodiment will be denoted by the same reference numerals or symbols, and description thereof will be omitted. The configuration of the vehicle control apparatus 1B according to the present embodiment is similar to the configuration of the vehicle control apparatus 1A according to the above-described embodiment, except that a navigation system NS and an engine starter system E/GS are further provided in the vehicle control apparatus 1B. The navigation system NS serving as detecting means for vehicle position and the engine starter system E/GS serving as remote starting means for driving source are connected to the input/output interface of the main microcomputer 13, respectively.

Figure 28:
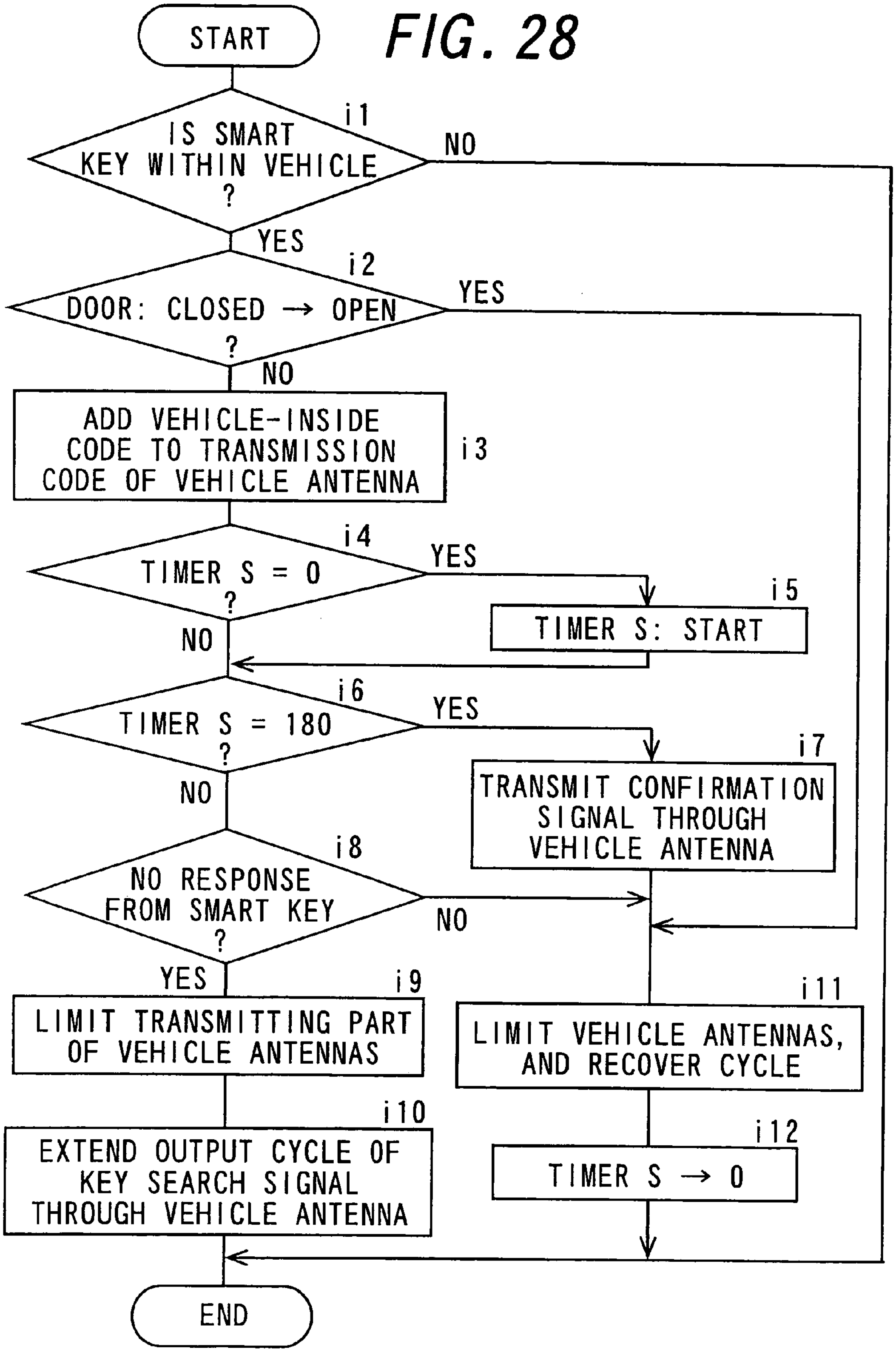
FIG. 28 is a flowchart illustrating a process of reducing load on the battery of vehicle in the main microcomputer.

FIG. 28 is a flowchart illustrating a process of reducing load on the vehicle battery, which is performed by the main microcomputer 13. This process is repeatedly carried out during the operation of smart entry system. Firstly at Step i1, in order to reduce the load on the vehicle battery in a case where the smart key 11 is located in the vehicle-inside area 8, the main microcomupter 13 determines whether or not the smart key 11 is located in the vehicle-inside area 8, based on the above-described calculation method of the relative position information of the smart key 11. When the determination result is NO, the process is terminated, while the process proceeds to Step i2 when the main microcomupter 13 determines that the smart key 11 is located in the vehicle-inside area 8. At Step i2, the main microcomupter 13 determines whether or not the D seat door 51 is opened from a closed status, by a detection signal outputted from the D seat door switch 29. When it is determined that the D seat door is open, the process proceeds to Step i11 while the process proceeds to Step i3 when the determination result is NO.

At Step i3, a vehicle interior code UC (refer to FIG. 7) is added to each of the antenna codes in order to send the search signal including the vehicle interior code UC representing information that the smart key 11 is located in the vehicle-inside area 8, from each of the antennas 3 to 7 of the LF transmission antenna 24 of the vehicle 2 to the smart key 11. Next, in order to measure a certain length of time for outputting an after-mentioned confirmation signal from the LF transmission antenna 24, the process proceeds to Step i4 where it is determined whether or not the timer is set at a "zero" second, that is to say, whether or not the timer is set at a measurement starting point for the certain length of time. When it is determined that the timer is set at the "zero" second, the process proceeds to Step i5 where the timer is made to start the measurement to then proceed to Step i6. When the determination result is NO at Step i4, that is to say, when it is determined that the timer is not set at the measurement starting point, the process proceeds to Step i6.

At Step i6, it is determined whether or not the timer reaches a measurement ending point of the certain length of time (180 sec, for example). When the determination result is NO, the process proceeds to Step i8 while the process proceeds to Step i7 when it is determined that the timer reaches the measurement ending point. At Step i7, the main microcomupter 13 transmits from the LF transmission antenna 24 to the smart key 11 a confirmation signal for requesting cancellation of output suspension of the response signal so that the smart key 11 outputs the response signal. Next, the process proceeds to Step i11. At Step i8, the main microcomupter 13 determines presence or absence of the response signal sent back from the smart key 11. When the response signal is received, that is, when the determination result is NO at Step i8, the process proceeds to Step i11 while the process proceeds to Step i9 when no response signal is received, that is, when the determination result is YES at Step i8.

At Step i9, the main microcomupter 13 limits a transmitting part of the respective antennas 3 to 7 of the LF transmission antenna 24 (for example, limited to the D seat antenna 3 only). Note that such a limitation is not limited to only the D seat antenna 3. The process then proceeds to Step i10 where the main microcomupter 13 makes an output cycle of the search signal longer than the default cycle. The default cycle is set by the timer of the main microcomupter 13. The output cycle of the search signal which is to be made longer than the above cycle, is predetermined by the main microcomupter 13. After Step i10, the process is terminated. At Step i11, the main microcomupter 13 releases the limitation of the LF transmission antenna 24 to which the limitation has been applied, and recovers the output cycle of the search signal to the default cycle. At Step i12, the timer is initialized at "0", and the process is then terminated.

Figure 29:
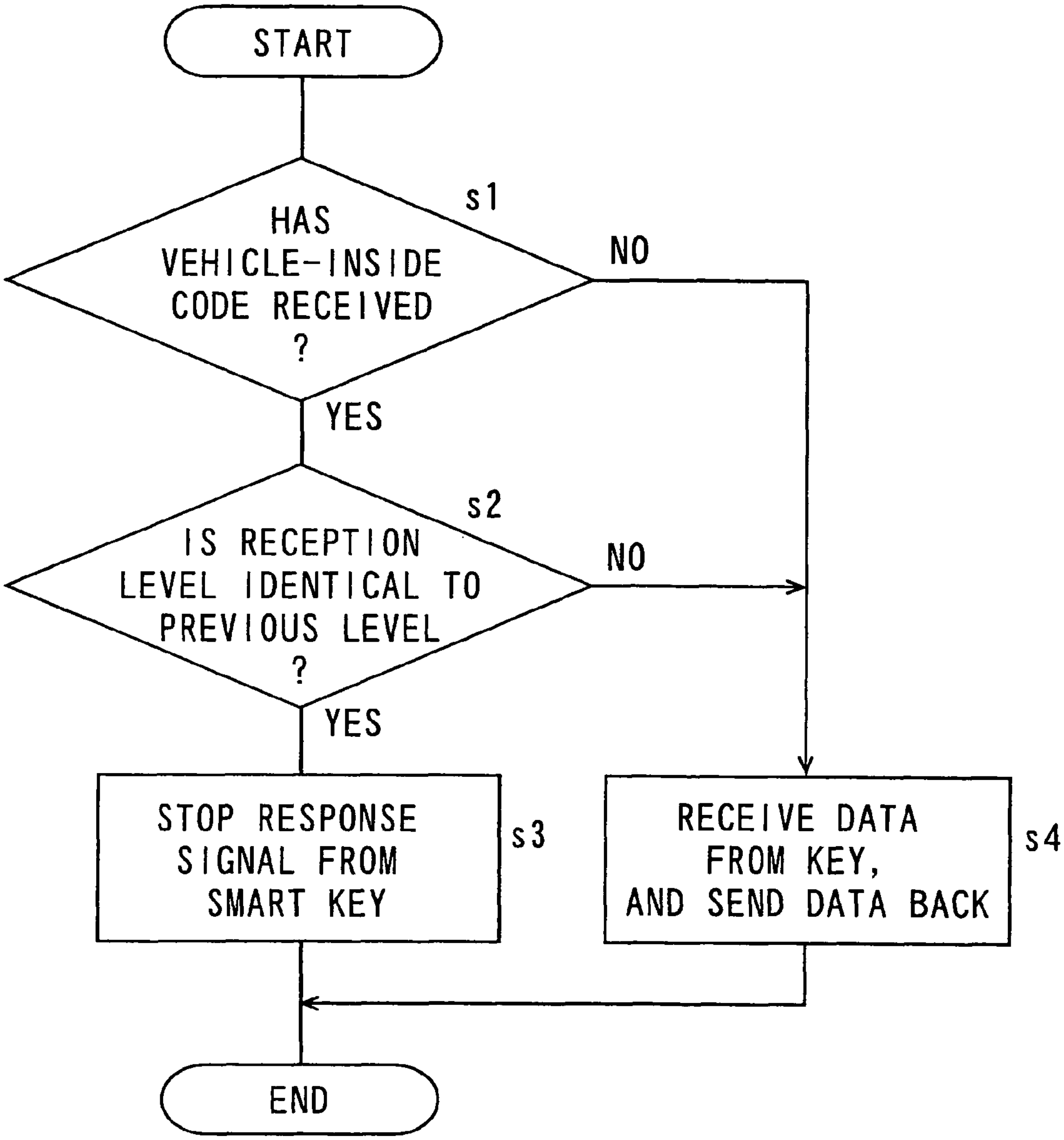
FIG. 29 is a flowchart illustrating a process of stopping a response signal in the smart key.

FIG. 29 is a flowchart illustrating a process of stopping the response signal in the smart key 11. The process is repeatedly carried out on the condition that electrical power is supplied to the mobile microcomputer. Firstly at Step s1, the mobile microcomputer determines whether or not the vehicle interior code UC has been received. When the determination result is NO, the process proceeds to Step s4 where the mobile microcomputer makes the smart key 11 send the response signal back to terminate the process. When it is determined at Step s1 that the vehicle interior code UC has been received, the process proceeds to Step s2.

At Step s2, it is determined whether or not received field strength data is the same as previously received field strength data, in order to confirm that a position of the smart key 11 has not changed in the vehicle-inside area 8. Data in a tolerance range (for example, ±10% range) with respect to the previously received field strength data is regarded as the same. This makes it possible to exclude influences generated by noise, measurement error, etc. When it is determined at Step s2 that the field strength data is not the same, the process proceeds to Step s4. Further, when it is determined that the field strength data is the same, the process proceeds to Step s3 where the mobile microcomputer stops transmission of the response signal outputted from the smart key 11.

Figure 30A:
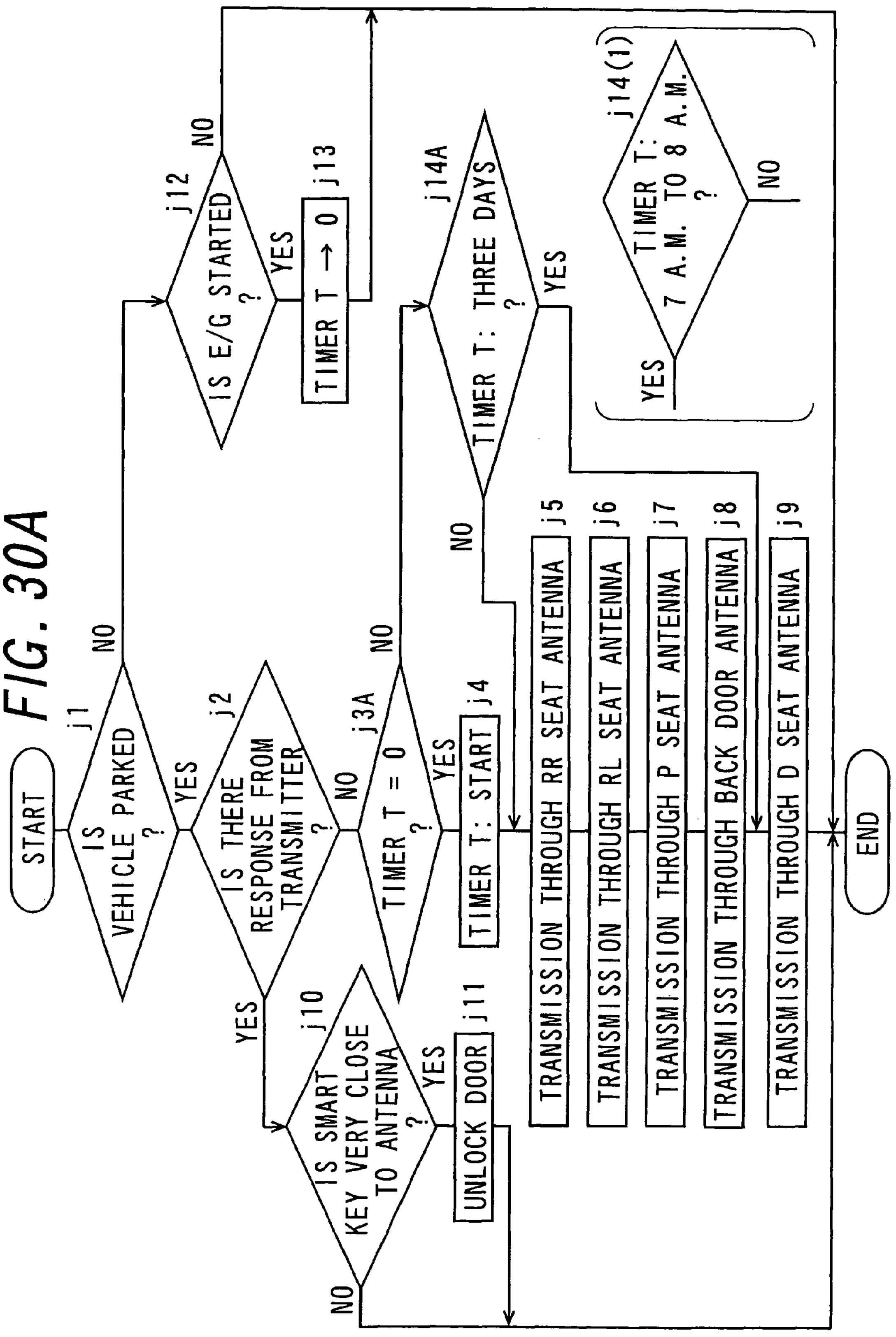
FIG. 30A is a flowchart illustrating a process of limiting the LF transmission antenna for transmitting the search signal by use of a timer.
Figure 30B:
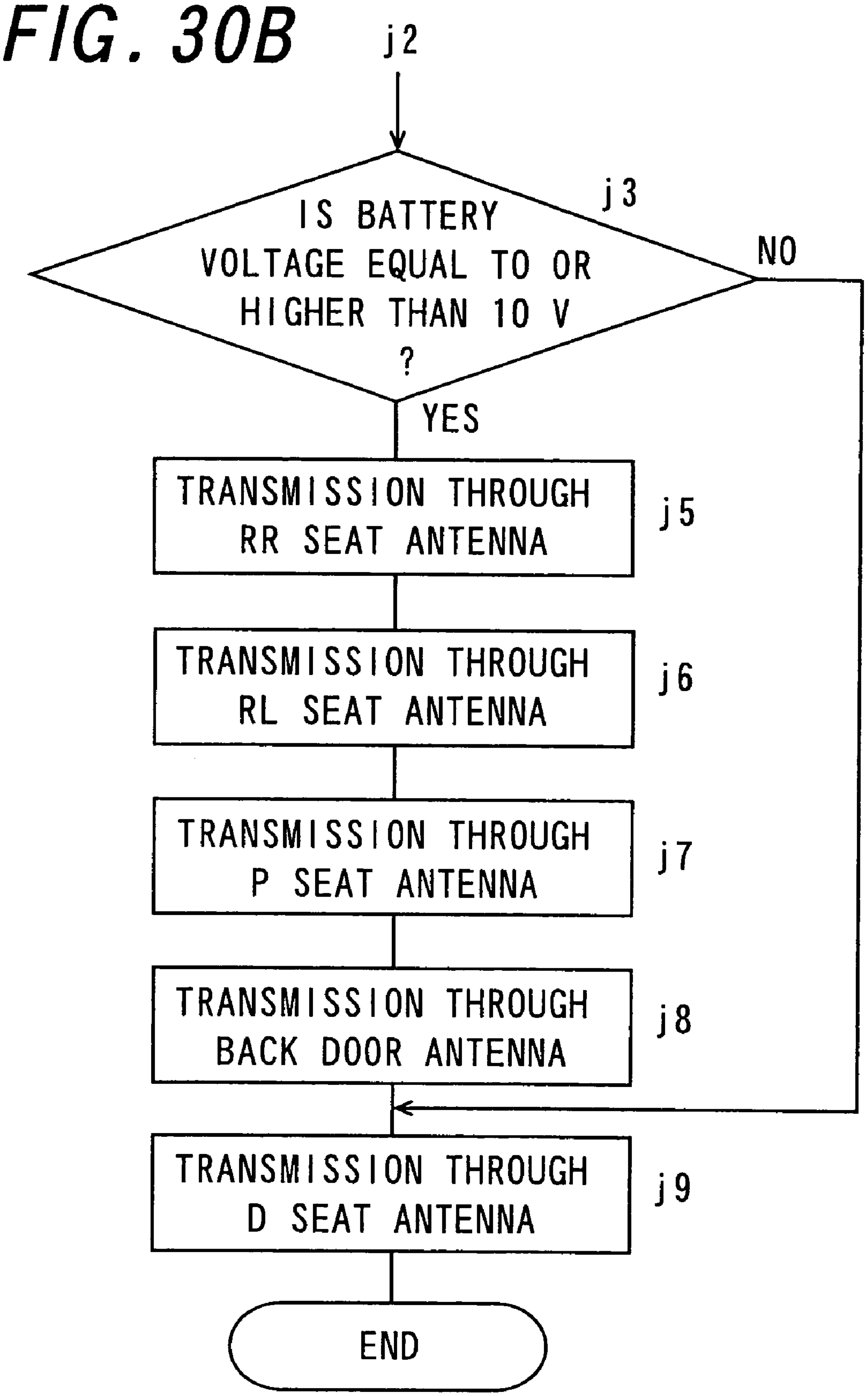
FIG. 30B is a flowchart illustrating a process of limiting the LF transmission antenna based on a battery voltage.
Figure 30C:
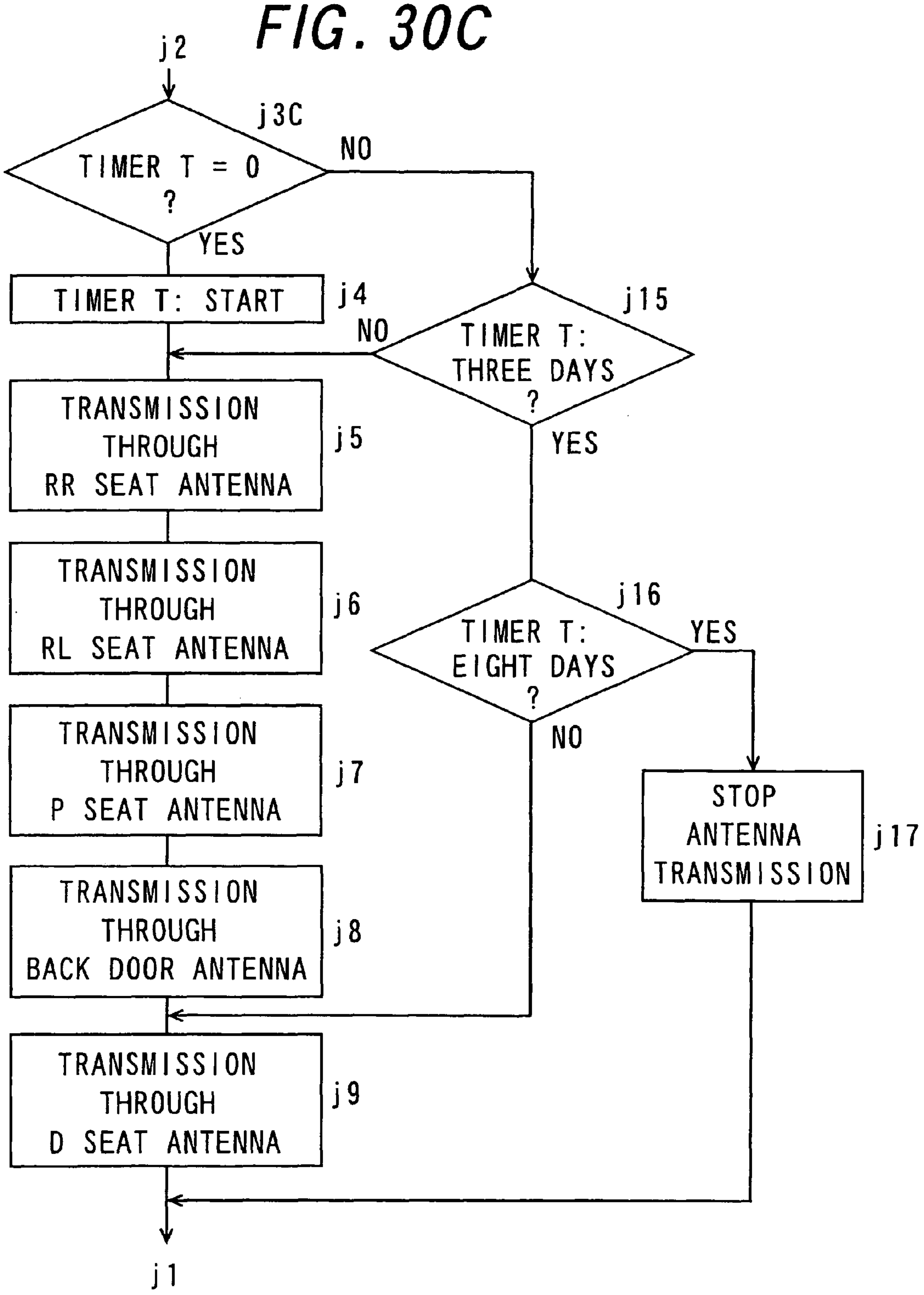
FIG. 30C is a flowchart illustrating a process of limiting the LF transmission antenna after a first time has lapsed and after a second time has lapsed.
Figure 30D:
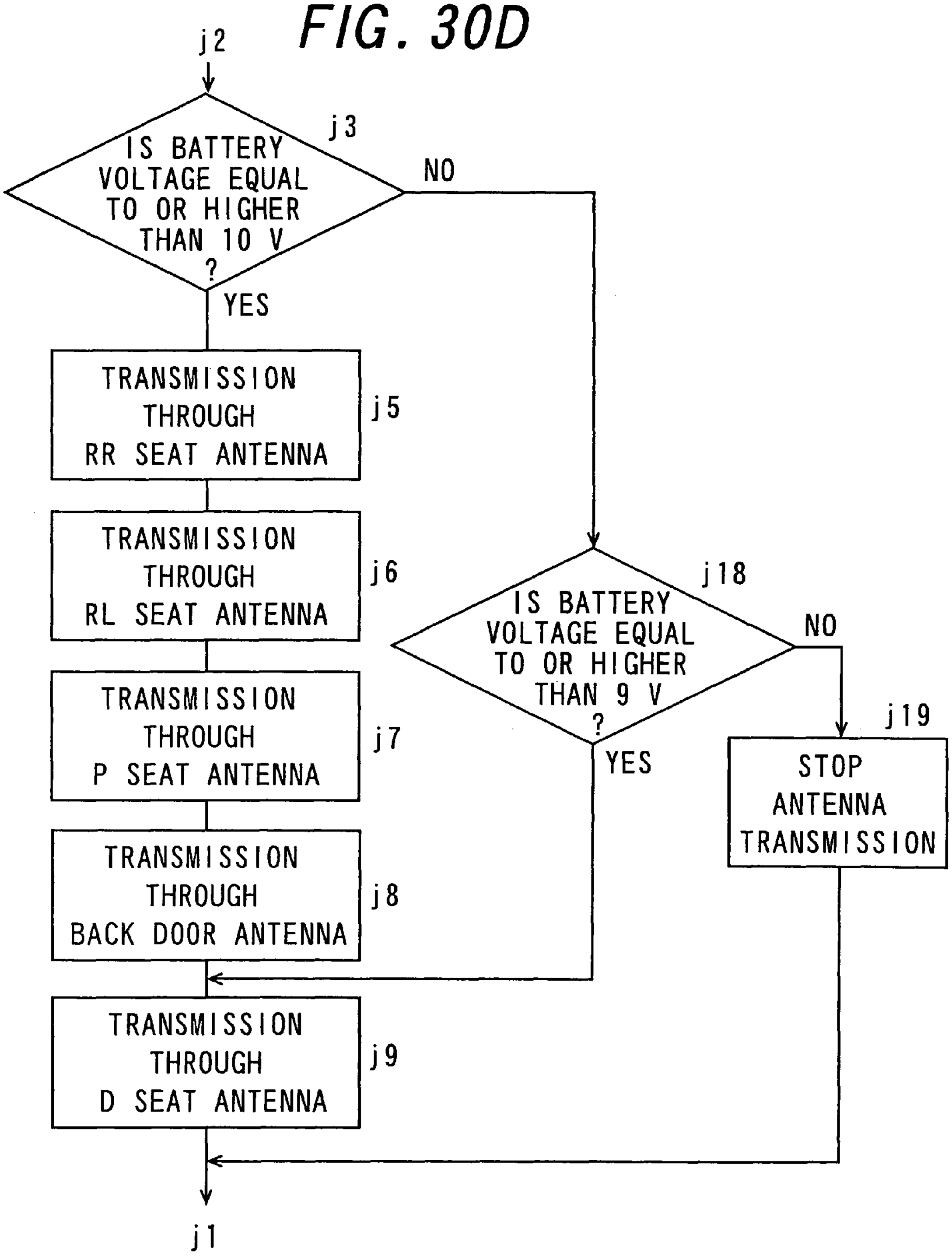
FIG. 30D is a flowchart illustrating a process of stopping the transmission of the search signal under a first voltage or less and under a second voltage or less.

FIGS. 30A to 30D are flowcharts illustrating a method of reducing the load on the vehicle battery. FIG. 30A is a flowchart illustrating a process of limiting the LF transmission antenna 24 for transmitting the search signal. FIG. 30B is a flowchart illustrating a process of limiting the LF transmission antenna 24 based on the battery voltage. FIG. 30C is a flowchart illustrating a process of limiting the LF transmission antenna 24 after a first time has lapsed and after a second time has lapsed. FIG. 30D is a flowchart illustrating a process of stopping the transmission of the search signal under a first voltage or less and under a second voltage or less. These processes are carried out by the main microcomupter 13. The flowcharts shown in FIG. 30A to FIG. 30D will be explained sequentially. Note that in the flowcharts, Steps previously explained will be denoted by the same Step numerals, and descriptions thereof will be omitted.

A process in the flowchart shown in FIG. 30A is repeatedly carried out during the operation of smart entry system. Firstly at Step j1, it is determined whether or not the parking brake of the vehicle 2 is ON and the shift range is in a parking position, that is, whether or not the vehicle 2 is parked. When the determination result is NO, the process proceeds to Step j12. When it is determined that the parking brake is ON and the shift range is in a parking position, the process proceeds to Step j2 where it is determined whether or not the response signal is outputted from the smart key 11, in order to determine absence or presence of the smart key 11 in the vehicle-outside area 9.

At Step j2, when the determination result is NO, that is, when it is determined that the smart key 11 is not located in the vehicle-outside area 9, the process proceeds to Step j3A. When the response signal is received, that is, when the smart key 11 is located in the vehicle-outside area 9, the process proceeds to Step j10. At Step j10, in order to confirm whether a driver or the like person uses the vehicle 2, it is determined whether or not the smart key 11 has moved from the vehicle-outside area 9 to the vicinity of the antenna, based on the position information of the smart key 11 obtained by the above-described calculation. When the determination result is NO, the process is terminated. When it is determined that the smart key 11 has moved to the vicinity of the antenna, that is, when the determination result is YES at Step j10, the main microcomupter 13 releases lockup of the door (unlocks the door), and the process is terminated. This makes it possible to save troubles such as inserting the key to the key cylinder of the door for an unlocking operation. The process then returns to Step j1.

At Step j3A, in order to start timing after the parking of the vehicle, it is determined whether or not the timer is set at a "zero" second, that is, whether or not the timer is set at a measurement starting point. When it is determined that the timer is set at the "zero" second, the process proceeds to Step j4 where the main microcomupter 13 starts the timer. Hereinbelow, the main microcomupter 13 makes the RR seat antenna 5 send a search signal (Step j5); makes the RL seat antenna 6 send a search signal (Step j6); makes the P seat antenna 4 send a search signal (Step j7); makes the back door antenna 7 send a search signal (Step j8); and makes the D seat antenna 3 send a search signal (Step j9). And thereafter, the process is terminated.

At Step j3A, when it is determined that the timer is not set at the "zero" second, that is to say, the timer is not set at the measurement starting point, the process proceeds to Step j14A. Since the main microcomupter 13 limits the transmitting parts of the LF transmission antenna 24 based on a length of lapse time that no response signal is outputted from the smart key 11 when the vehicle is parked, it is determined at Step j14A whether or not "three or more days", for example, have lapsed after the start of the timer. When the determination result is NO, the process proceeds to Step j5. Further, when it is determined that "three or more days" have lapsed, the process proceeds to Step j9. That is to say, when "three or more days" have lapsed, the transmitting parts of the LF transmission antenna 24 are limited to the D seat antenna 3 only. Note that, although the transmitting parts are limited to the D seat antenna 3 in the present example, it is not necessarily to limit the transmitting parts to the D seat antenna 3 only but a method of limiting the transmitting parts to the other antennas is also applicable.

At Step j12, it is determined whether or not the process has activated the driving source (engine). For example, on the basis of the IG key detection switch 28, the IG switch 27, and the ACC switch 41, it is determined whether or not the key has been inserted in the key cylinder (hereinafter referred to as a "key presence"), and both of the ACC and the IG are in the ON state, and it is thereby determined whether or not the driving source has been activated with the key presence and the ACC and IG in the ON state. Needles to say, the determination may be made by a direct input of the information as to whether or not the driving source has been activated, from the engine system 37 shown in FIG. 27 and the driving source remote controller (not shown). Monitoring of the engine revolutions and the motor revolutions may also be used to determine whether or not the driving source has been activated. A signal through a multiplex communication such as CAN may also be used to obtain the status of the driving source. When it is determined at Step j12 that the driving source has not been activated, the process is terminated. When it is determined that the driving source has been activated, the process proceeds to Step j13 where the timer is initialized to the measurement starting point, that is, the "zero" second. The process then returns to Step j1.

In the present flowchart, Step b14A may be replaced by Step j14 (1) where the transmitting parts of the LF transmission antenna 24 are limited except for the most frequent vehicle-use hours of the day (for example, from 7 a.m. to 8 a.m). That is to say, when the determination result is NO at Step b3A, the process proceeds to Step j14 (1), and the main microcomupter 13 determines, by use of its timer, whether or not a current time is included in the most frequent vehicle-use hours. When it is determined that the current time is included in the most frequent vehicle-use hours, the process proceeds to Step j5. When it is determined that the current time is not included in the above hours, the process proceeds to Step j9 where the transmitting parts of the LF transmission antenna 24 are limited to the D seat antenna 3 only.

A flowchart shown in FIG. 30B illustrates a modified example of the process in FIG. 30A, where Step j3A has been replaced. This process is carried out by the main microcomupter 13. When the determination result is YES at Step j1 and then NO at Step j2, the process proceeds to Step j3. At Step j3, in order to limit the transmitting parts of the LF transmission antenna 24 when the vehicle battery voltage is a certain level of voltage or less, it is determined whether or not the battery voltage is 10 V or more. When the determination result is NO, that is, when it is determined that the battery voltage is less than 10 V, the process proceeds to Step j9 where the transmitting parts of the LF transmission antenna 24 are limited to the D seat antenna 3 only. When it is determined at Step j3 that the battery voltage is 10 V or more, the process proceeds to Step j5.

A flowchart shown in FIG. 30C illustrates a modified example of the process in FIG. 30A, where Step j3A has been replaced. Note that this process is carried out by the main microcomupter 13. When the determination result is YES at Step j1 and then NO at Step j2, the process proceeds to Step j3C. At Step j3C, in order to start timing after the parking of the vehicle, it is determined whether or not the timer is set at a "zero" second, that is, whether or not the timer is set at a measurement starting point. When it is determined that the timer is set at the "zero" second, the process proceeds to Step j4 where the main microcomupter 13 starts the timer. When it is determined at Step j3C that the timer is not set at the "zero" second, the process proceeds to Step j15. Since the transmitting parts of the LF transmission antenna 24 are limited based on a length of time that no response signal is outputted from the smart key 11 when the vehicle is parked, it is determined at Step j15 whether or not the first lapse time or longer time (for example, "three or more days") has lapsed after the start of the timer. When the determination result is NO, the process proceeds to Step j5.

When it is determined that "three or more days" have lapsed, the process proceeds to Step j16 where the main microcomupter 13 determines whether or not the second lapse time or longer time (for example, "eight or more days") has further lapsed after the start of the timer. Note that the second lapse time is longer than the first lapse time. When the determination result is NO, that is, when it is determined that the first lapse time or longer time has lapsed and the second lapse time has not yet lapsed after the start of the timer, the process proceeds to Step j9 where the transmitting parts of the LF transmission antenna 24 are limited to the D seat antenna 3 only. When it is determined at Step j16 that the second lapse time or longer time has lapsed, that is, when a long period of time has lapsed after the parking of the vehicle, the process proceeds to Step j17 where the transmission of the search signal outputted from the LF transmission antenna 24 is suspended. The process then returns to Step j1.

A flowchart shown in FIG. 30D illustrates a modified example of the process in FIG. 30A, where Step j3A has been replaced. Note that this process is carried out by the main microcomupter 13. When the determination result is YES at Step j1 and then NO at Step j2, the process proceeds to Step j3. At Step j3, in order to limit the transmitting parts of the LF transmission antenna 24 when the vehicle battery voltage is a certain level of voltage or less, the main microcomupter 13 determines whether or not the battery voltage is the first voltage or more (for example, 10 V or more). When the determination result is NO, that is, when it is determined that the battery voltage is less than 10 V, the process proceeds to Step j18. When it is determined that the battery voltage is the first voltage or more, the process proceeds to Step j5.

At Step j18, it is determined whether or not the battery voltage is the second voltage or more (for example, 9 V or more). Note that the second voltage is smaller than the first voltage. When it is determined that the battery voltage is the second voltage or more and less than the first voltage, the process proceeds to Step j9 where the transmitting parts of the LF transmission antenna 24 are limited to the D seat antenna 3 only. When it is determined at Step j18 that the battery voltage is less than the second voltage, the process proceeds to Step j19 where the transmission of the search signal outputted from the LF signal antenna 24 is suspended. The process then returns to Step j1.

Figure 31A:
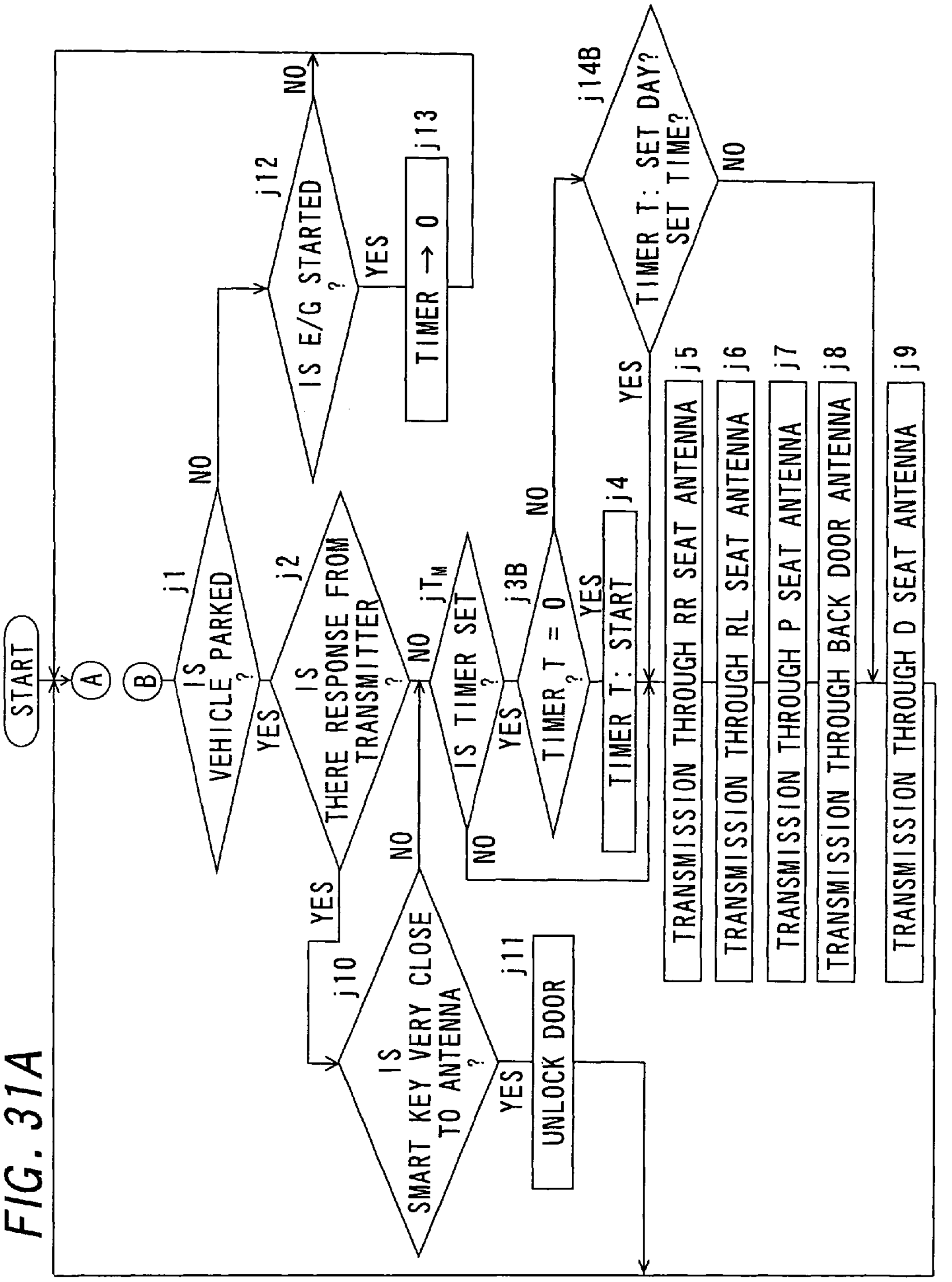
FIGS. 31A and 31B are flowcharts illustrating a process of setting a day of the week and hours of the day when the transmission antenna is limited.
Figure 31B:
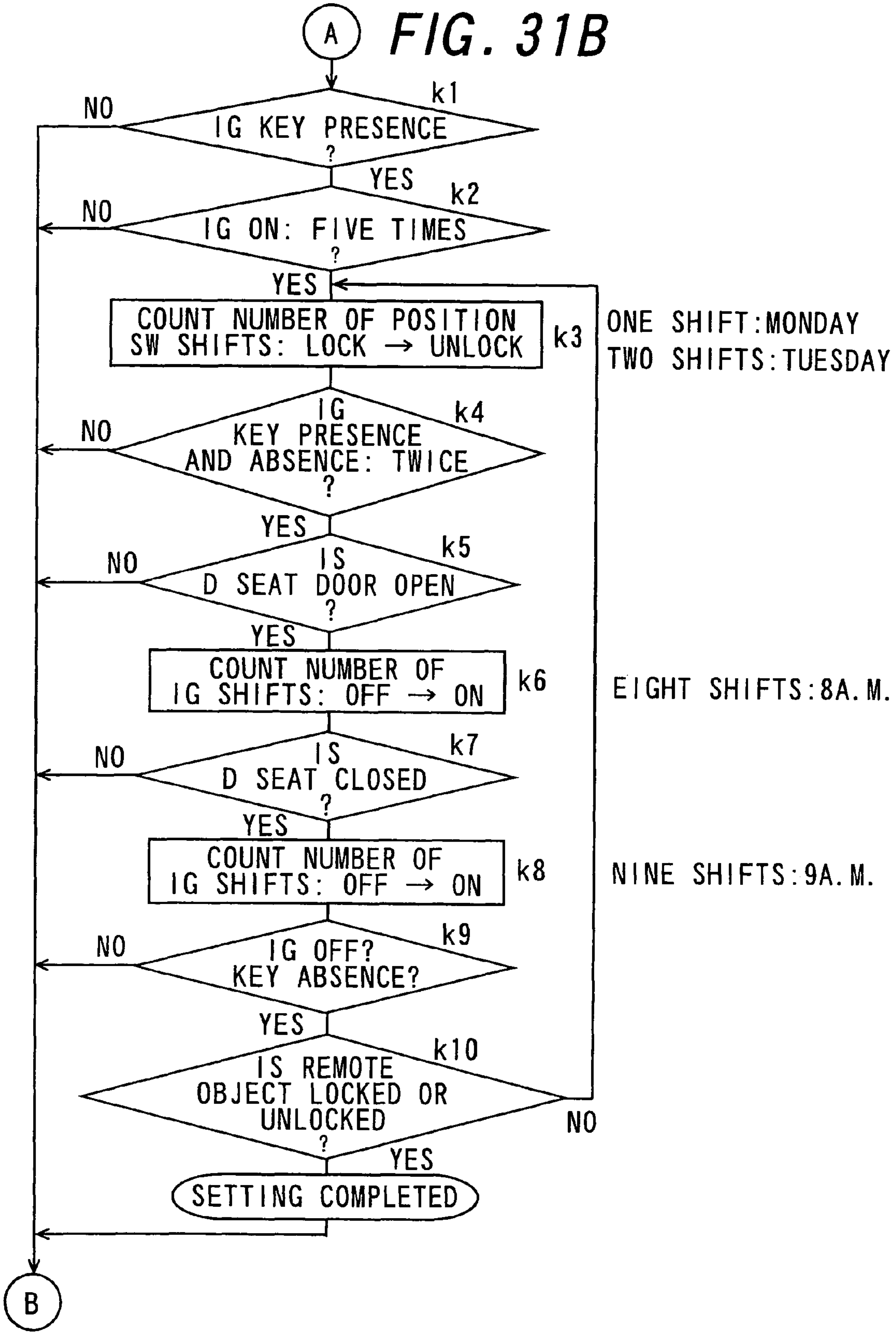

FIGS. 31A and 31B are flowcharts illustrating a process etc. for setting a day of the week and hours of the day when the transmission antenna is limited. This process is repeatedly carried out during the operation of smart entry system. Note that this process is carried out by the main microcomupter 13. Firstly at Step k1, in order to set the day of the week and the hours of the day when the transmitting parts of the LF transmission antenna 24 are limited, the main microcomupter 13 determines whether or not the present state is the above-described "key presence", based on the IG key detection switch 28, the IG switch 27, and the ACC switch 41. When the determination result is NO, the process proceeds to Step j1. When the determination result is "key presence", the process proceeds to Step k2, the main microcomupter 13 determines whether or not conditions for setting the day of the week and the hours of the day (for example, the IG switch 27 is ON "five times") have been established. The conditions are determined in advance.

When the determination result is NO, the process proceeds to Step j1. When it is determined that the conditions have been established, the process proceeds to Step k3. At Step k3, in order to firstly set the day of the week when the LF transmission antenna 24 is limited, the number of shifts of the D seat lock position switch 33 from an ON state (a lock position) to an OFF state (an unlock position) is counted, for example. When the number is one, the day is Monday and when the number is two, the day is Tuesday. To be specific, the transmitting parts of the LF transmission antenna 24 are limited. Next, the process proceeds to Step k4 where it is determined whether or not a key presence state and a key absence state have been brought two times. When the determination result is NO, the process returns to Step j1. When it is determined that the key presence state and key absence state have been brought two times, the day of the week is fixed, and the process proceeds to Step k5. That is to say, in the present example, the day of the week when the transmitting parts of the LF transmission antenna 24 is limited, is set in accordance with the number of operations of the D seat lock position switch 33, and the number of operations of the ignition key is used to determine the fixing (input completion) of setting the day of the week. A method of setting the day of the week etc. according to the present embodiment is one example using not a switch exclusively used for setting the day of the week etc. but using a heretofore known switch. The day(s) of the week is(are) designated by the number of operations within a predetermined length of time (5 sec, for example), and then fixed. One-time operation within the predetermined length of time sets Monday, and two-time operations within the predetermined length of time set Tuesday, and four-time operations within the predetermined length of time set Thursday.

At Step k5, the main microcomupter 13 determines whether or not the conditions of setting the time for limiting the LF transmission antenna 24 have been established; for example, whether or not the D seat door is open. When the determination result is NO, the process returns to Step j1. When it is determined that the D seat door is open, the process proceeds to Step k6 where a starting time for limiting the LF transmission antenna 24 is set. In the present example, the starting time for limiting the LF transmission antenna 24 is set on the condition that the D seat door is open, and the number of shifts of the IG switch 27 from the OFF state to the ON state is used to determine the fixing (input completion) of the starting time. A method of setting the starting time according to the present embodiment is one example using not a switch exclusively used for setting the starting time etc. but using a heretofore known switch. The starting time is designated by the number of operations within a predetermined length of time (20 sec, for example), and then fixed. Eight-time operations within the predetermined length of time sets 8 a.m.

Next, the process proceeds to Step k7 where it is determined whether or not the conditions of setting an ending time for limiting the LF transmission antenna 24 have been established; for example, whether or not the D seat door is closed. When the determination result is NO, the process returns to Step j1. When it is determined that the D seat door 51 is open, the process proceeds to Step k8 where the main microcomupter 13 sets the ending time for limiting the LF transmission antenna 24. In the present example, the ending time for limiting the LF transmission antenna 24 is set on the condition that the D seat door 51 is closed, and the number of shifts of the IG switch 27 from the OFF state to the ON state is used to determine the fixing (input completion) of the ending time. A method of setting the ending time according to the present embodiment is one example using not a switch exclusively used for setting the ending time etc. but using a heretofore known switch. The ending time is designated by the number of operations within a predetermined length of time (20 sec, for example), and then fixed. Nine-time operations within the predetermined length of time sets 9 a.m. Through the time setting as described above, the transmitting parts of the LF transmission antenna 24 are limited during hours except for 8 a.m. to 9 a.m., specifically.

Next, the process proceeds to Step k9, and the main microcomupter 13 determines whether or not the IG switch 27 is in the OFF state and the "key absence" state exists. When the determination result is NO, the process returns to Step j1. When it is determined that the IG switch 28 is in the OFF state and the "key absence" state exits, the process proceeds to Step k10 where the main microcomupter 13 determines whether or not a signal for unlocking the remote object has been received from the smart key 11, for example, in order to fix the set day of the week and set hours of the day. When the determination result is NO, that is, when it is determined that there is an operation of resetting the day of the week and hours of the day, the process returns to Step k3. When it is determined that the unlocking signal has been received, that is, when the determination result is YES at Step k10, the setting of the day of the week and hours of the day (setting registration) is completed. The process then proceeds to Step j1.

When the determination result is YES at Step j1 and then NO at Step j2, the process proceeds to Step j$T_M$ where it is determined whether or not the timer setting exists, that is, whether or not the day of the week and hours of the day for limiting the transmitting part of the LF transmission antenna 24 have been set. When the determination result is NO, the process proceeds to Step j5. When it is determined that the timer setting exists, the process proceeds to Step j3B where the main microcomupter 13 determines whether or not the timer is set at a "zero" second, that is to say, whether or not the timer is set at a measurement starting point. When it is determined that the timer is set at the "zero" second, the process proceeds to Step j4 where the main microcomupter 13 starts the timer.

When it is determined that the timer is not set at the "zero" second, that is to say, the timer is not set at the measurement starting point, the process proceeds to Step j14B. At Step j14B, the main microcomupter 13 determines whether or not the current time is included in the set day of the week and the set hours of the day, that is, the day of the week and hours of the day when a driver etc. frequently uses the vehicle. When it is determined that the current time is included in the set day of the week and the set hours of the day, the process proceeds to Step j5. When the determination result is NO, the process proceeds to Step j9 where the transmitting parts of the LF transmission antenna 24 are limited to the specified (set) antenna, for example, only the D seat antenna 3.

Figure 32:
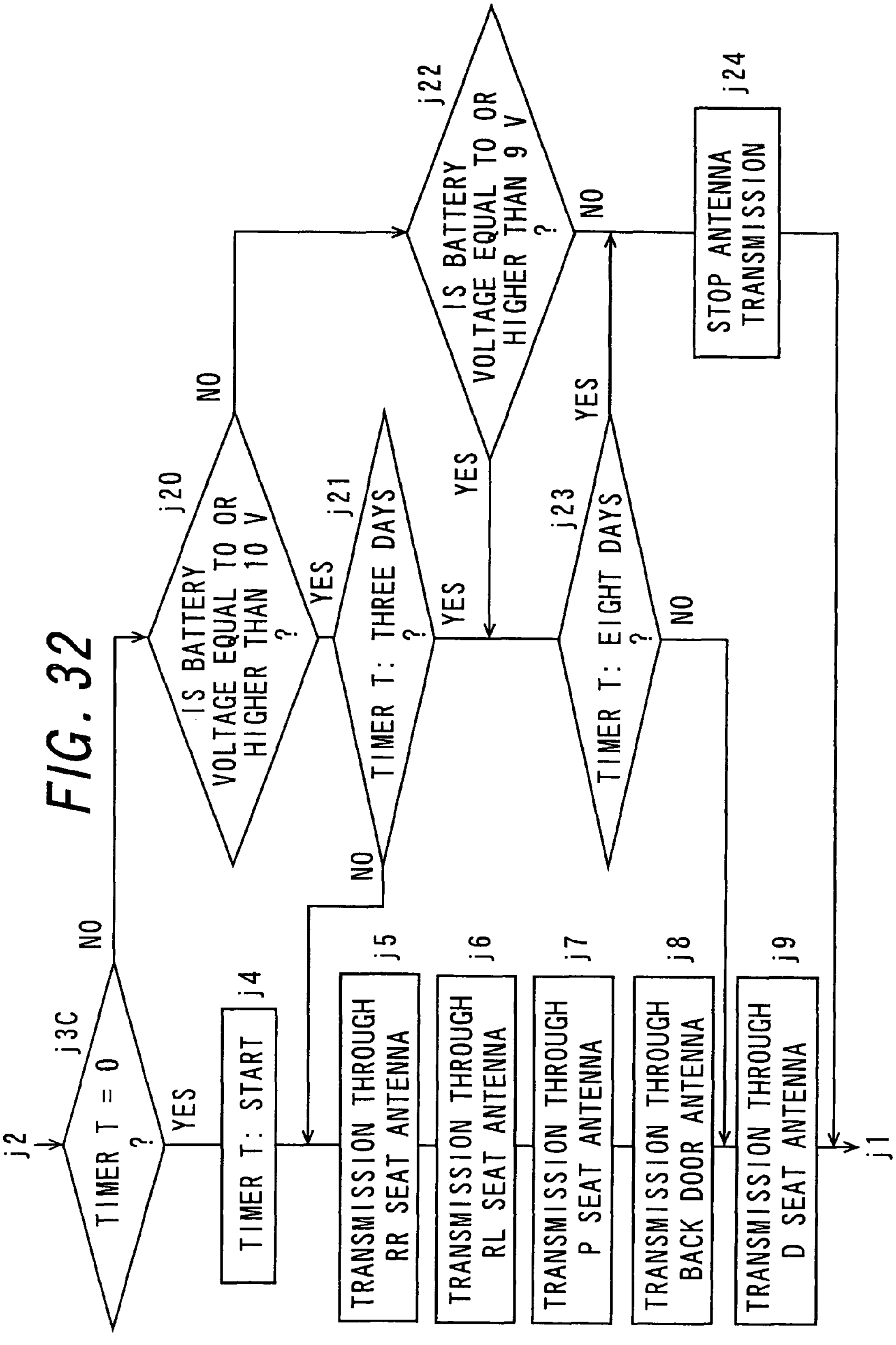
FIG. 32 is a flowchart illustrating a process of limiting the LF transmission antenna upon establishment of whichever conditions of the battery voltage and the timer comes first.

FIG. 32 is a flowchart illustrating a process of limiting the LF transmission antenna 24 upon establishment of whichever conditions of the battery voltage and the timer comes first. FIG. 32 illustrates a modified example of the process in FIG. 30A, where Step j3A has been replaced. On the condition that the electrical power is supplied to the main microcomupter 13, the present process starts. Note that this process is carried out by the main microcomupter 13. When the determination result is YES at Step j1 and then NO at Step j2, the process proceeds to Step j3C. At Step j3C, in order to start timing after the parking of the vehicle, it is determined whether or not the timer is set at a "zero" second, that is to say, whether or not the timer is set at a measurement starting point. When it is determined that the timer is set at the "zero" second, the process proceeds to Step j4 where the timer is started for measurement. When it is determined at Step j3C that the timer is not set at the "zero" second, the process proceeds to Step j20.

At Step j20, in order to limit the transmitting parts of the LF transmission antenna 24 when the vehicle battery voltage is a certain level of voltage or less, it is determined whether or not the battery voltage is the first voltage or more (for example, 10 V or more). When the determination result is NO, that is, when it is determined that the battery voltage is less than 10 V, the process proceeds to Step j22. When it is determined that the battery voltage is the first voltage or more, the process proceeds to Step j21. Since the transmitting parts of the LF transmission antenna 24 are limited based on a length of lapse time that no response signal is outputted from the smart key 11 when the vehicle is parked, it is determined at Step j21 whether or not the first lapse time or longer time (for example, "three or more days") has lapsed after the start of the timer. When the determination result is NO, the process proceeds to Step j5.

When it is determined that "three or more days" have lapsed, the process proceeds to Step j23 where the main microcomupter 13 determines whether or not the second lapse time or longer time (for example, "eight or more days") has further lapsed after the start of the timer. Note that the second lapse time is longer than the first lapse time. At Step j22, it is determined whether or not the battery voltage is the second voltage or more (for example, 9 V or more). Note that the second voltage is smaller than the first voltage. When it is determined that the battery voltage is the second voltage or more and less than the first voltage, the process proceeds to Step j23. When the determination result is No at Step j22, the process proceeds to Step j24 where the main microcomupter 13 stops transmission of the search signal outputted from the LF transmission antenna 24. The process then returns to Step j1. When the determination result is NO at Step j23, that is, when it is determined that the first lapse time or longer time has lapsed and the second lapse time has not yet lapsed after the start of the timer, the process proceeds to Step j9 where the transmitting parts of the LF transmission antenna 24 are limited to the D seat antenna 3 only. A determination obtained at Step j23 that the second lapse time or longer time has lapsed, that is, a determination that a long period of time has lapsed after the parking of the vehicle, the process proceeds to Step j24.

Figure 33A:
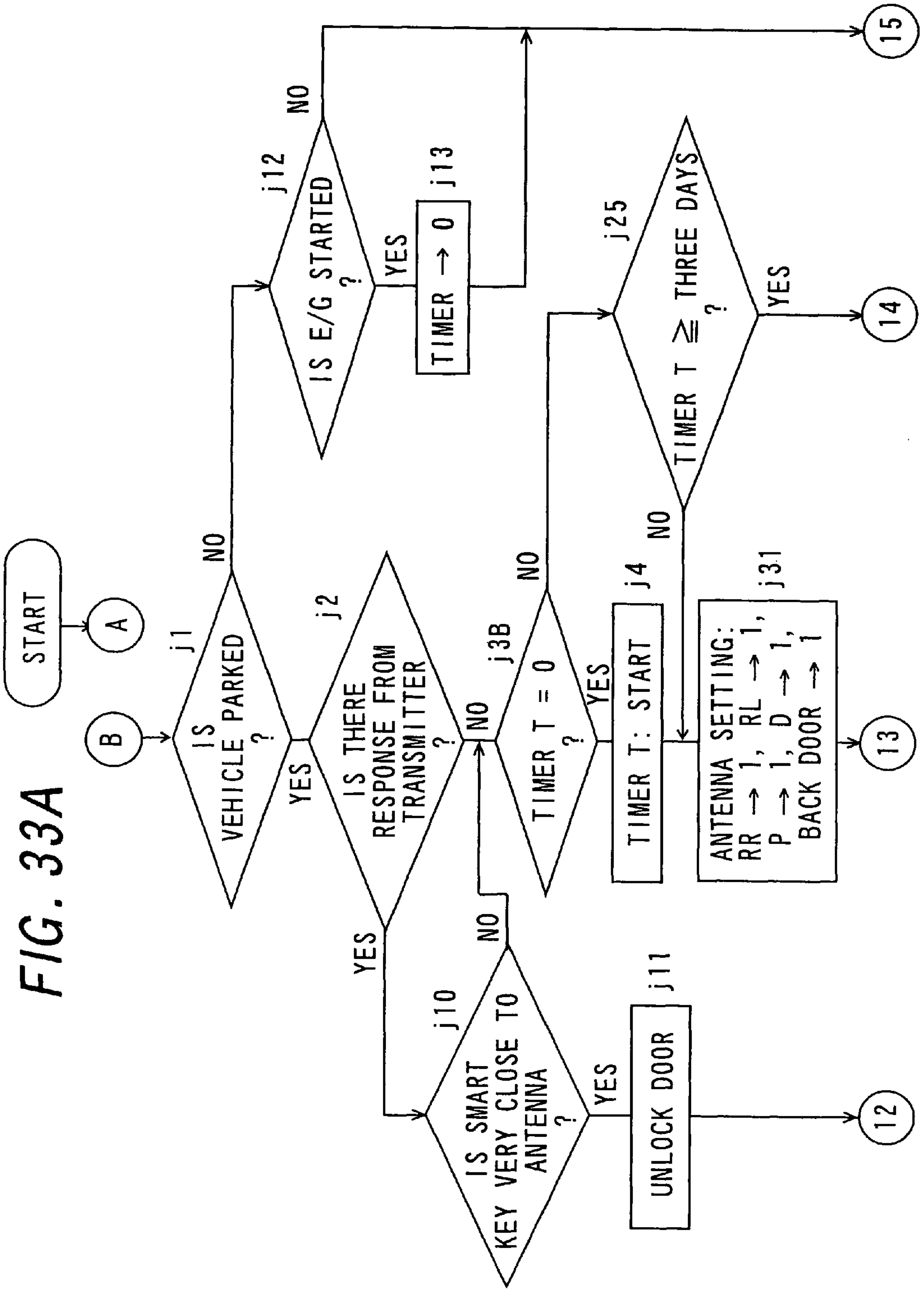
FIGS. 33A to 33C are flowcharts illustrating a process of setting a transmission antenna part to be limited.
Figure 33B:
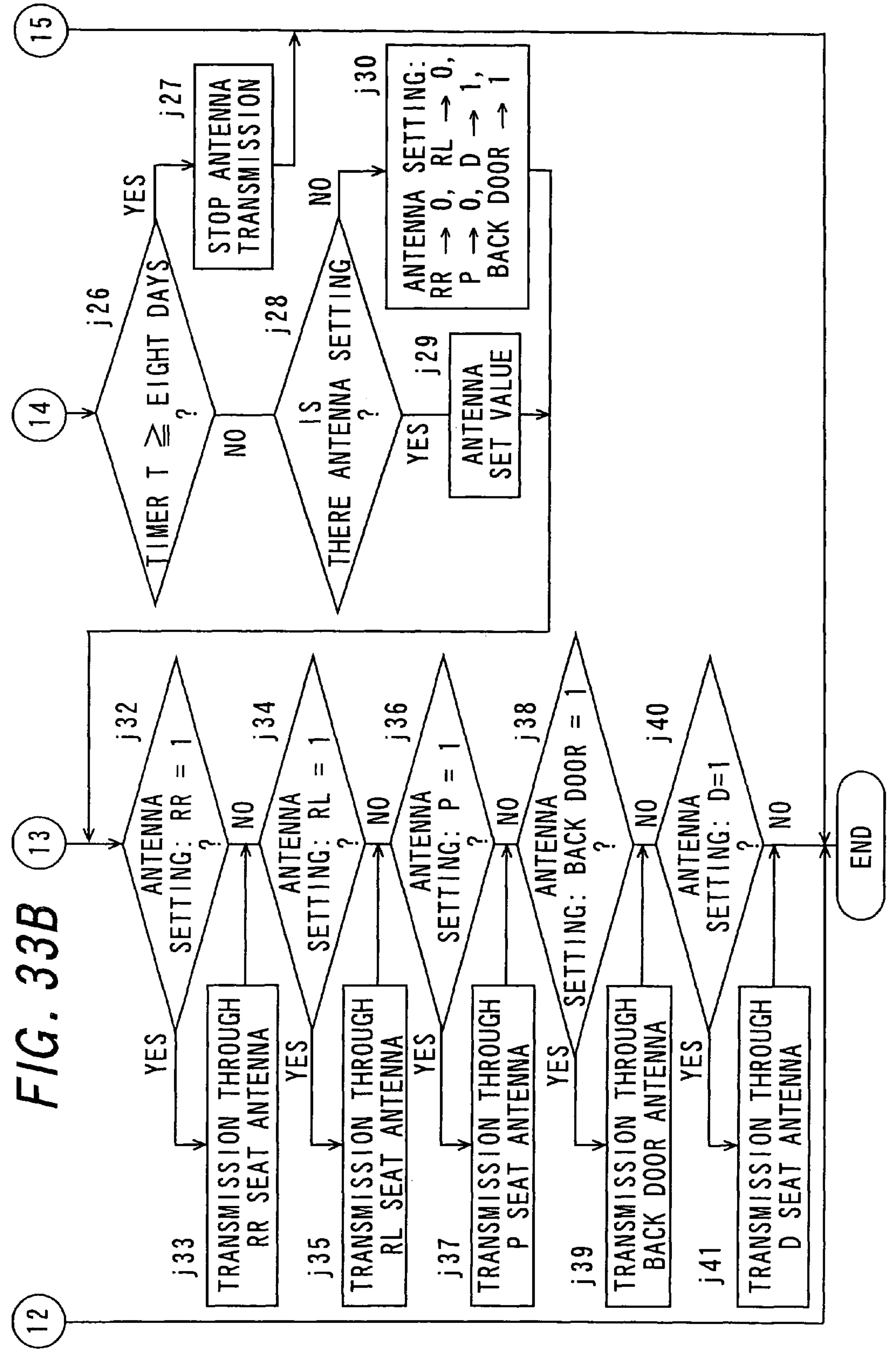
Figure 33C:
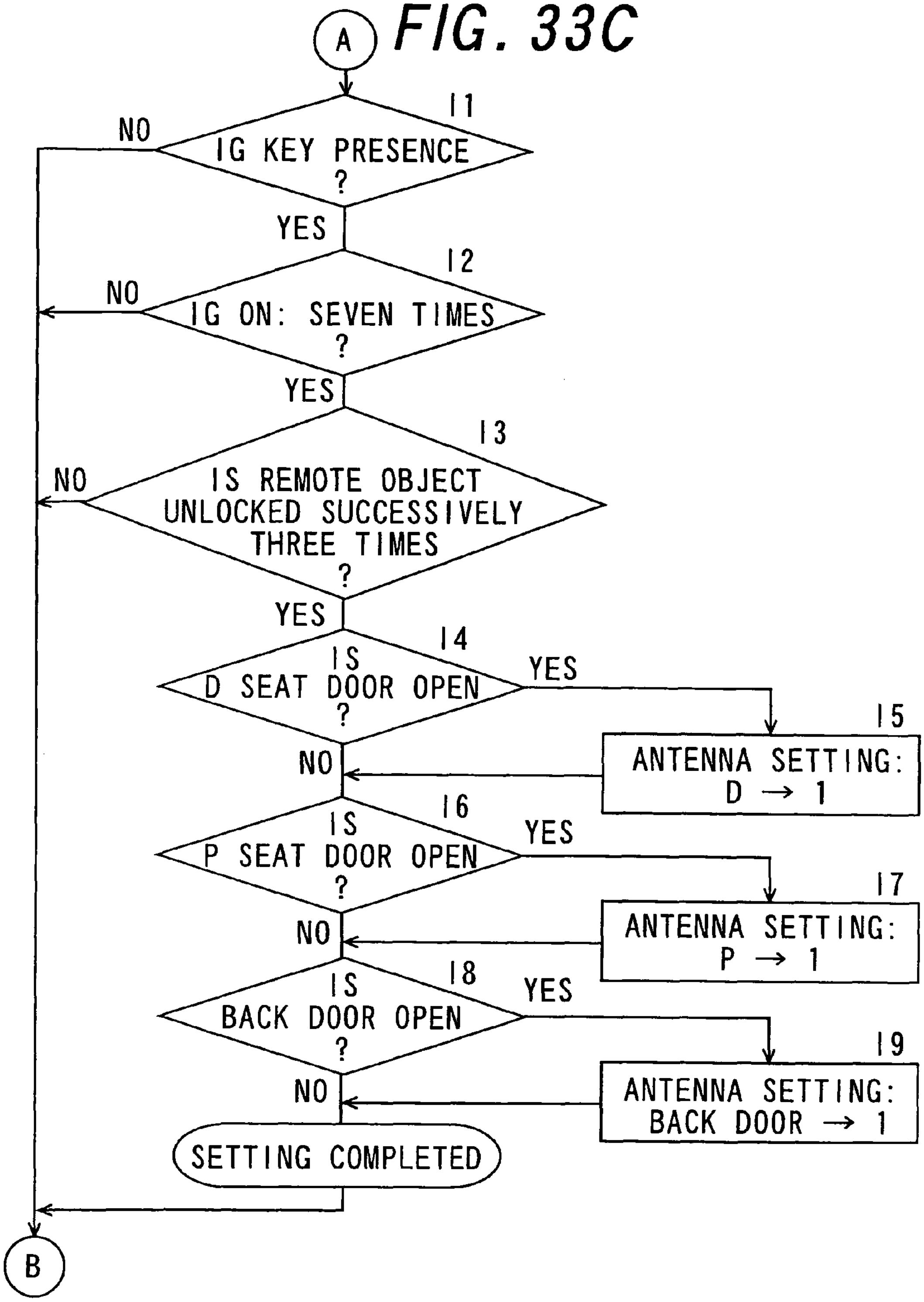

FIGS. 33A to 33C are flowcharts illustrating a process etc. for setting the transmission antenna part to be limited. This process is repeatedly carried out during the operation of smart entry system. Note that this process is carried out by the main microcomupter 13. Firstly at Step 11, in order to set the to-be-limited transmitting parts of the LF transmission antenna 24, the main microcomupter 13 determines whether or not the present state is the above-described "key presence", based on the IG key detection switch 28, the IG switch 27, and the ACC switch 41. When the determination result is NO, the process proceeds to Step j1. When the determination result is "key presence", the process proceeds to Step 12, where it is determined whether or not conditions for setting the transmitting parts of the LF transmission antenna 24 (for example, the IG switch 27 is ON "seven times") have been established. The conditions are determined in advance.

When the determination result is NO, the process proceeds to Step j1. When it is determined that the conditions have been established, the process proceeds to Step 13. At Step 13, the main microcomupter 13 determined whether or not a signal for unlocking the remote object is received from the smart key 11 successively three or more times, in order to shift the present mode to a mode of setting the transmitting part of the LF transmission antenna 24. When the determination result is NO, the process proceeds to Step j1. When the determination result is Yes at Step 13, the process proceeds to Step 14. That is to say, in the present example, a flag of each of the door antennas for conducting the transmitting limitation is set at "1" in accordance with the number of operations for unlocking the remote object and a condition that each door is open. A method of setting each of the door antennas for the transmitting limitation according to the present embodiment is one example using not a switch exclusively used for the transmitting limitation, but using a heretofore known switch. By opening a desired door within the predetermined length of time (10 sec, for example), the door antenna for the transmitting limitation is designated and fixed.

At Step 14, it is determined whether or not the D seat door 51 is open, and when the determination result is NO, the process proceeds to Step 16. When it is determined that the conditions have been established, the process proceeds to Step 15.

At Step 15, in order to limit the transmitting parts of the LF transmission antenna 24 to the D seat antenna 3 to send a search signal, the D seat antenna flag is set at "1". The process then proceeds to Step 16 where it is determined whether or not conditions for limitation to the P seat antenna 4 have been established; for example, whether or not the P seat door is open. When the determination result is NO, the process proceeds to Step 18. When the determination result is YES at Step 16, the process proceeds to Step 17 where the P seat antenna flag is set at "1" in order to limit the transmitting parts of the LF transmission antenna 24 to the P seat antenna 4 to send a search signal.

The process then proceeds to Step 18 where it is determined whether or not conditions for limitation to the back door antenna 7 have been established; for example, whether or not the back door is open. When the determination result is NO, the setting of the transmitting parts of the LF transmission antenna 24 to be limited is completed, and the process then proceeds to Step j1. When the determination result is YES at Step 18, the process proceeds to Step 19 where the back door antenna flag is set at "1" in order to limit the transmitting parts of the LF transmission antenna 24 to the back door antenna 7. By so doing, the setting of the transmitting parts of the LF transmission antenna 24 to be limited is completed, and the process then proceeds to Step j1.

When the determination result is YES at Step j1 and then NO at Step j2, the process proceeds to Step j3B. When it is determined at Step j3B that the timer is set at a "zero" second, that is, at the measurement starting point, the process proceeds to Step j4 where the main microcomupter 13 starts the timer. The process then proceeds to Step j31. When the determination result is No at Step j3B, the process proceeds to Step j25 where, in order to limit the transmitting parts of the LF transmission antenna 24, it is determined whether or not the first lapse time or longer time (for example, "three or more days") has lapsed after the start of the timer. When the determination result is NO, the process proceeds to Step j31. When it is determined that the first lapse time or longer time has lapsed, the process proceeds to Step j26 where it is determined whether or not the second lapse time or longer time (for example, "eight or more days") has further lapsed after the start of the timer. When the determination result is NO, the process proceeds to Step j28 where it is determined whether or not there exists the setting of the transmitting parts of the LF transmission antenna 24 to be limited.

When it is determined that there exists the setting, the process proceeds to Step j29 where the antenna set value is confirmed and at Step j32, in order to confirm that the transmitting parts of the LF transmission antenna 24 are limited to the RR seat antenna 5, it is determined whether or not the RR seat antenna flag is set at "1". When the determination result is NO, that is, when it is determined that the transmitting parts of the LF transmission antenna 24 are not limited to the RR seat antenna 5, the process proceeds to Step j34. When it is determined that the RR seat antenna flag is set at "1", the process proceeds to Step j33 where the RR seat antenna 5 is made to send a search signal. The process then proceeds to Step j34.

At Step j34, in order to confirm that the transmitting parts of the LF transmission antenna 24 are limited to the RL seat antenna 6, it is determined whether or not the RL seat antenna flag is set at "1". When the determination result is NO, that is, when it is determined that the transmitting parts of the LF transmission antenna 24 are not limited to the RL seat antenna 6, the process proceeds to Step j36. When it is determined that the RL seat antenna flag is set at "1", the process proceeds to Step j35 where the RL seat antenna 6 is made to send a search signal. The process then proceeds to Step j36.

At Step j36, in order to confirm that the transmitting parts of the LF transmission antenna 24 are limited to the P seat antenna 4, it is determined whether or not the P seat antenna flag is set at "1". When the determination result is NO, that is, when it is determined that the transmitting parts of the LF transmission antenna 24 are not limited to the P seat antenna 4, the process proceeds to Step j38. When it is determined that the P seat antenna flag is set at "1", the process proceeds to Step j37 where the P seat antenna 4 is made to send a search signal. The process then proceeds to Step j38.

At Step j38, in order to confirm that the transmitting parts of the LF transmission antenna 24 are limited to the back door antenna 7, it is determined whether or not the back door antenna flag is set at "1". When the determination result is NO, that is, when it is determined that the transmitting parts of the LF transmission antenna 24 are not limited to the back door antenna 7, the process proceeds to Step j40. When it is determined that the back door antenna flag is set at "1", the process proceeds to Step j41 where the D seat antenna 3 is made to send a search signal. The process then proceeds to Step 11.

When it is determined at Step j28 that there exists no setting of the transmitting parts of the LF transmission antenna 24 to be limited, that is, when the determination result is NO at Step j28, the process proceeds to Step j30. At Step j30, in order to set the transmitting parts of the LF transmission antenna 24 to be limited, the D seat antenna flag is set at "1" and the back door antenna flag is set at "1", for example. To the other antenna flags; namely the RR seat antenna flag, the RL seat antenna flag, and the P seat antenna flag are set at "0", respectively. The process then proceeds to Step j32.

Figure 34A:
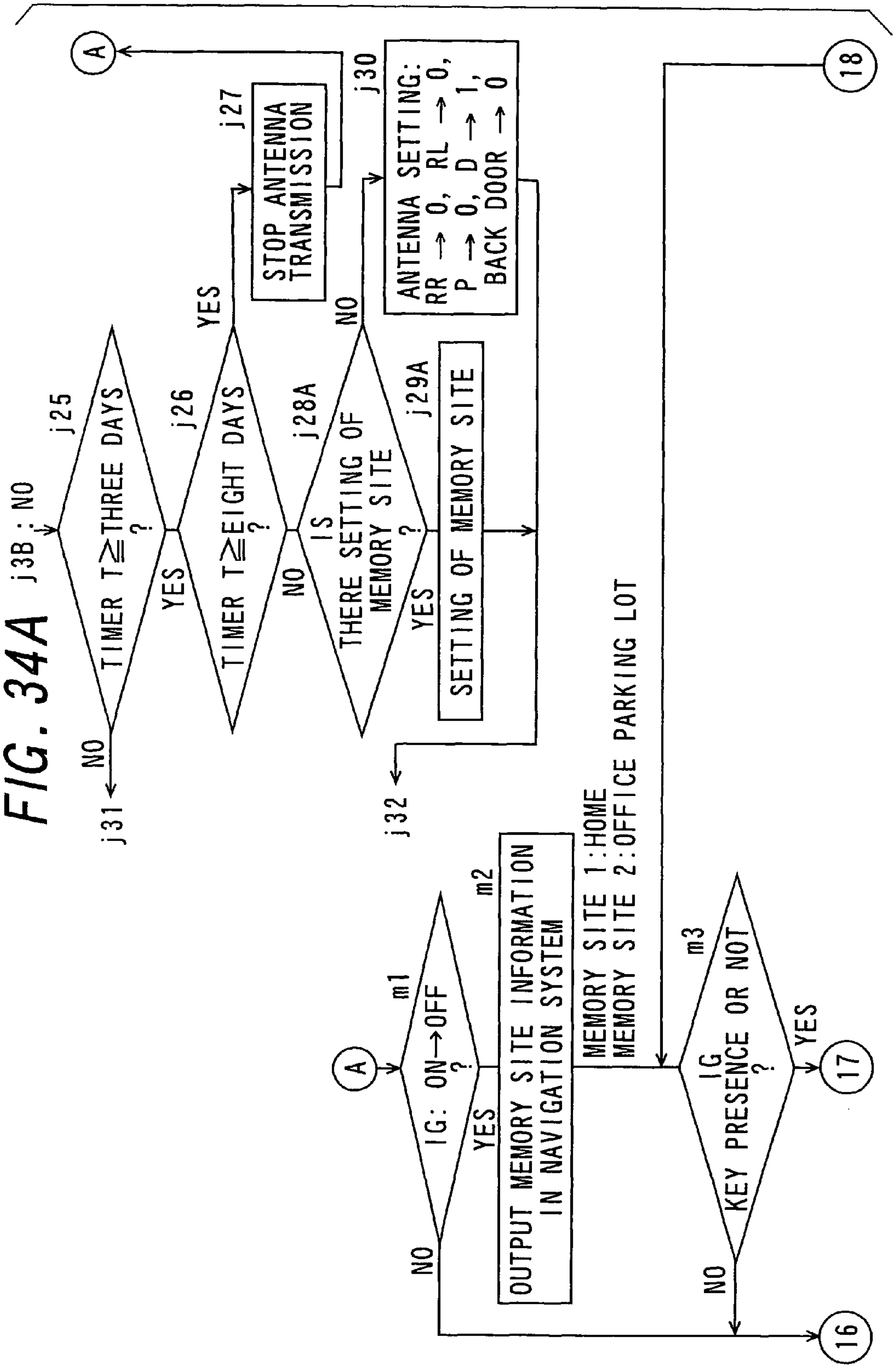
FIGS. 34A to 34C are flowcharts illustrating a process of setting, in relation to each other, position information of the vehicle detected by the navigation system and the transmission antenna part to be limited.
Figure 34B:
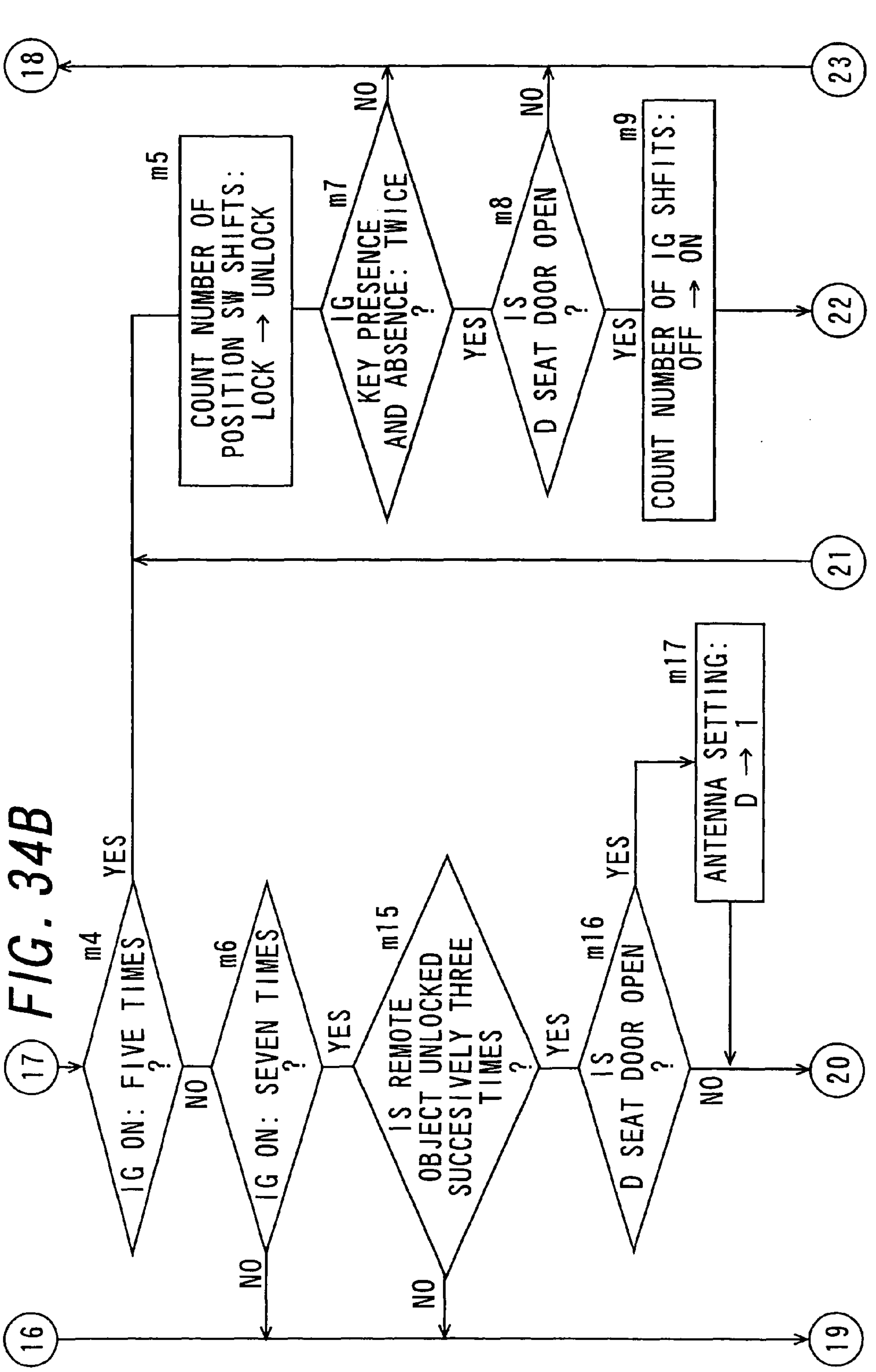
Figure 34C:
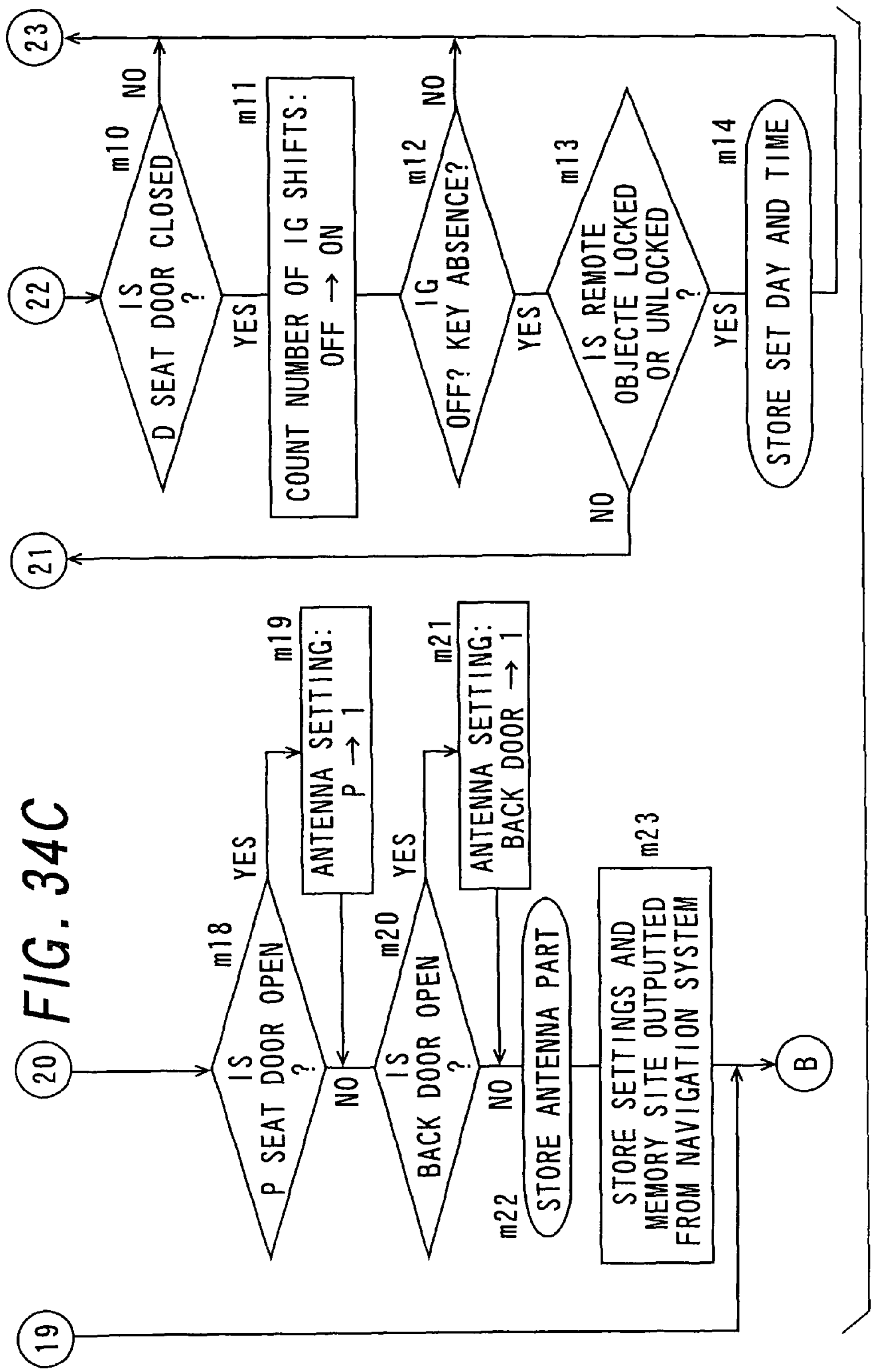
Figure 35A:
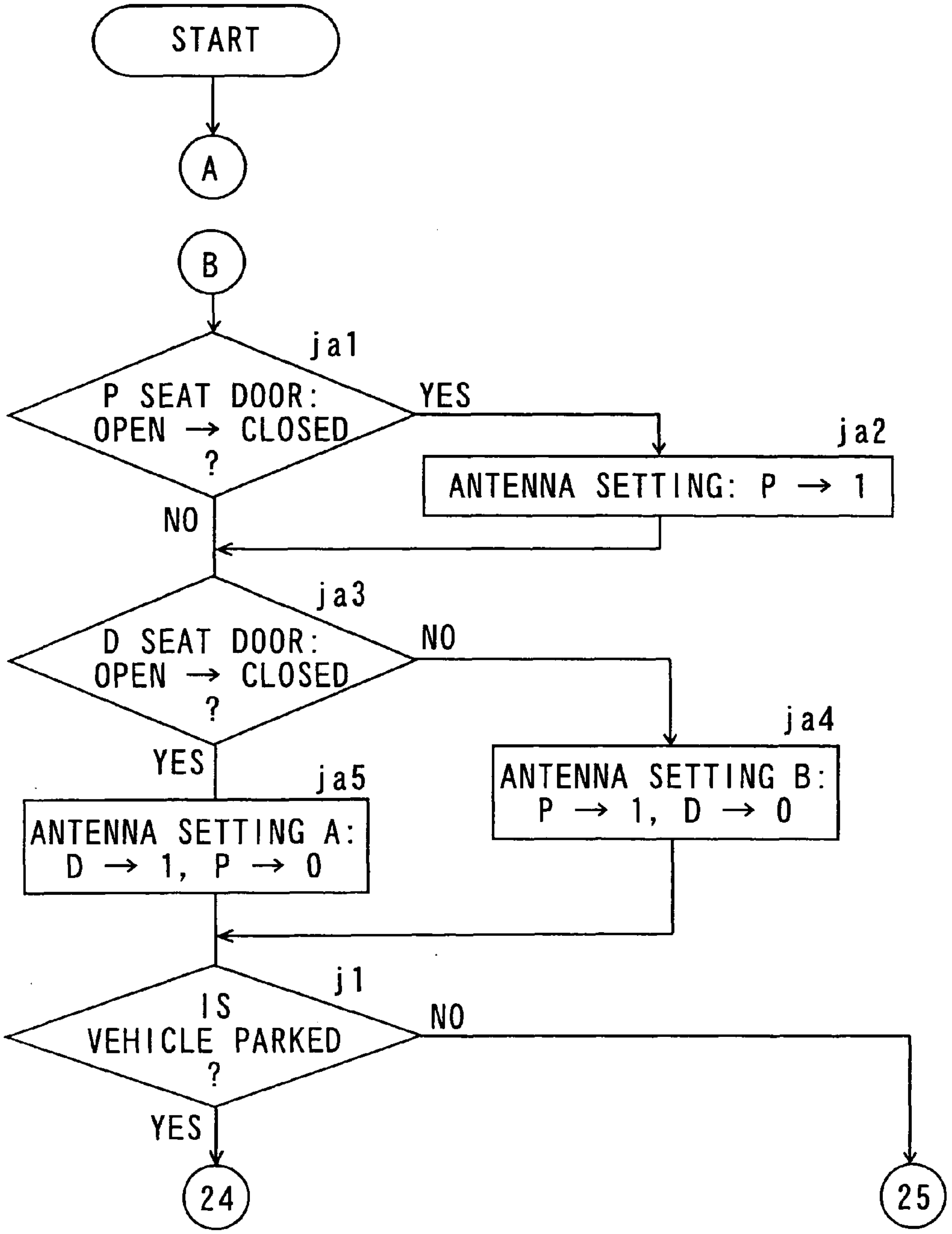
FIGS. 35A to 35D are flowcharts illustrating a process of limiting the LF transmission antenna based on information of whether a door is open or closed immediately before the vehicle is parked.
Figure 35B:
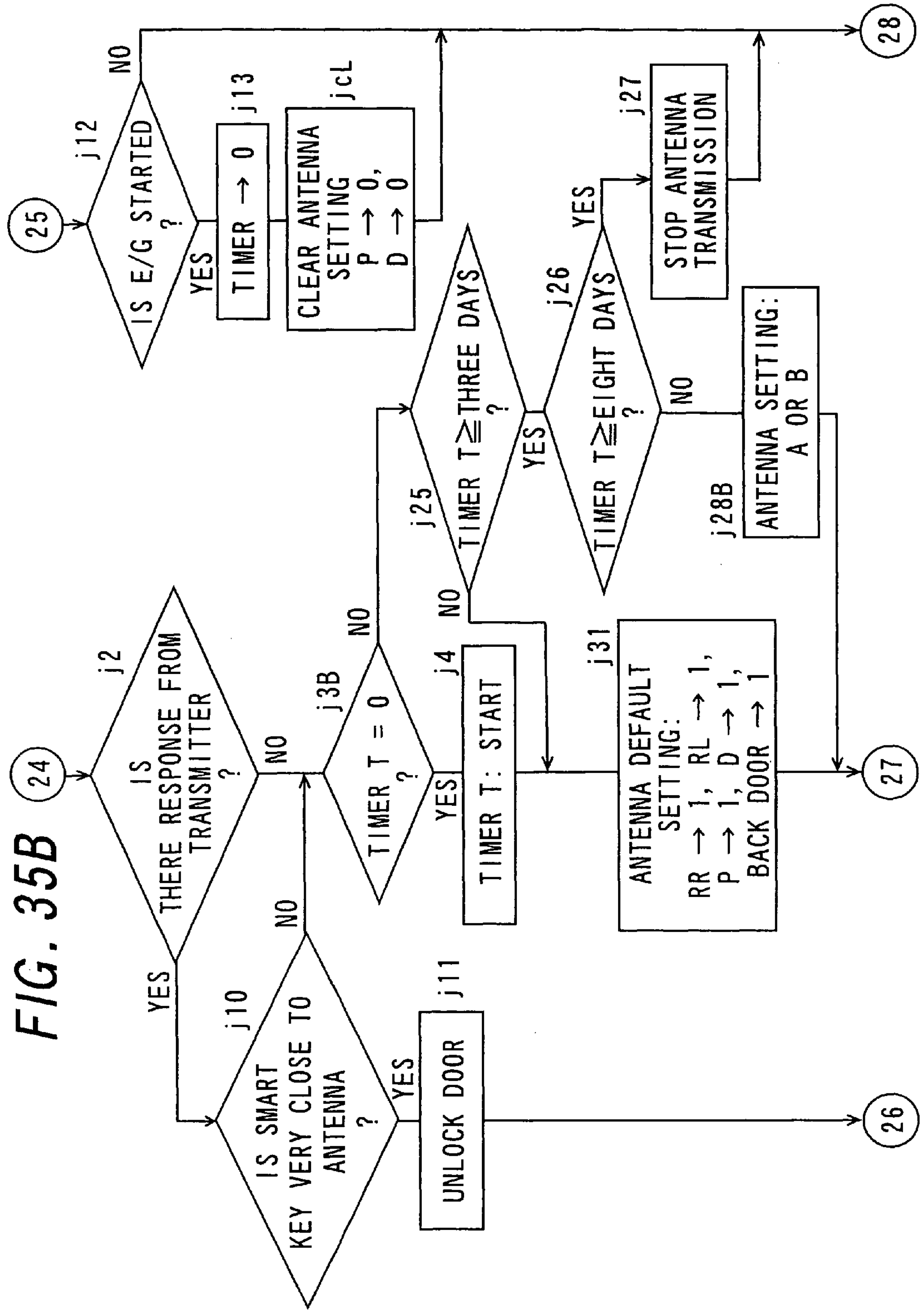
Figure 35C:
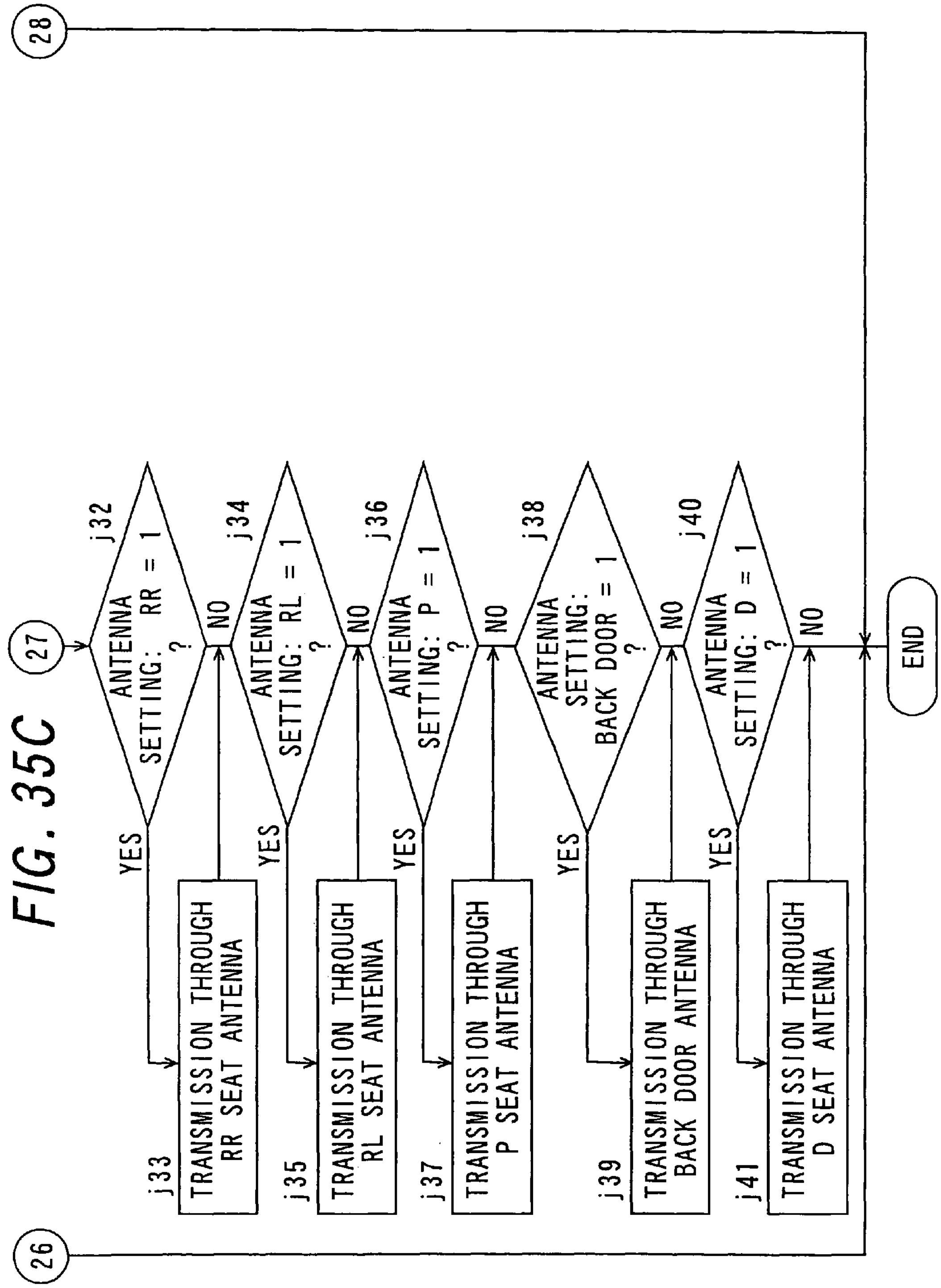
Figure 35D:
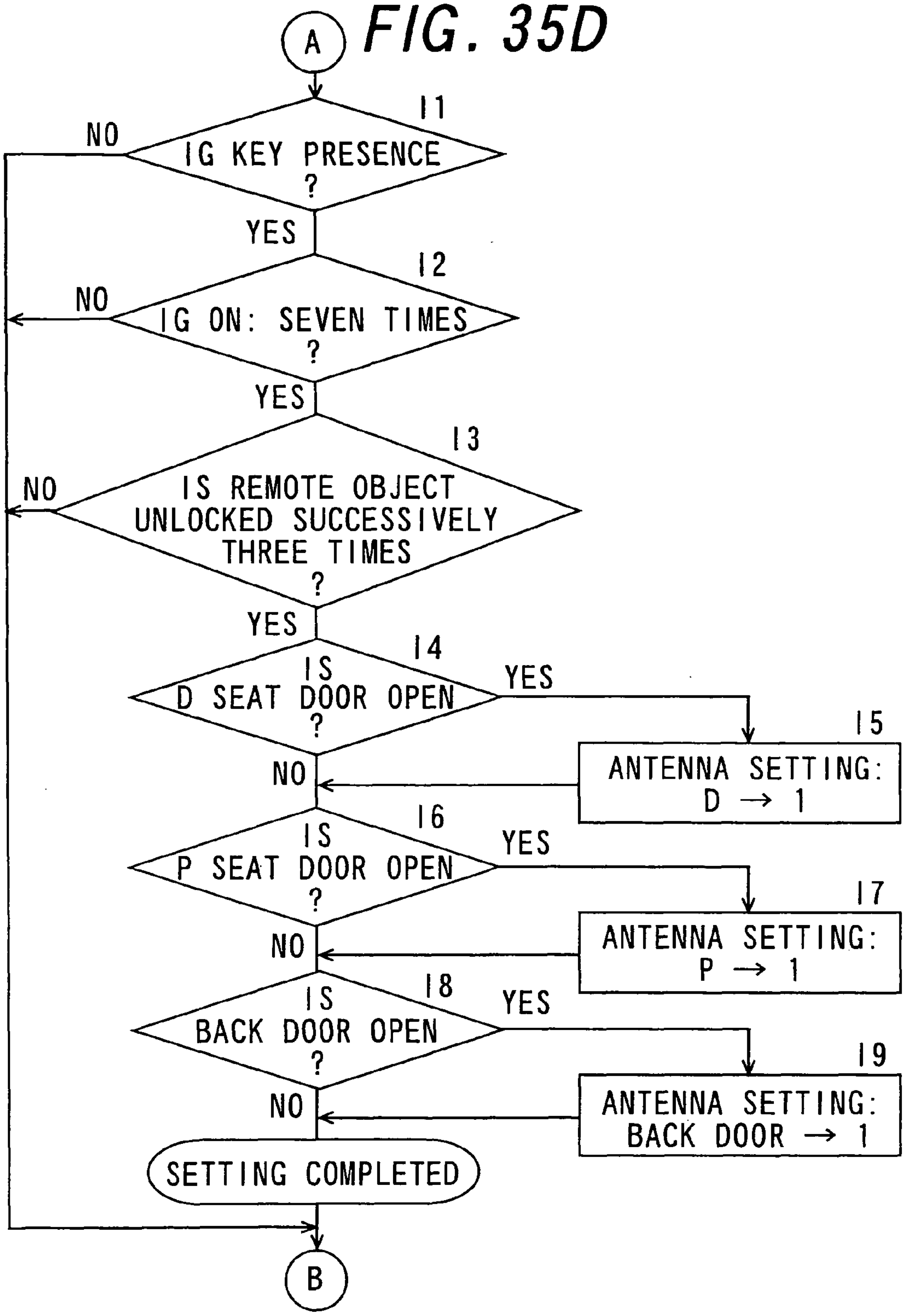

FIGS. 34A to 34C are flowcharts illustrating a process etc. for setting, in relation to each other, position information of the vehicle 2 detected by the navigation system NS and the transmission antenna part to be limited. FIGS. 34A to 34C illustrates a modified example of the process in FIG. 30A, where Step j3A has been replaced. Note that this process is carried out by the main microcumpter 13. Firstly at Step m1, it is determined whether or not the IG switch 27 has been shifted from an ON state to an OFF state, in order to set, in relation to each other, the position information of the vehicle 2 detected by the navigation system NS and the transmitting parts of the LF transmission antenna 24 to be limited. When the determination result is NO, the process proceeds to Step j1.

When it is determined that the IG switch 27 has been shifted from the ON state to the OFF state, the process proceeds to Step m2. At Step m2, for example, a home position that is namely a first memory site, and an office parking lot that is namely a second memory site are read out by the navigation system NS. The process then proceeds to Step m3 where, in order to set the transmitting parts of the LF transmission antenna 24 to be limited, it is determined whether or not the present state is the above-described "key presence", based on the IG key detection switch 28, the IG switch 27, and the ACC switch 41. When the determination result is NO, the process proceeds to Step j1. When the determination result is "key presence", the process proceeds to Step m4 where it is determined whether or not conditions for setting the day of the week and the hours of the day (for example, the IG switch 27 is ON "five times") have been established. When it is determined that the conditions have been established, the process proceeds to Step m5. When the determination result is NO, the process proceeds to Step m6.

At Step m6, it is determined whether or not conditions of storing the above-described memory sites and the transmitting parts of the LF transmission antenna 24 to be limited (for example, the IG switch 27 is ON "seven times") have been established. When it is determined that the conditions have been established, the process proceeds to Step m15. When the determination result is NO, the process proceeds to Step j1. At Step m15, in order to shift the present mode to a mode of setting the transmitting parts of the LF transmission antenna 24, it is determined whether or not a signal for unlocking the remote object is received from the smart key 11 successively three or more times. When the determination result is NO, the process proceeds to Step j1. When the determination result is Yes at Step m15, the process proceeds to Step m16 where it is determined whether or not the conditions for limitation to the D seat antenna 3 have been established; for example, whether or not the D seat door 51 is open. When the determination result is NO, the process proceeds to Step m18.

When it is determined that the conditions for limitation to the D seat antenna 3 have been established, the process proceeds to Step m17. At Step m17, in order to limit the transmitting parts of the LF transmission antenna 24 to the D seat antenna 3 to send a search signal, the D seat antenna flag is set at "1". The process then proceeds to Step m18 where it is determined whether or not the conditions for limitation to the P seat antenna 4 have been established; for example, whether or not the P seat door 52 is open. When the determination result is NO, the process proceeds to Step m 20. When the determination result is YES at Step m18, the process proceeds to Step m19 where, in order to limit the transmitting parts of the LF transmission antenna 24 to the P seat antenna 4, the P seat antenna flag is set at "1".

The process then proceeds to Step m20 where it is determined whether or not the conditions for limitation to the back door antenna 7 have been established; for example, whether or not the back door 55 is open. When the determination result is NO, the process proceeds to Step m22 where the transmitting part of the LF transmission antenna 24 to be limited is stored. Next, the main microcomupter 13 stores, in relation to each other, the first and second memory sites and the transmitting part of the LF transmission antenna 24 to be limited. The process then proceeds to Step j1.

At Step m5, in order to set the day of the week and hours of the day when the LF transmission antenna 24 is limited, the number of shifts of the D seat lock position switch 33 from an ON state (a lock position) to an OFF state (an unlock position) is counted, for example. When the number is one, the day is Monday and when the number is two, the day is Tuesday. To be specific, the transmitting parts of the LF transmission antenna 24 are limited on Wednesday, Thursday, Friday, Saturday, and Sunday except the above-state Monday and Tuesday. Next, the process proceeds to Step m7 where it is determined whether or not a key presence state and a key absence state have been brought two times. When the determination result is NO, the process returns to Step m3. When it is determined that the key presence state and key absence state have been brought two times, the set day of the week is fixed, and the process proceeds to Step m8. That is to say, in the present example, the day of the week when the transmitting limitation of the LF transmission antenna 24 is performed is set in accordance with the number of operations of the D seat lock position switch 33, and the number of operations of the ignition key is used to determine the fixing (input completion) of setting the day of the week. A method of setting the day of the week etc. according to the present embodiment is one example using not a switch exclusively used for setting the day of the week etc. but using a heretofore known switch. The day(s) of the week is(are) designated by the number of operations within a predetermined length of time (5 sec, for example), and then fixed. One-time operation within the predetermined length of time sets Monday, and two-time operations within the predetermined length of time set Tuesday, and four-time operations within the predetermined length of time set Thursday.

At Step m8, it is determined whether or not the conditions of setting a time for limiting the LF transmission antenna 24; for example, whether or not the D seat door 51 is open, based on a detection signal outputted from the D door switch 29. When the determination result is NO, the process returns to Step m3. When it is determined that the D seat door 51 is open, the process proceeds to Step m9 where a starting time for limiting the LF transmission antenna 24 is set. In the present example, the starting time for limiting the LF transmission antenna 24 is set on the condition that the D seat door is open, and the number of shifts of the IG switch 27 from the OFF state to ON state is used to determine the fixing (input completion) of the starting time. A method of setting the starting time according to the present embodiment is one example using not a switch exclusively used for setting the starting time etc. but using a heretofore known switch. The starting time is designated by the number of operations within a predetermined length of time (20 sec, for example), and then fixed. Eight-time operations within the predetermined length of time sets 8 a.m. Next, the process proceeds to Step m10 where it is determined whether or not the conditions of setting an ending time for limiting the LF transmission antenna 24 have been established; for example, whether or not the D seat door is closed, based on a detection signal outputted from the D seat door switch 29. When the determination result is NO, the process returns to Step m3.

When it is determined that the D seat door 51 is closed, the process proceeds to Step m11 where the ending time for limiting the LF transmission antenna 24 is set. In the present example, the ending time for limiting the LF transmission antenna 24 is set on the condition that the D seat door 51 is closed, and the number of shifts of the IG switch 27 from the OFF state to ON state is used to determine the fixing (input completion) of the ending time. A method of setting the ending time according to the present embodiment is one example using not a switch exclusively used for setting the ending time etc. but using a heretofore known switch. The ending time is designated by the number of operations within a predetermined length of time (20 sec, for example), and then fixed. Nine-time operations within the predetermined length of time set 9 a.m. Through the time setting as described above, the transmitting parts of the LF transmission antenna 24 are limited during hours except for 8 a.m. to 9 a.m., specifically.

Next, the process proceeds to Step m13 where it is determined whether or not a signal for unlocking the remote object has been received from the smart key 11, for example, in order to fix the set day of the week and set hours of the day. When the determination result is NO, that is, when the day of the week and hours of the day are determined to be reset, the process returns to Step m5. When it is determined that the unlocking signal has been received, that is, when the determination result is YES at Step m13, the process proceeds to Step m14 where the set day of the week and set hours of the day are stored. The process then proceeds to Step m3.

When the determination result is YES at Step j1 and then NO at Step j2, the process proceeds to Step j3B. When the determination result is NO at Step j3B, that is, a determination that the timer is not set at the measurement starting point, the process proceeds to Step j25 where, in order to limit the transmitting parts of the LF transmission antenna 24, it is determined whether or not the first lapse time or longer time (for example, "three or more days") has lapsed after the start of the timer. When the determination result is NO, the process proceeds to Step j3. When it is determined that the first lapse time has lapsed, the process proceeds to Step j26 where it is determined whether or not the second lapse time or longer time (for example, "eight or more days") has further lapsed after the start of the timer. When the determination result is NO, the process proceeds to Step j28A.

At Step j28A, it is determined whether or not there exists a setting of the memory site through the navigation system NS. When it is determined that there exists the setting of the memory site, the process proceeds to Step j29A where the stored memory site is set, and the process then proceeds to Step j32. When it is determined at Step j28A that the setting of the memory site is absent, the process proceeds to Step j30 and subsequently proceeds to Step j32.

FIGS. 35A to 35D are flowcharts illustrating a process of limiting the LF transmission antenna 24 based on information of whether a door is open or closed immediately before the vehicle is parked. This process is repeatedly carried out during the operation of smart entry system. Note that this process is carried out by the main microcomupter 13. After Steps d1 to d9, the setting of the transmitting parts of the LF setting antenna 24 to be limited is completed, and the process proceeds to Step ja1. At Step ja1, in order to obtain the information of whether a door is open or closed immediately before the vehicle is parked, it is determined whether or not the P seat door 52 has been shifted from an open state to a closed state, based on a detection signal outputted from the P seat door switch 30. When it is determined that the P seat door 52 has been shifted from the open state to the closed state, the process proceeds to Step ja2. At Step ja2, in order to limit the transmitting parts of the LF transmission antenna 24 to the P seat antenna 4 to send a search signal, the P seat antenna flag is set at "1". The process then proceeds to Step ja3. When the determination result is NO at Step ja1, the process proceeds to Step ja3.

At Step ja3, in order to obtain the information of whether a door is open or closed immediately before the vehicle is parked, it is determined whether or not the D seat door has been shifted from the open state to the closed state, based on a detection signal outputted from the D seat door switch 29. When it is determined that the D seat door 51 has been shifted from the open state to the closed state, the process proceeds to Step ja5. At Step ja5, in order to limit the transmitting parts of the LF transmission antenna 24 to the D seat antenna 3 to send a search signal, the D seat antenna flag is set at "1" and the P seat antenna flag is set at "0". The process then proceeds to Step j1. When it is determined at Step ja3 that the D seat door 51 has not been shifted from the open state to the closed state, that is, when the determination result is NO at Step ja3, the process proceeds to Step ja4.

At Step ja4, the P seat antenna flag is set at "1" and the D seat antenna flag is set at "0", and the process then proceeds to Step j1. When the determination result is NO at Step j1 and then YES at Step j12, the process proceeds to Step j13 and then proceeds to Step jcL. At Step jcL, in order to release the setting of the transmitting parts of the LF transmission antenna 24 to be limited, the P seat antenna flag is set at "0" and the D seat antenna flag is set at "0", and the process then returns to Step 11.

When the determination result is YES at Step j1, NO at Step j2, NO at Step j3B, and YES at Step j25, the process proceeds to Step j26. At Step j26, it is determined whether or not the second lapse time or longer time (for example, "eight or more days") has lapsed after the start of the timer. When the determination result is NO, the process proceeds to Step j28B where the to-be-set antenna setting is read out; that is to say, either one of the antenna setting by way of Step ja5 and the antenna setting by way of Step ja4 is read out. The process then proceeds to Step j32.

Figure 36A:
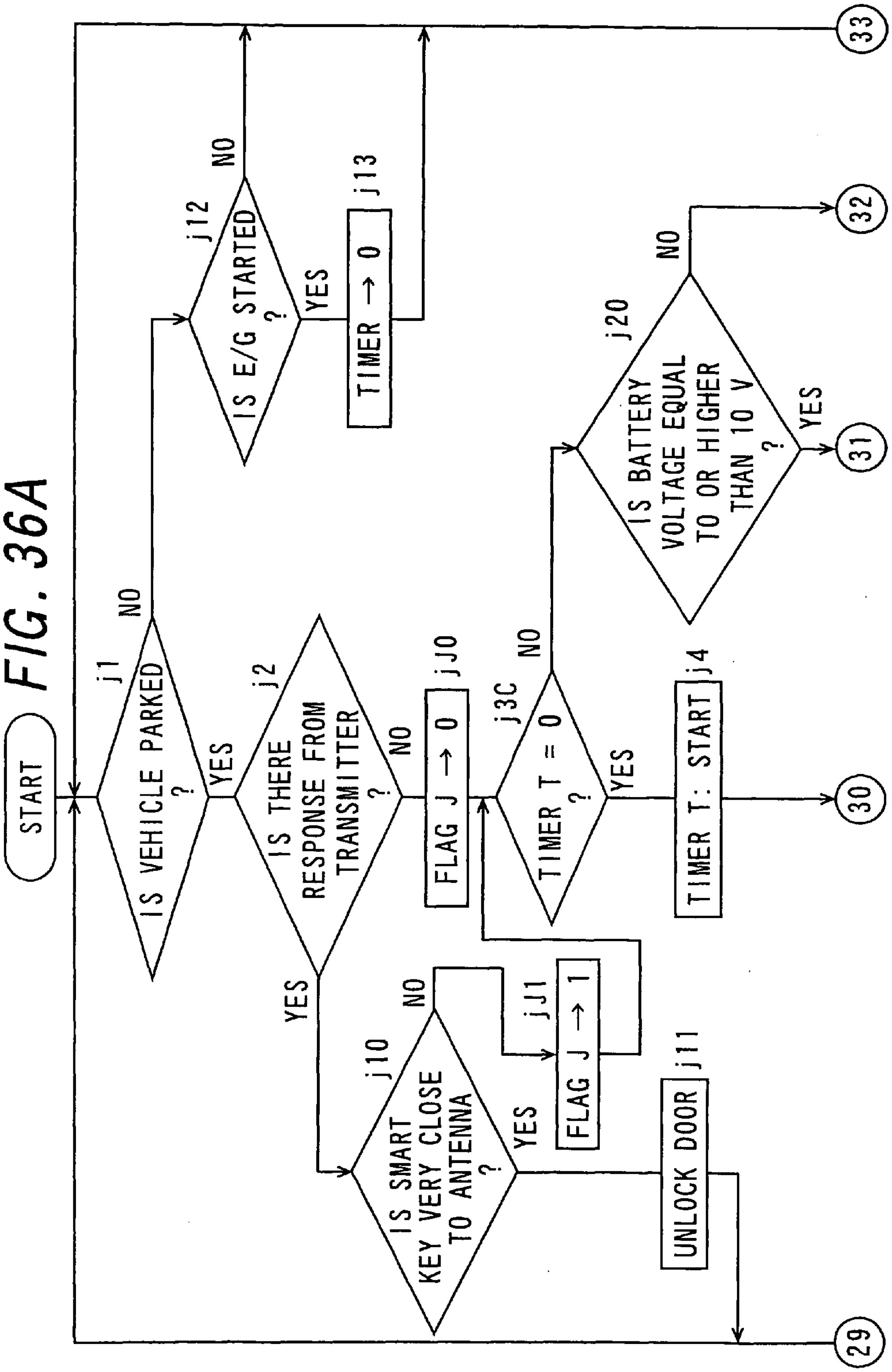
FIGS. 36A to 36C are flowcharts illustrating processes of changing the transmitting parts of the LF transmission antenna depending on whether a response signal is outputted from the smart key.
Figure 36B:
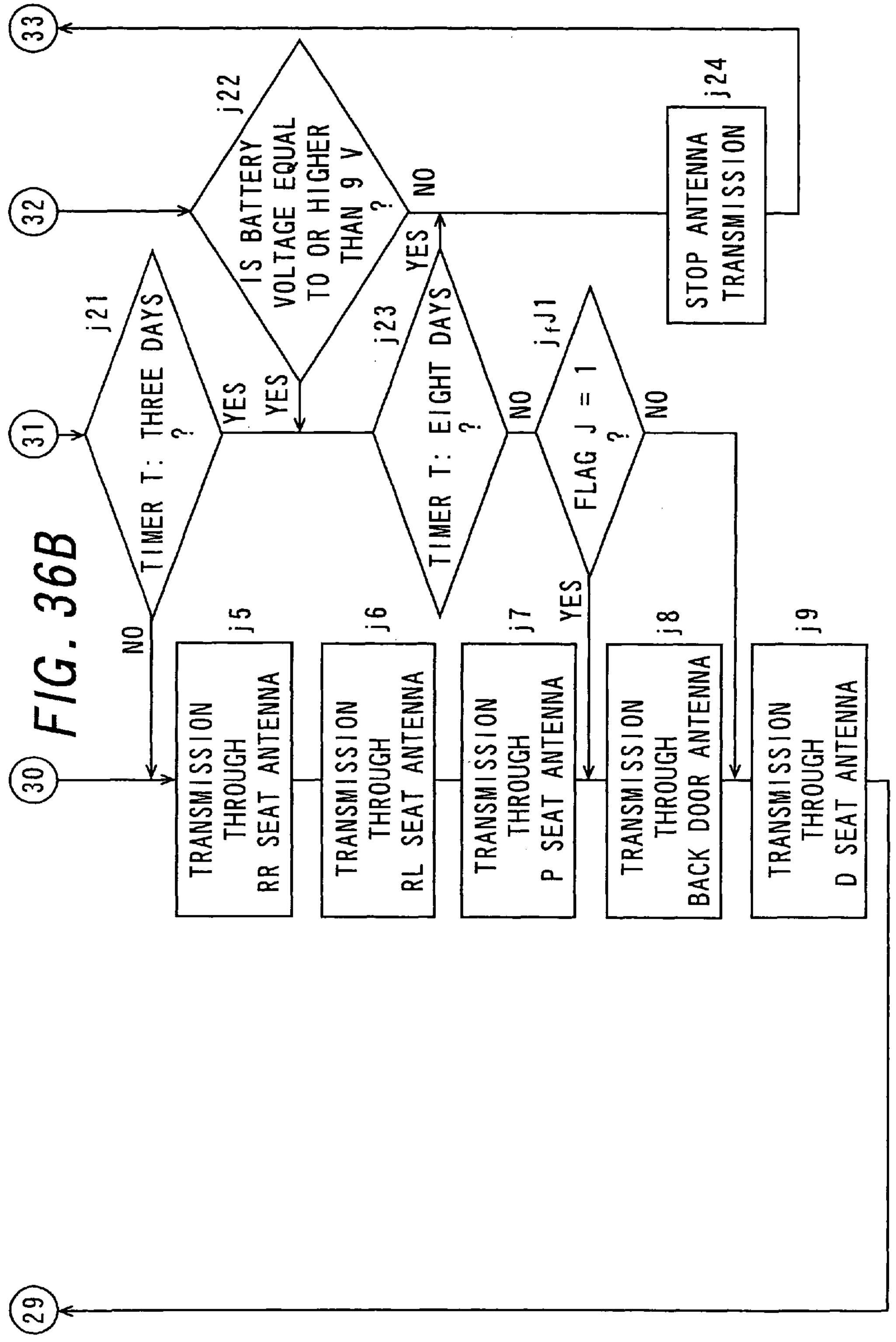
Figure 36C:
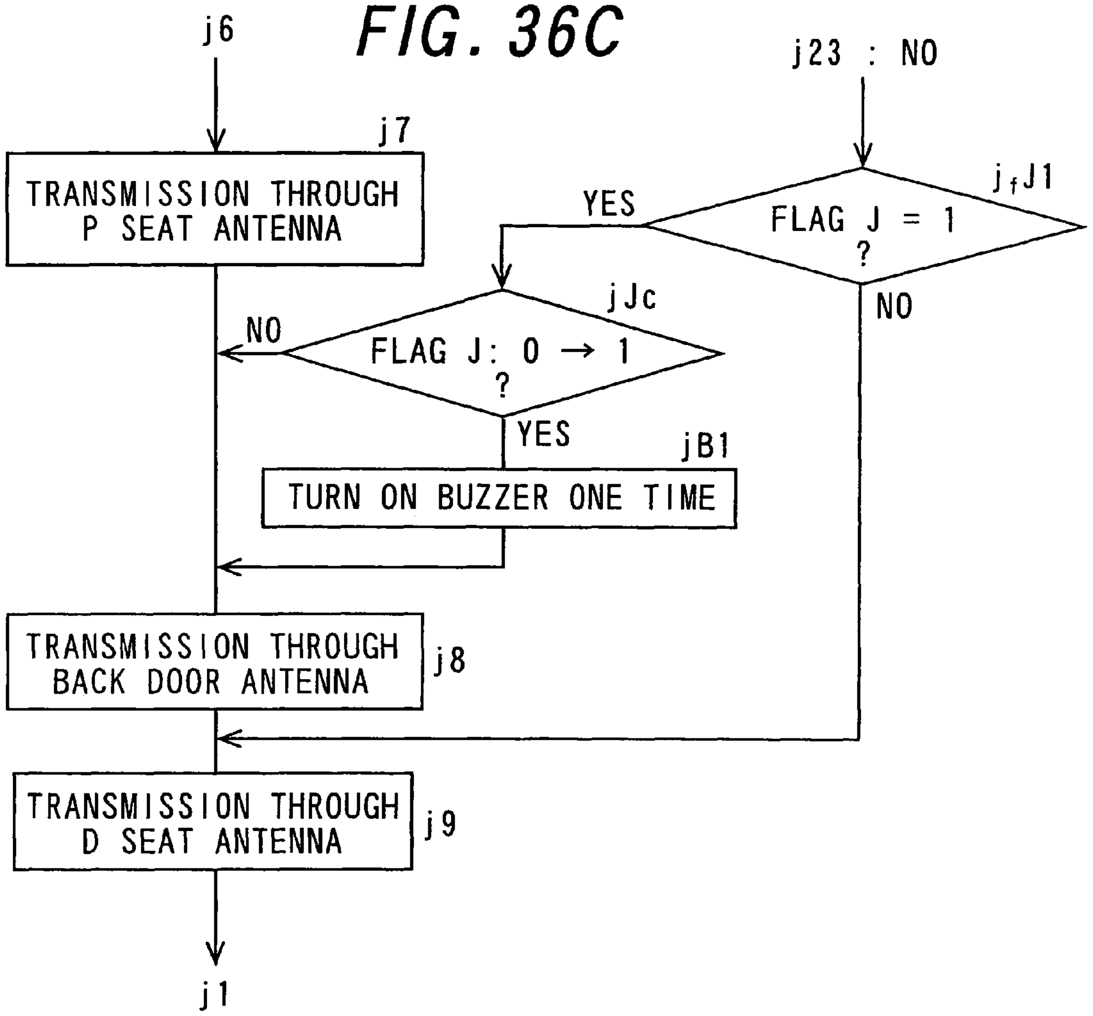

FIGS. 36A to 36C are flowcharts illustrating a process for changing the transmitting parts of the LF transmission antenna 24 depending on whether there is a response signal from the smart key 11. This process is repeatedly carried out during the operation of smart entry system. Note that this process is carried out by the main microcomupter 13. As shown in FIGS. 36A and 36B, when the determination result is YES at Step j1, YES at Step j2 and NO at Step j10, the process proceeds to Step jJ1. At Step jJ1, the flag J is set at "1". This realizes that, in a state where the transmitting parts of the LF transmission antenna 24 are limited, a search signal outputted from each of the limited antennas is sent back by the smart key 11 and then, a search signal is sent also from an antenna other than the above-described limited antennas. To the contrary, when the determination result is NO at Step j2, the process proceeds to Step jJ0 where the flag J is set at "0" in order to fix the limited transmitting parts of the LF transmission antenna 24. The process then proceeds to Step j4.

The process then proceeds to Step j3C. When the determination result is NO at Step j3C, YES at Step j20, YES at Step j21, and NO at Step j23, the process proceeds to Step $j_f$J1 where the main microcomupter 13 determines whether or not the flag J is set at "1". When it is determined that the flag J is set at "1", that is, a determination that the smart key 11 has sent back the search signal outputted from the respective antennas and the smart key 11 has not been close to the vicinity of the antennas, the process proceeds to Step j8. At Step j8, the back door antenna 7 is made to send a search signal, and then at Step j9, the D seat antenna 3 is made to send a search signal. When the flag J is set at "0", that is to say, the smart key 11 does not send back the search signal at Step $j_f$J1, the process proceeds to Step j9.

As shown in FIG. 36C illustrating a modified embodiment of the flowchart shown in FIGS. 36A and 36B, a part of which has been changed, when it is determined at Step $j_f$J1 that the flag J has a value "1", the process proceeds to Step jJc. At Step jJc, it is determined whether or not the value of the flag J has been shifted from "0" to "1", in order to deliver a warning which notifies a fact that the search signal is transmitted from the antenna other than the limited antennas. When the determination result is NO, the process proceeds to Step j8. When it is determined that the value of the flag J has been shifted from "0" to "1", the buzzer 22 is turned on one time to deliver a warning. The process then proceeds to Step j8.

Figure 37A:
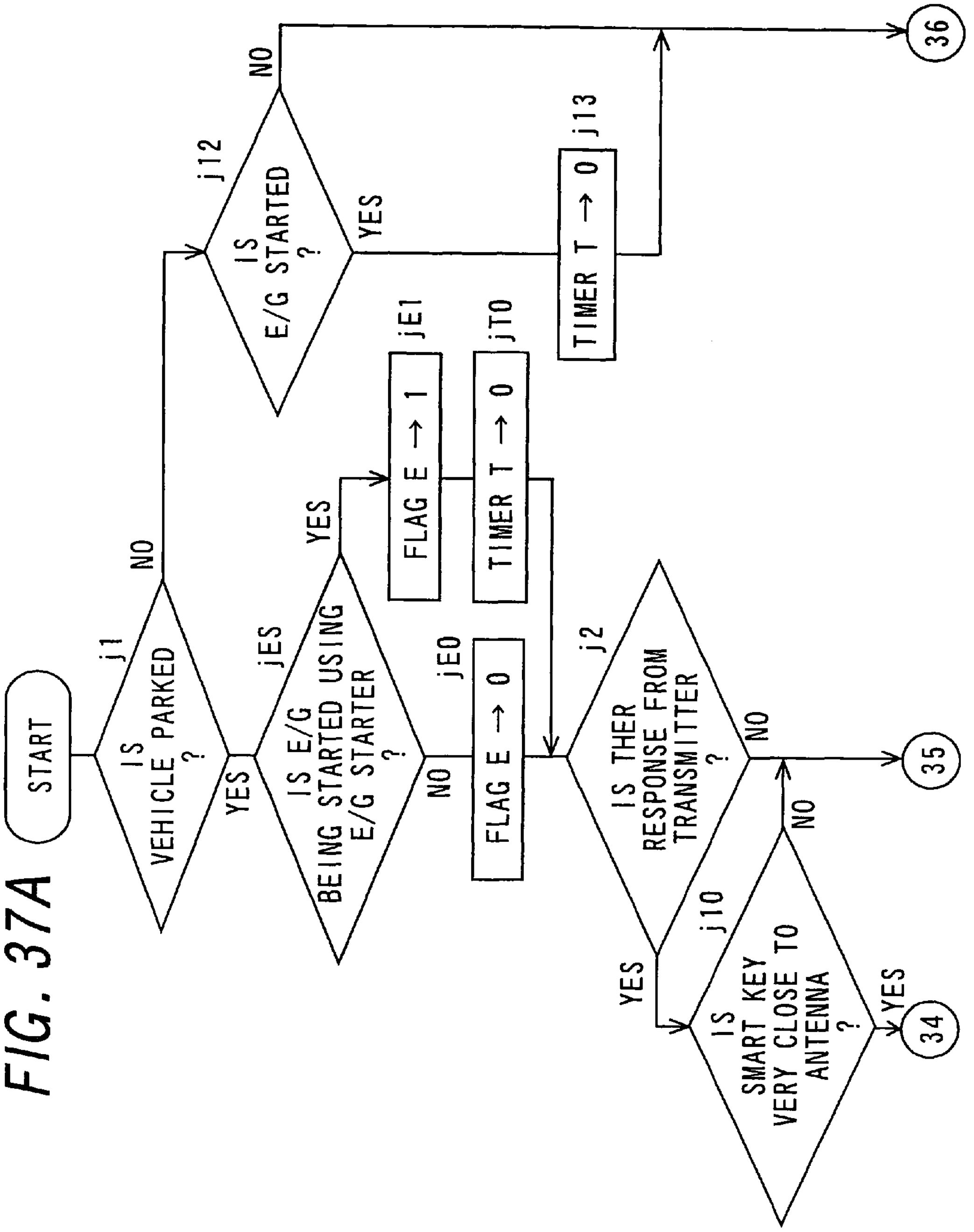
FIGS. 37A and 37B are flowcharts illustrating a process of releasing the limitation on the transmission antenna part when an engine is started by remote control.
Figure 37B:
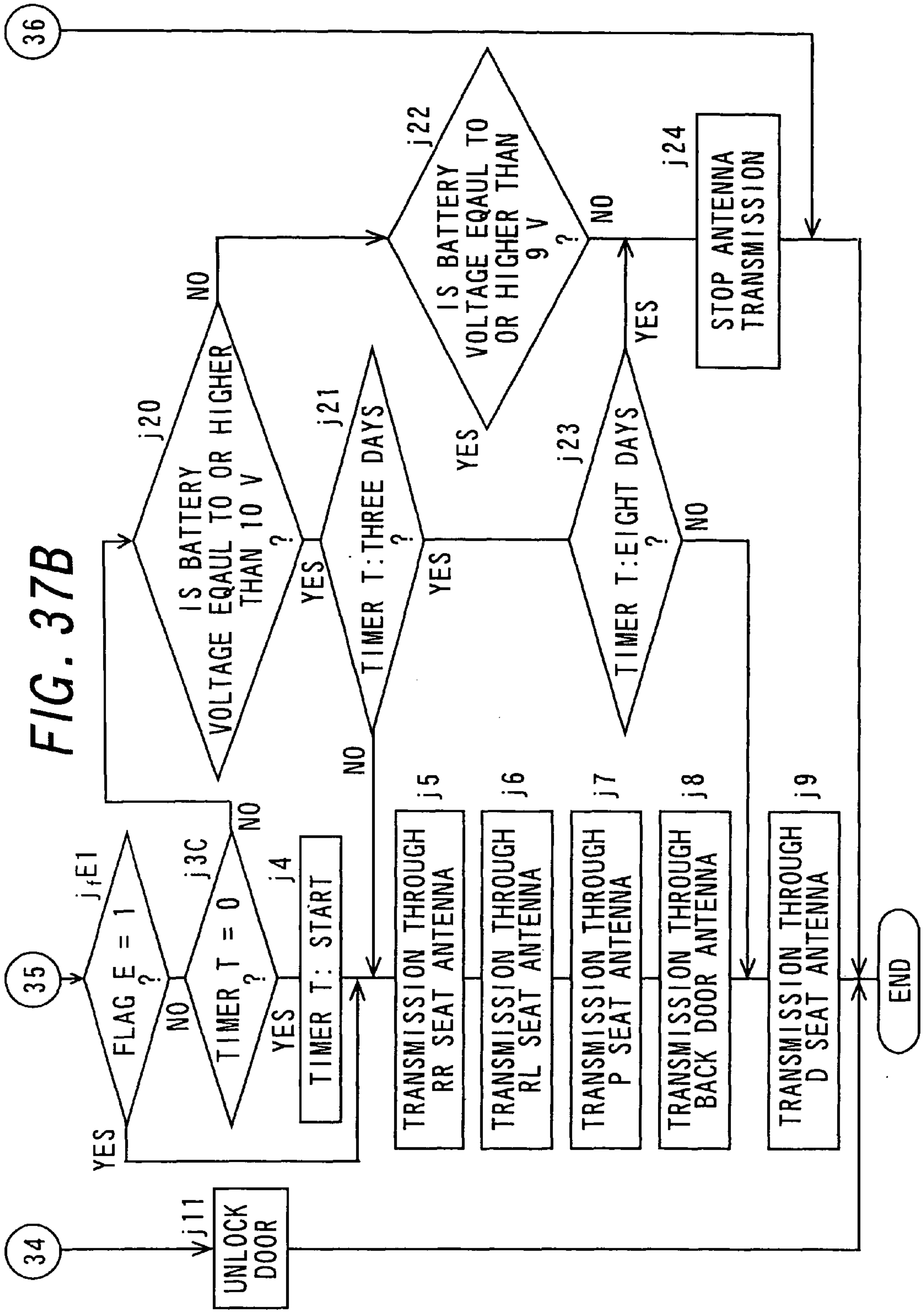

FIGS. 37A and 37B are flowcharts illustrating a process for releasing the limitation on the transmission antenna part when the engine is started by remote control. This process is repeatedly carried out by the main microcomupter 13 during the operation of smart entry system. When the determination result is YES at Step j1, the process proceeds to Step jES where it is determined whether or not the engine system 37 is in operation through remote control, that is, the engine starter system E/GS. When the determination result is NO, the process proceeds to Step jE0 where the flag E is set at "0", indicating that the engine system is not in operation through remote control. The process then proceeds to Step j2. When the determination result is YES at Step jES, the process proceeds to Step jE1 where the flag E is set at "1", indicating that the engine system is in operation through remote control. The process proceeds to Step jT0 where the timer is initialized to the measurement starting point, that is, "zero" seconds. The process then proceeds to Step j2.

When the determination result is NO at Step j2, the process proceeds to Step $j_f$E1 where, in order to release the limitation on the transmission antenna part imposed by remote control, it is determined whether or not the flag E is set at "1". Moreover, also when the determination result is NO at Step j10, the process proceeds to Step $j_f$E1. When it is determined that the flag E is set at "1", that is, when it is determined that the engine system is in operation through the engine starter system E/GS (the determination result is YES at Step $j_f$E1), the process proceeds to Step j5 in order to release the limitation on the transmission antenna part. When it is determined that the flag E is not set at "1", the process proceeds to Step j3C.

As described in the above FIGS. 28 and 29, in a case where the smart key 11 is located in the vehicle-inside area 8 (YES at Step i1), and the field strength data outputted from the smart key 11 to the respective antennas 3 to 7 is the same as the previously sent data (YES at Step s2), the transmission of the response signal outputted from the smart key 11 is suspended, so that the battery of the smart key 11 can be prevented as much as possible from dying. Accordingly, a length of lifetime of the smart key battery can be made longer than that of the related art.

In a case where the smart key 11 is located in the vehicle-inside area 8, when no response signal is outputted from the smart key 11, that is, when the determination result is YES at Step i8, the process proceeds to Step i9 where the transmitting parts of the respective antennas 3 to 7 can be limited (for example, to the D seat antenna 3 only). Accordingly, the load on the vehicle battery can be reduced. This makes it possible to prevent as much as possible the vehicle battery from being exhausted while the vehicle 2 is not used. Further, at Step i10, an output cycle of the search signal is made longer (Step i10) so that power consumption (in particular, transmission power) per unit time can be reduced. Accordingly, the load on the vehicle battery can be reduced.

At Step i3, in order to send from each of the antennas 3 to 7 of the LF transmission antenna 24 of the vehicle 2 to the smart key 11 a search signal including the vehicle interior code UC indicating information that the smart key 11 is located in the vehicle-inside area 8, the vehicle interior code is added to each of the antenna codes, thus exhibiting the following effects. Since the position information of the smart key 11 obtained by the above-described calculation does not have to be obtained every time, the process load on the main microcomupter 13 can be reduced. Accordingly, the load on the vehicle battery can be reduced. In FIG. 28, either one of Step i9 and Step i10 can be omitted. Even in this case, the load on the vehicle battery can be reduced.

As described in FIG. 30A, at Step j14A, the main microcomupter 13 limits the transmitting parts of the LF transmission antenna 24 based on the lapse time that no response signal is outputted from the smart key 11 when the vehicle is parked. This makes it possible to reduce the power consumption of the main microcomupter 13. Accordingly, the load on the vehicle battery can be reduced. As described with reference to FIG. 30B, at Step j3, the main microcomupter 13 limits the transmitting parts of the LF transmission antenna 24 under a certain level of vehicle battery voltage indicating remaining battery power. This makes it possible to reduce the power consumption of the main microcomupter 13. Accordingly, the load on the vehicle battery can be reduced. In the embodiment, the level of vehicle battery voltage is determined as the battery power, but what is determined is not always limited to the level of vehicle battery voltage.

As described with reference to FIG. 30C, at Step j16, when it is determined that the first lapse time or longer time has lapsed and the second lapse time has not yet lapsed after the start of the timer, the process proceeds to Step j9 where the transmitting parts of the LF transmission antenna 24 are limited to, for example, the D seat antenna 3 only. Since the transmitting parts of the LF transmission antenna 24 are thus limited at phased sections of the lapse time, the power consumption of the main microcomupter 13 can be reduced according to a frequency of use by a driver etc. Consequently, the load on the vehicle battery can be reduced without impairing convenience of a driver etc.

As described with reference to FIG. 30D, at Step j18, when it is determined that the vehicle battery voltage is the second voltage or more and less than the first voltage, the process proceeds to Step j9 where the transmitting parts of the LF transmission antenna 24 are limited to, for example, the D seat antenna 3 only. Since the level of vehicle battery voltage being decreased can be precisely determined in stages, the power consumption of the main microcomupter 13 can be reduced so as not to affect a starting performance of the engine. Accordingly, the load on the vehicle battery can be effectively reduced.

As described with reference to FIG. 31B, at Steps k1 to k10 are set the day of the week and the hours of the day when the transmitting parts of the LF transmission antenna 24 are limited. When it is determined at Step j14B that the current time is included in the set day of the week and the set hours of the day, that is, the day of the week and hours of the day when a driver etc. frequently uses the vehicle, the process proceeds to Step j9 where the transmitting parts of the LF transmission antenna 24 are limited to the D seat antenna 3 only. During the time except the day of the week and hours of the day when a driver etc. frequently uses the vehicle, the transmitting parts of the LF transmission antenna 24 are limited to, for example, the D seat antenna 3. The load on the vehicle battery can be thus reduced without impairing the convenience of a driver etc. As described with reference to FIG. 32, the LF transmission antenna 24 is limited on establishment of whichever conditions of the battery voltage and the timer comes first. Accordingly, the power consumption of the main microcomupter 13 can be securely reduced, so that secure reduction in load of the vehicle battery can be achieved.

As described with reference to FIG. 33C, it is possible to set the LF transmission antenna part to be limited at Steps 11 to 19, thus allowing the transmission from the antennas 3 to 7 disposed near the doors which are frequently used. It is thus possible to enhance the convenience of the user. Furthermore, the load on the vehicle battery can be reduced.

As described with reference to FIGS. 34A to 34C, the position information of the vehicle 2 detected by the navigation system NS and the transmission antenna part to be limited are set in relation to each other. When the vehicle 2 is parked, for example, at a home position or in an office parking lot, it is possible to conduct a control according to its setting (a content that limits the transmission antenna parts). Accordingly, the load on the vehicle battery can be reduced.

As described with reference to FIGS. 35A to 35D, the LF transmission antenna 24 is limited based on the information of whether a door is open or closed immediately before the vehicle is parked. For example, in a case of a parking area at home where a driver cannot get off the car from the D seat door 51, the driver gets off the car from the P seat door 52. In such a case, the P seat antenna 4 can be selected for limitation among the respective antennas 3 to 7 of the LF transmission antenna 24. Accordingly, the driver can get off the car from the P seat door smoothly without key operations. Furthermore, the load on the vehicle battery can be reduced.

As described with reference to FIGS. 36A and 36B, in a state where the transmitting parts of the LF transmission antenna 24 are limited, a search signal outputted from each of the limited antennas is sent back by the smart key 11 and then, a search signal is sent also from an antenna other than the above-described limited antennas. It is thus possible to send a search signal from an antenna other than the limited transmitting part of the LF transmission antenna 24 according to the presence or absence of the response signal outputted from the smart key 11. Accordingly, the load on the vehicle battery can be reduced without impairing the convenience of a driver etc. As described with reference to FIG. 36C, in a case where a search signal is transmitted from an antenna other than the limited antennas, a warning is delivered from the buzzer 22, with the result that it can be recognized that the search signal has been transmitted from the antenna other than the limited antennas.

As described with reference to FIGS. 37A and 37B, the limitation on the transmitting part of the LF transmission antenna 24 is released upon start-up of the engine through remote control. When the engine is started by remote control, it is conceivable that a driver etc. subsequently comes close to the vehicle 2 and gets on the vehicle 2. Accordingly, the release of the limitation on the transmitting part of the LF transmission antenna 24 can get the most out of the vehicle-outside area 9. That is to say, any door in the vicinity of which the driver etc. is arrived can be unlocked. It is thus possible to enhance the convenience of a driver etc.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A vehicle control apparatus comprising:

a main control portion disposed on a vehicle, including at least three antennas;

a search signal transmitting section for transmitting a search signal from the respective antennas for detecting a portable unit;

a detecting section for detecting, based on a response signal sent back by the portable unit in response to the search signal, a relative position of the portable unit to the vehicle in a vehicle-inside area and a vehicle-outside area which are an acceptable range in which the portable unit receives the search signal; and a suppressing section that suppresses output of the response signal and prolongs an output cycle of the search signal, when it is detected that the position of the portable unit is not shifted or changed, wherein the vehicle is controlled when the detecting section detects that a position of the portable unit is shifted from an out-of-range to a vehicle-outside area, or shifted from the vehicle-outside area to the out-of-range, or shifted within the vehicle-outside area, the response signal includes the field strength of the search signal of the respective antennas measured by the portable unit, and the detecting section calculates distances between the respective antennas and the portable unit, based on the field strength of the respective antennas included in the response signal, and calculates relative position information of the portable unit to the vehicle using the calculated distances, and the detecting section can detect a position of the portable unit within the vehicle, and when the position cannot be detected, controlling the vehicle is prohibited.

2. A vehicle control apparatus comprising:

a plurality of transmission antennas for transmitting a search signal for detecting a portable unit which can communicate with the antennas;

a reception antenna for receiving a response signal which is sent back by the portable unit in response to the search signal;

an antenna limiting section for limiting a part of the transmission antennas that transmits the search signal; and a voltage monitoring section for monitoring battery power of a vehicle, wherein the antenna limiting section limits a part of the transmission antennas that transmits the search signal, based on the battery power monitored by the voltage monitoring section.

3. The vehicle control apparatus of claim 2, wherein the antenna limiting section limits a part of the transmission antennas that transmits the search signal, based on a length of lapse time when the antenna limiting section receives no response signal through the reception antenna.

4. The vehicle control apparatus of claim 2, wherein the antenna limiting section limits a part of the transmission antennas that transmit the search signal, based on a most frequent use time.

* * * * *